US012619347B2

(12) United States Patent (10) Patent No.: US 12,619,347 B2
Chen et al. (45) Date of Patent: May 5, 2026

(54) METHOD FOR PERFORMING FRAME INTERPOLATION IN INTERFACE DISPLAY PROCESS AND TERMINAL DEVICE

(71) Applicant: HUAWEI TECHNOLOGIES CO., LTD., Shenzhen (CN)

(72) Inventors: Tankun Chen, Shenzhen (CN); Tao Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 246 days.

(21) Appl. No.: 18/260,935

(22) PCT Filed: Dec. 22, 2021

(86) PCT No.: PCT/CN2021/140405
§ 371 (c)(1),
(2) Date: Jul. 10, 2023

(87) PCT Pub. No.: WO2022/151934
PCT Pub. Date: Jul. 21, 2022

(65) Prior Publication Data
US 2024/0061569 A1     Feb. 22, 2024

(30) Foreign Application Priority Data

Jan. 13, 2021     (CN) .......................... 202110044342.3

(51) Int. Cl.
G06F 3/048        (2013.01)
G06F 3/0484       (2022.01)
(Continued)

(52) U.S. Cl.
CPC .......... G06F 3/0488 (2013.01); G06F 3/0484 (2013.01); G06F 9/451 (2018.02)

(58) Field of Classification Search
CPC ....... G06F 3/0488; G06F 9/451; G06F 3/0484
See application file for complete search history.

(56) References Cited

U.S. PATENT DOCUMENTS 7,321,700 B1     1/2008  Souchard
8,605,034 B1 *  12/2013  Roy ...................... G06F 1/1694
                                                            345/173
(Continued)

FOREIGN PATENT DOCUMENTS

CN        109144394 A      1/2019
CN        111813490 A     10/2020

OTHER PUBLICATIONS

Koo et al., An Image Resolution Enhancing Technique Using Adaptive Sub-Pixel Interpolation for Digital Still Camera System, 1999, IEEE, 6 pages. (Year: 1999).*
(Continued)

*Primary Examiner* — Linh K Pham

(57) ABSTRACT

In a method performed by a terminal device for performing frame interpolation in an interface display process, when a fling operation performed by a user on a display interface is received, the terminal starts display a sliding interface, which is a view in a first area of the display interface. The terminal device obtains input information that represents a fling direction, interface information of the display interface, sliding display information, and information about a plurality of image frames corresponding to the sliding interface. Based on the input information, the terminal device determines a frame interpolation policy based on the input information. The terminal device then performs, based on the information about the plurality of image frames, splicing and combination by using the frame interpolation policy to obtain one or more to-be-interpolated frames located between the plurality of image frames.

20 Claims, 33 Drawing Sheets

(51) Int. Cl.
    *G06F 3/0488*        (2022.01)
    *G06F 9/451*         (2018.01)

(56)            References Cited

U.S. PATENT DOCUMENTS

| 9,928,028 | B2 * | 3/2018 | Jung | G06F 3/04845 |
|---|---|---|---|---|
| 10,168,812 | B1 * | 1/2019 | Yates | G06F 3/04883 |
| 10,332,297 | B1 * | 6/2019 | Vadodaria | G06F 3/0482 |
| 10,826,583 | B2 | 11/2020 | Zhu et al. | |
| 2009/0322792 | A1 * | 12/2009 | Isoda | G06F 3/1219 |
| | | | | 345/661 |
| 2010/0013780 | A1 * | 1/2010 | Ikeda | G06F 3/04883 |
| | | | | 345/173 |
| 2010/0095240 | A1 * | 4/2010 | Shiplacoff | G06F 3/0481 |
| | | | | 345/157 |
| 2011/0175831 | A1 * | 7/2011 | Miyazawa | G06F 3/04883 |
| | | | | 345/173 |
| 2012/0131458 | A1 * | 5/2012 | Hayes | H04N 21/4788 |
| | | | | 345/173 |
| 2013/0127916 | A1 * | 5/2013 | Van Slembrouk | G06F 16/9577 |
| | | | | 345/660 |
| 2013/0208314 | A1 * | 8/2013 | Yamada | G06K 15/005 |
| | | | | 358/1.15 |
| 2014/0082486 | A1 * | 3/2014 | Ding | G06F 3/0483 |
| | | | | 715/251 |
| 2014/0098102 | A1 * | 4/2014 | Raffle | G06F 40/103 |
| | | | | 345/440 |
| 2014/0237420 | A1 * | 8/2014 | Song | G06F 3/04817 |
| | | | | 715/788 |
| 2014/0368875 | A1 * | 12/2014 | Sato | H04N 1/00474 |
| | | | | 358/1.15 |
| 2015/0015513 | A1 * | 1/2015 | Kwak | G06F 3/04886 |
| | | | | 345/173 |
| 2015/0227852 | A1 * | 8/2015 | Kanna | G06F 3/04883 |
| | | | | 706/11 |
| 2015/0268810 | A1 * | 9/2015 | Hoshino | G06F 3/017 |
| | | | | 345/589 |
| 2015/0332534 | A1 * | 11/2015 | Wang | H04L 51/52 |
| | | | | 705/12 |
| 2015/0346916 | A1 * | 12/2015 | Jisrawi | G06F 3/04883 |
| | | | | 715/752 |
| 2015/0346952 | A1 * | 12/2015 | Yang | G06F 3/0482 |
| | | | | 715/765 |
| 2016/0179322 | A1 * | 6/2016 | Nagata | G06F 3/0485 |
| | | | | 715/784 |
| 2016/0342301 | A1 * | 11/2016 | Kato | G06F 3/04883 |
| 2016/0349936 | A1 * | 12/2016 | Cho | G06F 3/04897 |
| 2017/0285843 | A1 * | 10/2017 | Roberts-Hoffman | |
| | | | | G06F 3/0485 |
| 2018/0267703 | A1 * | 9/2018 | Kamimaru | G06F 3/0485 |
| 2018/0335936 | A1 * | 11/2018 | Missig | G06F 3/0482 |
| 2018/0335939 | A1 * | 11/2018 | Karunamuni | G06F 9/445 |
| 2019/0073104 | A1 * | 3/2019 | Wang | G06F 3/04883 |
| 2019/0149650 | A1 * | 5/2019 | Tokuchi | G06F 3/017 |
| | | | | 455/466 |
| 2019/0346888 | A1 * | 11/2019 | Tokuchi | G06F 3/04883 |
| 2020/0293266 | A1 * | 9/2020 | German | G10L 13/08 |
| 2024/0053879 | A1 * | 2/2024 | Wang | G06F 3/04883 |

OTHER PUBLICATIONS

Csillag et al., Motion-Compensated Frame Rate Conversion Using an Accelerated Motion Model, 1996, IEEE, 4 pages. (Year: 1996).*

Zheng et al., Interactive Human Motion Acquisition from Video Sequences, 2000, IEEE, 9 pages. (Year: 2000).*

* cited by examiner

CONT.
FROM

TO

CONT. FROM FIG. 1(b)

Drawing

Input

↓

Animation

↓

Measurement

↓

Layout

↓

Drawing    ⟶    Rendering

Synchronization

↓

Rendering

↓

Storing in a buffer    ⟶    Combination

Obtaining an
execution result

↓

Combination

CPU    Drawing
instruction ⟶    GPU    Rasterization
processing ⟶    Caching

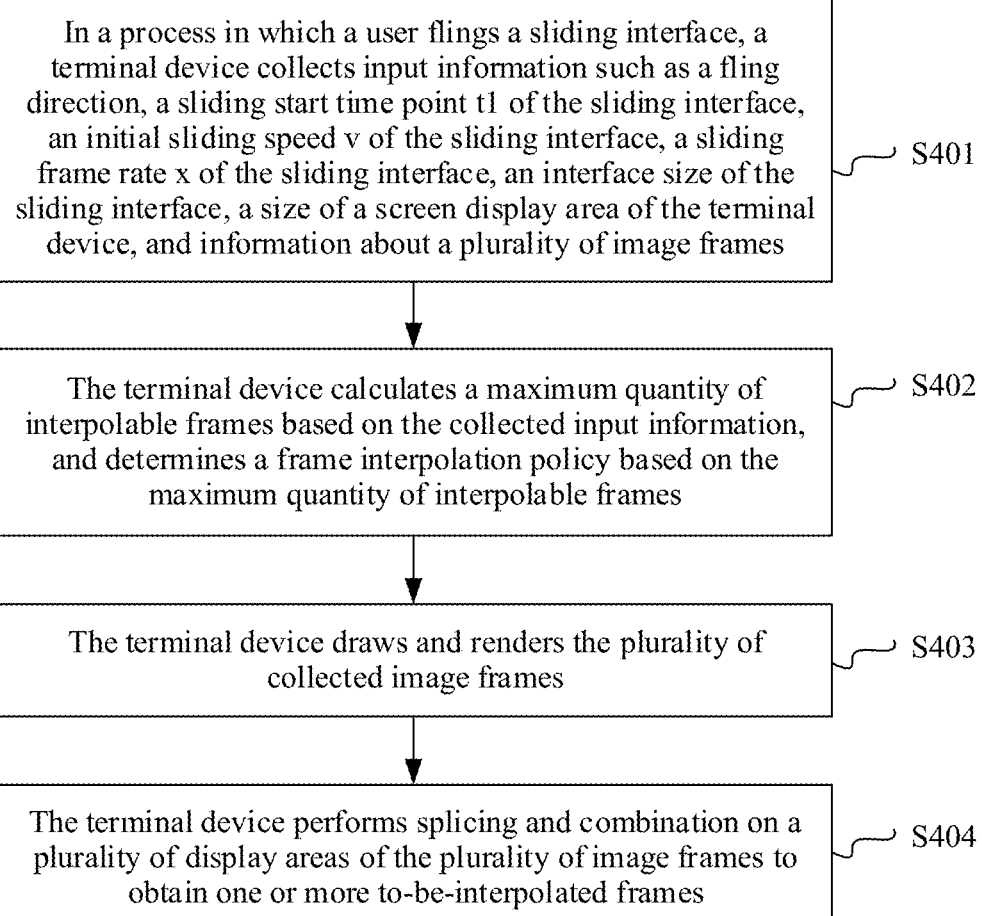

In a process in which a user flings a sliding interface, a terminal device collects input information such as a fling direction, a sliding start time point t1 of the sliding interface, an initial sliding speed v of the sliding interface, a sliding frame rate x of the sliding interface, an interface size of the sliding interface, a size of a screen display area of the terminal device, and information about a plurality of image frames S401

The terminal device calculates a maximum quantity of interpolable frames based on the collected input information, and determines a frame interpolation policy based on the maximum quantity of interpolable frames S402

The terminal device draws and renders the plurality of collected image frames S403

The terminal device performs splicing and combination on a plurality of display areas of the plurality of image frames to obtain one or more to-be-interpolated frames S404

FIG. 4

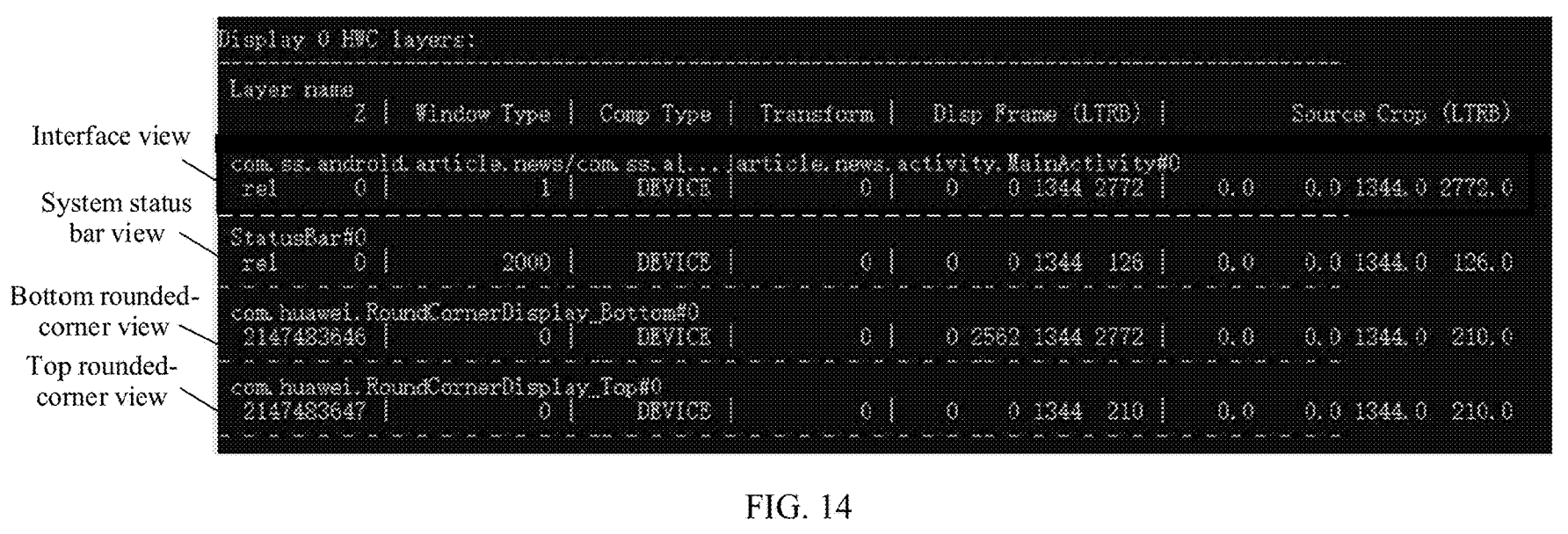

```
Display 0 HWC layers:
Layer name                                Z | Window Type | Comp Type | Transform | Disp Frame (LTRB)    | Source Crop (LTRB)
com.sec.android.article.news/com.es.al...[article.news.activity.MainActivity#0
rel                                       0 |    1        |  DEVICE   |     0     | 0 1344 272       | 0.0    0.0 1344.0 272.0
StatusBar#0
rel                                       0 |   2000      |  DEVICE   |     0     | 0 1344 128       | 0.0    0.0 1344.0 128.0
com.huawei.RoundCornerDisplay_Bottom#0
2147483646                                0 |    0        |  DEVICE   |     0     | 0 2582 1344 272  | 0.0    0.0 1344.0 210.0
com.huawei.RoundCornerDisplay_Top#0
2147483647                                0 |    0        |  DEVICE   |     0     | 0 1344 210       | 0.0    0.0 1344.0 210.0
```

Interface view

System status bar view

Bottom rounded-corner view

Top rounded-corner view

FIG. 14

F1 frame

To-be-interpolated frame

Fn frame

F1 frame

To-be-interpolated frame

CONT. FROM FIG. 16(a)-1

Layer 1

Round-corner view 1

Featured   Favorites   TV series   Movies   Variety shows   >

First area

Recommended >

| Video 1 | Video 2 |

CONT. FROM FIG. 16(a)-1

Popular >

| Video 3 | Video 4 |

| Video 5 | Video 6 |

View A

Fn frame

METHOD FOR PERFORMING FRAME INTERPOLATION IN INTERFACE DISPLAY PROCESS AND TERMINAL DEVICE

CROSS-REFERENCE TO RELATED APPLICATIONS

This application is a national stage of International Application No. PCT/CN2021/140405, filed on Dec. 22, 2021, which claims priority to Chinese Patent Application No. 202110044342.3, filed on Jan. 13, 2021. The aforementioned priority applications are hereby incorporated by reference in their entirety.

TECHNICAL FIELD

Embodiments of this application relate to the field of electronic technologies, and in particular, to a method for performing frame interpolation in an interface display process and a terminal device.

BACKGROUND

With advent of an era of a high refresh rate, a performance requirement on a terminal device is increasingly high. A refresh rate of the terminal device means a quantity of frames of images that can be displayed by the terminal device within one second. To display a frame of image, the terminal device first needs to complete drawing and rendering of the frame of image.

For example, if a refresh rate requirement is 60 Hz, the terminal device needs to complete drawing and rendering of a single frame within 16.6 milliseconds (ms). If a refresh rate requirement is 120 Hz, the terminal device needs to complete drawing and rendering of a single frame within 8.3 ms. Further, if a refresh rate requirement is 240 Hz, the terminal device needs to complete drawing and rendering of a single frame within 4.3 ms.

With an increasingly high refresh rate requirement, the terminal device processes more data per unit of time, and correspondingly power consumption of the terminal device is also increasingly high. For example, when the refresh rate requirement increases from 60 Hz to 120 Hz, data that needs to be processed by the terminal device per unit of time increases exponentially, and correspondingly power consumption of the terminal device almost increases exponentially. High power consumption accelerates power consumption of the terminal device.

SUMMARY

This application provides a method for performing frame interpolation in an interface display process and a terminal device, to improve interface display effect, reduce a power consumption speed of the terminal device, and improve user experience under a high refresh rate requirement.

To achieve the foregoing objectives, the following technical solutions are used in embodiments of this application.

According to a first aspect, a method for performing frame interpolation in an interface display process is provided. The method is applied to a terminal device. The method includes: when a fling operation performed by a user on a display interface is received, starting to slide for displaying a sliding interface, where the sliding interface is a view in a first area of the display interface; obtaining input information, where the input information represents a fling direction, interface information of the display interface, sliding display information, and information about a plurality of image frames corresponding to the sliding interface; determining a frame interpolation policy based on the input information; and performing, based on the information about the plurality of image frames, splicing and combination by using the frame interpolation policy, to obtain one or more to-be-interpolated frames, where the one or more to-be-interpolated frames are located between the plurality of image frames.

According to the technical solution provided in the first aspect, in a process in which an interface starts to slide in a direction for display with animation effect, the terminal device determines a specific frame interpolation policy based on the fling direction, interface information of a display interface, sliding display information, information about a plurality of image frames corresponding to the sliding interface, and the like. In this way, the terminal device interpolates one or more combined frames between the plurality of frames according to the determined frame interpolation policy, to reduce layer drawing and rendering loads of a user interface (user interface, UI) thread and a render thread (render thread) per unit of time. This reduces power consumption of the terminal device, and avoids jitter, freezing, and blurry display in the interface display process, thereby bringing good user experience to the user.

In a possible implementation, the input information includes the fling direction, a sliding start time point, an initial sliding speed, and a sliding frame rate of the sliding interface, an interface size of the sliding interface, a size of a screen display area of the terminal device, and the information about the plurality of image frames. In the solution provided in this application, the terminal device can determine the specific frame interpolation policy based on the collected input information such as the fling direction, the sliding start time point, the initial sliding speed, and the sliding frame rate of the sliding interface, the interface size of the sliding interface, the size of the screen display area of the terminal device, and the information about the plurality of image frames. In this way, the terminal device interpolates the one or more combined frames between the plurality of frames according to the determined frame interpolation policy.

In a possible implementation, the input information further includes information about an obstruction on the sliding interface. In the solution provided in this application, if the sliding interface is blocked by the obstruction, when determining the one or more to-be-interpolated frames, the terminal device considers the information about the obstruction, to avoid abnormal display of the obstruction.

In a possible implementation, the obstruction includes one or more of the following: a floating window, a floating box, a floating control, or a floating icon. In this application, the obstruction that obstructs the sliding interface can include but is not limited to the floating window, the floating box, the floating control, the floating icon, or the like.

In a possible implementation, the determining a frame interpolation policy based on the input information includes: determining a maximum quantity of interpolable frames based on the input information; and determining the frame interpolation policy based on the maximum quantity of interpolable frames. In the solution provided in this application, the terminal device can first determine, based on the input information, the maximum quantity of interpolated frames interpolated between the plurality of image frames, to further determine the frame interpolation policy based on the maximum quantity.

In a possible implementation, the frame interpolation policy includes a fixed frame interpolation policy and a variable frame interpolation policy. The fixed frame interpolation policy means interpolating a fixed quantity of to-be-interpolated frames between two adjacent image frames in the plurality of image frames. The variable frame interpolation policy means interpolating a variable quantity of to-be-interpolated frames between two adjacent image frames in the plurality of image frames. In this application, the terminal device can interpolate the to-be-interpolated frame between the plurality of image frames according to a plurality of frame interpolation policies, for example, the fixed frame interpolation policy or the variable frame interpolation policy.

In a possible implementation, the determining a maximum quantity of interpolable frames based on the input information includes: determining the maximum quantity of interpolable frames based on the sliding frame rate and maximum sliding duration of the sliding interface. The maximum sliding duration is determined based on the sliding start time point, the initial sliding speed, and a maximum sliding distance of the sliding interface. The maximum sliding distance is a width or a height of the display interface. In an implementation, the terminal device can determine the maximum quantity of interpolable frames based on the sliding frame rate and the maximum sliding duration of the sliding interface.

In a possible implementation, the determining the maximum quantity of interpolable frames based on the sliding frame rate and maximum sliding duration of the sliding interface includes: obtaining, through calculation, the maximum quantity of interpolable frames according to the following formula: $M=(max\_t/y)-1$. Herein, $y=1000/x$, x is the sliding frame rate, $max\_t$ is the maximum sliding duration, $max\_t$ is determined according to a formula $Fun(t1, max\_t, v)<max\_distance$, $t1$ is the sliding start time point, v is the initial sliding speed, and $max\_distance$ is the maximum sliding distance. In an implementation, the terminal device can determine, according to the foregoing formula, the maximum quantity of interpolable frames based on the sliding frame rate and the maximum sliding duration of the sliding interface.

In a possible implementation, the plurality of image frames includes a $1^{st}$ image frame and a last image frame in a sliding display process of the sliding interface. In an implementation, the terminal device can interpolate the to-be-interpolated frame between two obtained image frames.

In a possible implementation, the plurality of image frames each include a plurality of display areas. The solution provided in this application supports frame interpolation between the image frames including the plurality of display areas.

In a possible implementation, the performing, based on the information about the plurality of image frames, splicing and combination by using the frame interpolation policy, to obtain one or more to-be-interpolated frames includes: performing drawing and rendering based on the information about the plurality of image frames; and performing splicing and combination on the plurality of display areas of the plurality of image frames to obtain the one or more to-be-interpolated frames. In the solution provided in this application, the terminal device only needs to perform splicing and combination on the plurality of areas of the plurality of image frames to obtain the to-be-interpolated frame, and does not need to draw and render the to-be-interpolated frame. This can reduce drawing and rendering loads, and reduce power consumption of the terminal device.

In a possible implementation, the plurality of image frames each include a system status bar view and a sliding interface view on the display interface. Each corresponding position of the one or more to-be-interpolated frames includes the system status bar view and the sliding interface view. The solution provided in this application supports frame interpolation between the image frames including the plurality of display areas. For example, the image frame can include the system status bar view and the sliding interface view.

In a possible implementation, the plurality of image frames each include one or more navigation bar views on the display interface. Each corresponding position of the one or more to-be-interpolated frames includes the one or more navigation bar views. The solution provided in this application supports frame interpolation between the image frames including the plurality of display areas. For example, the image frame can include the navigation bar view.

In a possible implementation, the plurality of image frames each include one or more rounded-corner views. Each corresponding position of the one or more to-be-interpolated frames includes the one or more rounded-corner views. The solution provided in this application supports frame interpolation between the image frames including the plurality of display areas. For example, the image frame can include the rounded-corner view.

In a possible implementation, the plurality of image frames each include an obstruction view. Each corresponding position of the one or more to-be-interpolated frames includes the obstruction view. The solution provided in this application supports frame interpolation between the image frames including the plurality of display areas. For example, the image frame can include the obstruction view.

In a possible implementation, the plurality of image frames each include a view of a first desktop area of the terminal device. Each corresponding position of the one or more to-be-interpolated frames includes the view of the first desktop area. The solution provided in this application supports frame interpolation between the image frames including the plurality of display areas. For example, the image frame can include a view of a partial area on a desktop.

According to a second aspect, a terminal device is provided. The terminal device includes: a detection unit, configured to detect a fling operation performed by a user on a display interface; a display unit, configured to: when the detection unit detects the fling operation performed by the user on the display interface, start to slide for displaying a sliding interface, where the sliding interface is a view in a first area of the display interface; and a processing unit, configured to: obtain input information; determine a frame interpolation policy based on the input information; and perform, based on information about a plurality of image frames, splicing and combination by using the frame interpolation policy, to obtain one or more to-be-interpolated frames. The input information represents a fling direction, interface information of the display interface, sliding display information, and the information about the plurality of image frames corresponding to the sliding interface. The one or more to-be-interpolated frames are located between the plurality of image frames.

According to the technical solution provided in the second aspect, in a process in which an interface starts to slide in a direction for display with animation effect, the terminal device determines a specific frame interpolation policy based on the fling direction, interface information of a display interface, sliding display information, information about a plurality of image frames corresponding to the sliding interface, and the like. In this way, the terminal device interpolates one or more combined frames between the plurality of frames according to the determined frame interpolation policy, to reduce layer drawing and rendering loads of a UI thread and a render thread (render thread) per unit of time. This reduces power consumption of the terminal device, and avoids jitter, freezing, and blurry display in the interface display process, thereby bringing good user experience to the user.

In a possible implementation, the input information includes the fling direction, a sliding start time point, an initial sliding speed, and a sliding frame rate of the sliding interface, an interface size of the sliding interface, a size of a screen display area of the terminal device, and the information about the plurality of image frames. In the solution provided in this application, the terminal device can determine the specific frame interpolation policy based on the collected input information such as the fling direction, the sliding start time point, the initial sliding speed, and the sliding frame rate of the sliding interface, the interface size of the sliding interface, the size of the screen display area of the terminal device, and the information about the plurality of image frames. In this way, the terminal device interpolates the one or more combined frames between the plurality of frames according to the determined frame interpolation policy.

In a possible implementation, the input information further includes information about an obstruction on the sliding interface. In the solution provided in this application, if the sliding interface is blocked by the obstruction, when determining the one or more to-be-interpolated frames, the terminal device considers the information about the obstruction, to avoid abnormal display of the obstruction.

In a possible implementation, the obstruction includes one or more of the following: a floating window, a floating box, a floating control, or a floating icon. In this application, the obstruction that obstructs the sliding interface can include but is not limited to the floating window, the floating box, the floating control, the floating icon, or the like.

In a possible implementation, the processing unit is specifically configured to: determine a maximum quantity of interpolable frames based on the input information, and determine the frame interpolation policy based on the maximum quantity of interpolable frames. In the solution provided in this application, the terminal device can first determine, based on the input information, the maximum quantity of interpolated frames interpolated between the plurality of image frames, to further determine the frame interpolation policy based on the maximum quantity.

In a possible implementation, the frame interpolation policy includes a fixed frame interpolation policy and a variable frame interpolation policy. The fixed frame interpolation policy means interpolating a fixed quantity of to-be-interpolated frames between two adjacent image frames in the plurality of image frames. The variable frame interpolation policy means interpolating a variable quantity of to-be-interpolated frames between two adjacent image frames in the plurality of image frames. In this application, the terminal device can interpolate the to-be-interpolated frame between the plurality of image frames according to a plurality of frame interpolation policies, for example, the fixed frame interpolation policy or the variable frame interpolation policy.

In a possible implementation, the processing unit is specifically configured to determine the maximum quantity of interpolable frames based on the sliding frame rate and maximum sliding duration of the sliding interface. The maximum sliding duration is determined based on the sliding start time point, the initial sliding speed, and a maximum sliding distance of the sliding interface. The maximum sliding distance is a width or a height of the display interface. In an implementation, the terminal device can determine the maximum quantity of interpolable frames based on the sliding frame rate and the maximum sliding duration of the sliding interface.

In a possible implementation, the processing unit is specifically configured to obtain, through calculation, the maximum quantity of interpolable frames according to the following formula: $M=(max\_t/y)-1$. Herein, $y=1000/x$, x is the sliding frame rate, $max\_t$ is the maximum sliding duration, $max\_t$ is determined according to a formula $Fun(t1, max\_t, v)<max\_distance$, t1 is the sliding start time point, v is the initial sliding speed, and $max\_distance$ is the maximum sliding distance. In an implementation, the terminal device can determine, according to the foregoing formula, the maximum quantity of interpolable frames based on the sliding frame rate and the maximum sliding duration of the sliding interface.

In a possible implementation, the plurality of image frames includes a $1^{st}$ image frame and a last image frame in a sliding display process of the sliding interface. In an implementation, the terminal device can interpolate the to-be-interpolated frame between two obtained image frames.

In a possible implementation, the plurality of image frames each include a plurality of display areas. The solution provided in this application supports frame interpolation between the image frames including the plurality of display areas.

In a possible implementation, the processing unit is specifically configured to: perform drawing and rendering based on the information about the plurality of image frames, and perform splicing and combination on the plurality of display areas of the plurality of image frames to obtain the one or more to-be-interpolated frames. In the solution provided in this application, the terminal device only needs to perform splicing and combination on the plurality of areas of the plurality of image frames to obtain the to-be-interpolated frame, and does not need to draw and render the to-be-interpolated frame. This can reduce drawing and rendering loads, and reduce power consumption of the terminal device.

In a possible implementation, the plurality of image frames each include a system status bar view and a sliding interface view on the display interface. Each corresponding position of the one or more to-be-interpolated frames includes the system status bar view and the sliding interface view. The solution provided in this application supports frame interpolation between the image frames including the plurality of display areas. For example, the image frame can include the system status bar view and the sliding interface view.

In a possible implementation, the plurality of image frames each include one or more navigation bar views on the display interface. Each corresponding position of the one or more to-be-interpolated frames includes the one or more navigation bar views. The solution provided in this application supports frame interpolation between the image frames including the plurality of display areas. For example, the image frame can include the navigation bar view.

In a possible implementation, the plurality of image frames each include one or more rounded-corner views. Each corresponding position of the one or more to-be-interpolated frames includes the one or more rounded-corner views. The solution provided in this application supports frame interpolation between the image frames including the plurality of display areas. For example, the image frame can include the rounded-corner view.

In a possible implementation, the plurality of image frames each include an obstruction view. Each corresponding position of the one or more to-be-interpolated frames includes the obstruction view. The solution provided in this application supports frame interpolation between the image frames including the plurality of display areas. For example, the image frame can include the obstruction view.

In a possible implementation, the plurality of image frames each include a view of a first desktop area of the terminal device. Each corresponding position of the one or more to-be-interpolated frames includes the view of the first desktop area. The solution provided in this application supports frame interpolation between the image frames including the plurality of display areas. For example, the image frame can include a view of a partial area on a desktop.

According to a third aspect, a terminal device is provided. The terminal device includes: a memory, configured to store a computer program; and a processor, configured to execute the computer program, so as to enable the terminal device to perform, when the terminal device detects a fling operation performed by a user on a display interface, the following operations: starting to slide for displaying a sliding interface, obtaining input information, determining a frame interpolation policy based on the input information, and performing, based on information about a plurality of image frames, splicing and combination by using the frame interpolation policy, to obtain one or more to-be-interpolated frames. The sliding interface is a view in a first area of the display interface. The input information represents a fling direction, interface information of the display interface, sliding display information, and the information about the plurality of image frames corresponding to the sliding interface. The one or more to-be-interpolated frames are located between the plurality of image frames.

According to the technical solution provided in the third aspect, in a process in which an interface starts to slide in a direction for display with animation effect, the terminal device determines a specific frame interpolation policy based on the fling direction, interface information of a display interface, sliding display information, information about a plurality of image frames corresponding to the sliding interface, and the like. In this way, the terminal device interpolates one or more combined frames between the plurality of frames according to the determined frame interpolation policy, to reduce layer drawing and rendering loads of a UI thread and a render thread (render thread) per unit of time. This reduces power consumption of the terminal device, and avoids jitter, freezing, and blurry display in the interface display process, thereby bringing good user experience to the user.

In a possible implementation, the input information includes the fling direction, a sliding start time point, an initial sliding speed, and a sliding frame rate of the sliding interface, an interface size of the sliding interface, a size of a screen display area of the terminal device, and the information about the plurality of image frames. In the solution provided in this application, the terminal device can determine the specific frame interpolation policy based on the collected input information such as the fling direction, the sliding start time point, the initial sliding speed, and the sliding frame rate of the sliding interface, the interface size of the sliding interface, the size of the screen display area of the terminal device, and the information about the plurality of image frames. In this way, the terminal device interpolates the one or more combined frames between the plurality of frames according to the determined frame interpolation policy.

In a possible implementation, the input information further includes information about an obstruction on the sliding interface. In the solution provided in this application, if the sliding interface is blocked by the obstruction, when determining the one or more to-be-interpolated frames, the terminal device considers the information about the obstruction, to avoid abnormal display of the obstruction.

In a possible implementation, the obstruction includes one or more of the following: a floating window, a floating box, a floating control, or a floating icon. In this application, the obstruction that obstructs the sliding interface can include but is not limited to the floating window, the floating box, the floating control, the floating icon, or the like.

In a possible implementation, the processor is specifically configured to execute the computer program, so as to enable the terminal device to determine a maximum quantity of interpolable frames based on the input information, and determine the frame interpolation policy based on the maximum quantity of interpolable frames. In the solution provided in this application, the terminal device can first determine, based on the input information, the maximum quantity of interpolated frames interpolated between the plurality of image frames, to further determine the frame interpolation policy based on the maximum quantity.

In a possible implementation, the frame interpolation policy includes a fixed frame interpolation policy and a variable frame interpolation policy. The fixed frame interpolation policy means interpolating a fixed quantity of to-be-interpolated frames between two adjacent image frames in the plurality of image frames. The variable frame interpolation policy means interpolating a variable quantity of to-be-interpolated frames between two adjacent image frames in the plurality of image frames. In this application, the terminal device can interpolate the to-be-interpolated frame between the plurality of image frames according to a plurality of frame interpolation policies, for example, the fixed frame interpolation policy or the variable frame interpolation policy.

In a possible implementation, the processor is specifically configured to execute the computer program, so as to enable the terminal device to determine the maximum quantity of interpolable frames based on the sliding frame rate and maximum sliding duration of the sliding interface. The maximum sliding duration is determined based on the sliding start time point, the initial sliding speed, and a maximum sliding distance of the sliding interface. The maximum sliding distance is a width or a height of the display interface. In an implementation, the terminal device can determine the maximum quantity of interpolable frames based on the sliding frame rate and the maximum sliding duration of the sliding interface.

In a possible implementation, the processor is specifically configured to execute the computer program, so as to enable the terminal device to obtain, through calculation, the maximum quantity of interpolable frames according to the following formula: $M=(max\_t/y)-1$. Herein, $y=1000/x$, x is the sliding frame rate, $max\_t$ is the maximum sliding duration, $max\_t$ is determined according to a formula $Fun(t1, max\_t, v)<max\_distance$, t1 is the sliding start time point, v is the initial sliding speed, and $max\_distance$ is the maximum sliding distance. In an implementation, the terminal device can determine, according to the foregoing formula, the maximum quantity of interpolable frames based on the sliding frame rate and the maximum sliding duration of the sliding interface.

In a possible implementation, the plurality of image frames includes a $1^{st}$ image frame and a last image frame in a sliding display process of the sliding interface. In an implementation, the terminal device can interpolate the to-be-interpolated frame between two obtained image frames.

In a possible implementation, the plurality of image frames each include a plurality of display areas. The solution provided in this application supports frame interpolation between the image frames including the plurality of display areas.

In a possible implementation, the processor is specifically configured to execute the computer program, so as to enable the terminal device to perform drawing and rendering based on the information about the plurality of image frames, and perform splicing and combination on the plurality of display areas of the plurality of image frames to obtain the one or more to-be-interpolated frames. In the solution provided in this application, the terminal device only needs to perform splicing and combination on the plurality of areas of the plurality of image frames to obtain the to-be-interpolated frame, and does not need to draw and render the to-be-interpolated frame. This can reduce drawing and rendering loads, and reduce power consumption of the terminal device.

In a possible implementation, the plurality of image frames each include a system status bar view and a sliding interface view on the display interface. Each corresponding position of the one or more to-be-interpolated frames includes the system status bar view and the sliding interface view. The solution provided in this application supports frame interpolation between the image frames including the plurality of display areas. For example, the image frame can include the system status bar view and the sliding interface view.

In a possible implementation, the plurality of image frames each include one or more navigation bar views on the display interface. Each corresponding position of the one or more to-be-interpolated frames includes the one or more navigation bar views. The solution provided in this application supports frame interpolation between the image frames including the plurality of display areas. For example, the image frame can include the navigation bar view.

In a possible implementation, the plurality of image frames each include one or more rounded-corner views. Each corresponding position of the one or more to-be-interpolated frames includes the one or more rounded-corner views. The solution provided in this application supports frame interpolation between the image frames including the plurality of display areas. For example, the image frame can include the rounded-corner view.

In a possible implementation, the plurality of image frames each include an obstruction view. Each corresponding position of the one or more to-be-interpolated frames includes the obstruction view. The solution provided in this application supports frame interpolation between the image frames including the plurality of display areas. For example, the image frame can include the obstruction view.

In a possible implementation, the plurality of image frames each include a view of a first desktop area of the terminal device. Each corresponding position of the one or more to-be-interpolated frames includes the view of the first desktop area. The solution provided in this application supports frame interpolation between the image frames including the plurality of display areas. For example, the image frame can include a view of a partial area on a desktop.

According to a fourth aspect, a computer-readable storage medium is provided. The computer-readable storage medium stores computer program code. When the computer program code is executed by a processor, the method according to any possible implementation of the first aspect is implemented.

According to a fifth aspect, a chip system is provided. The chip system includes a processor and a memory. The memory stores computer program code. When the computer program code is executed by the processor, the method according to any possible implementation of the first aspect is implemented. The chip system may include a chip, or may include a chip and another discrete component.

According to a sixth aspect, a computer program product is provided. When the computer program product runs on a computer, the method according to any possible implementation of the first aspect is implemented.

BRIEF DESCRIPTION OF DRAWINGS

FIG. 4 is a flowchart of a method for performing frame interpolation in an interface display process according to an embodiment of this application;

FIG. 14 is an example diagram of a combination progress of an image frame according to an embodiment of this application;

FIG. 16(a)-1 to FIG. 16(b)-2 are a schematic diagram of a method for splicing a to-be-interpolated frame according to an embodiment of this application;

DESCRIPTION OF EMBODIMENTS

The following describes the technical solutions in embodiments of this application with reference to the accompanying drawings in embodiments of this application. In descriptions in embodiments of this application, "I" means "or" unless otherwise specified. For example, A/B may represent A or B. In this specification, "and/or" describes only an association relationship of associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the description in embodiments, unless otherwise specified, "a plurality of" means two or more.

Embodiments of this application provide a method for performing frame interpolation in an interface display process. The method may be applied to a process in which a terminal device performs interface display in response to a fling (fling) operation performed by a user on an interface.

Figure 1A:
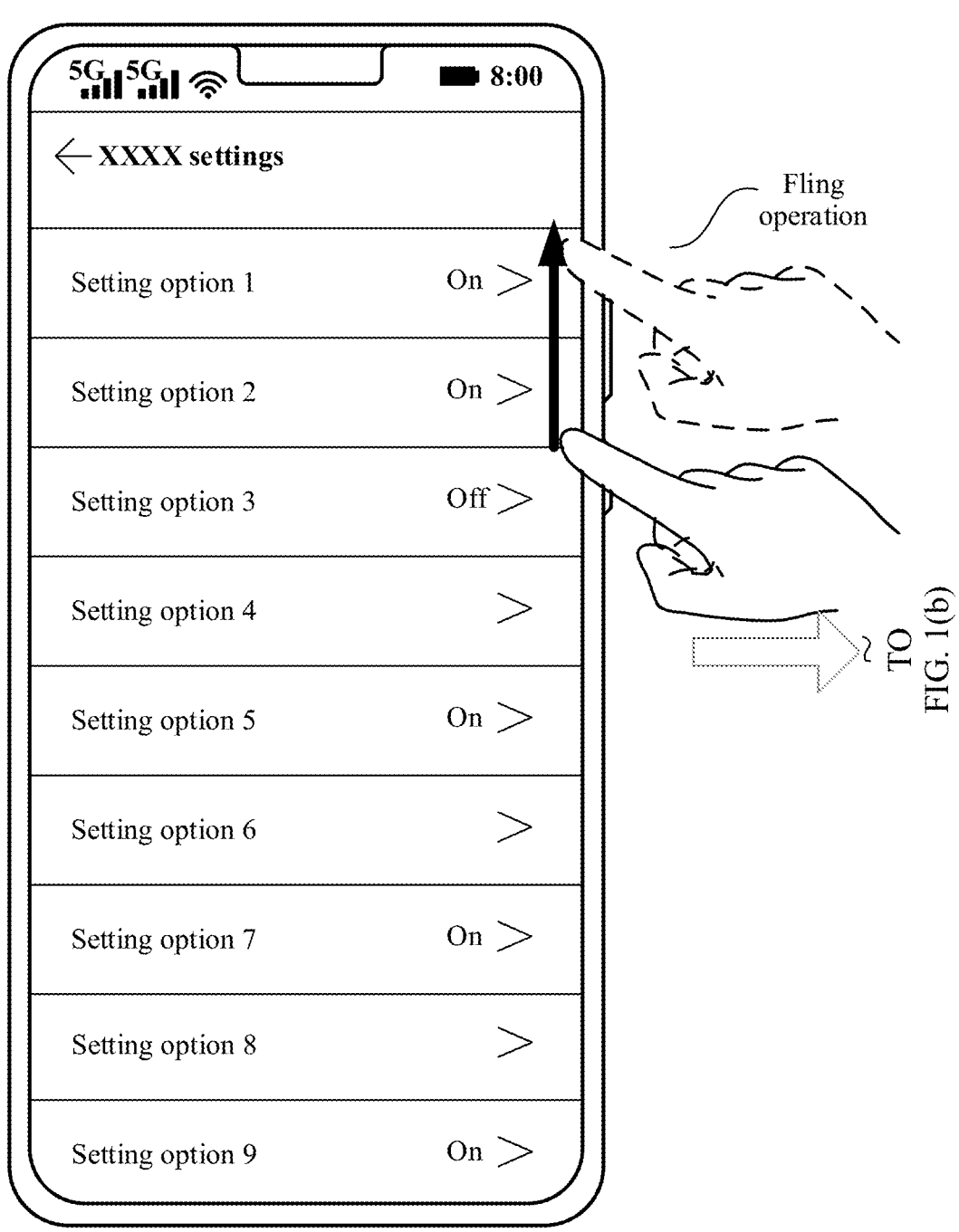
FIG. 1(a) to FIG. 1(c) are an example diagram of a process in which a terminal device performs interface display in response to a fling operation performed by a user on an interface according to an embodiment of this application.
Figures 1A, 1B, 1C:
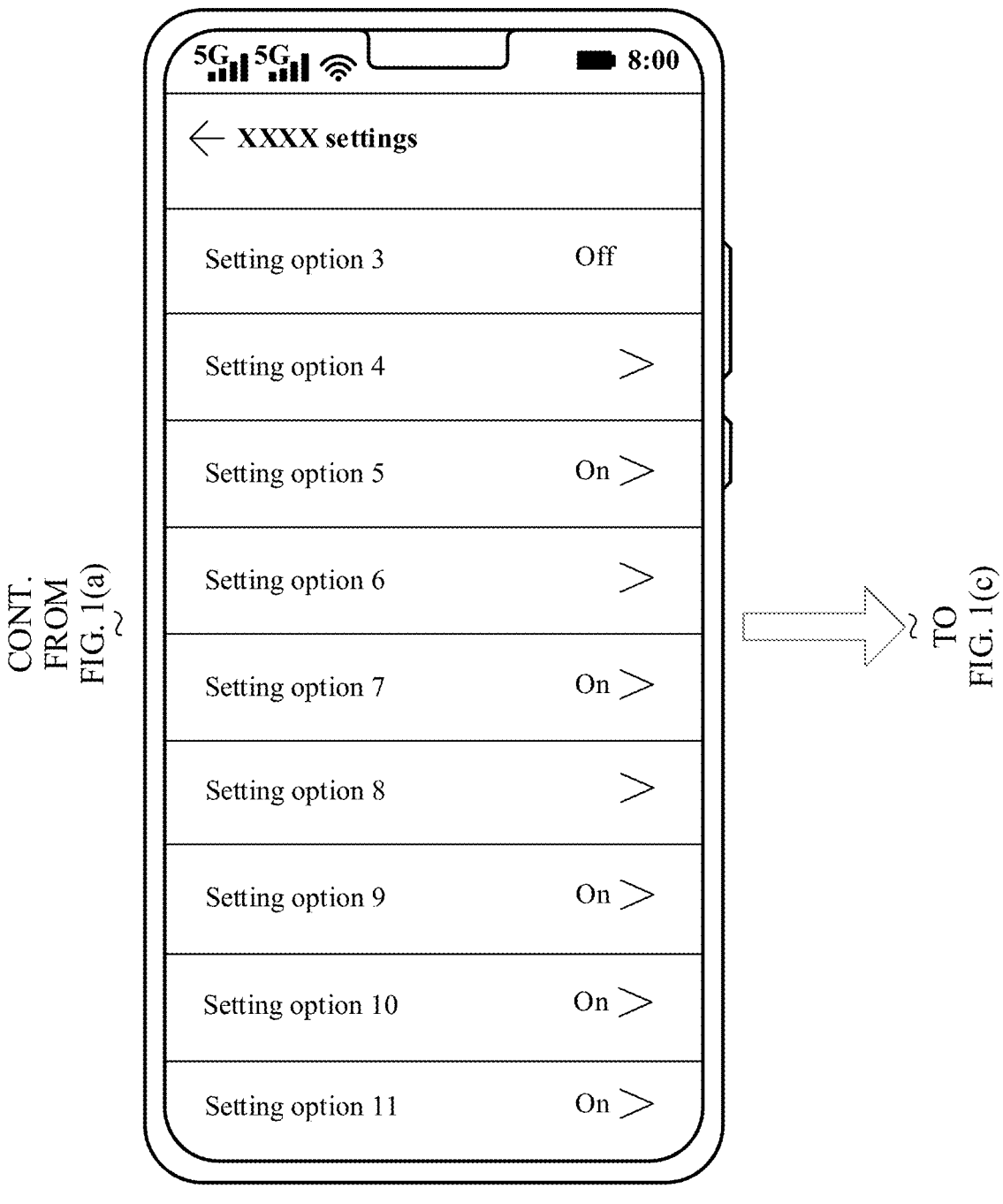
Figure 1C:
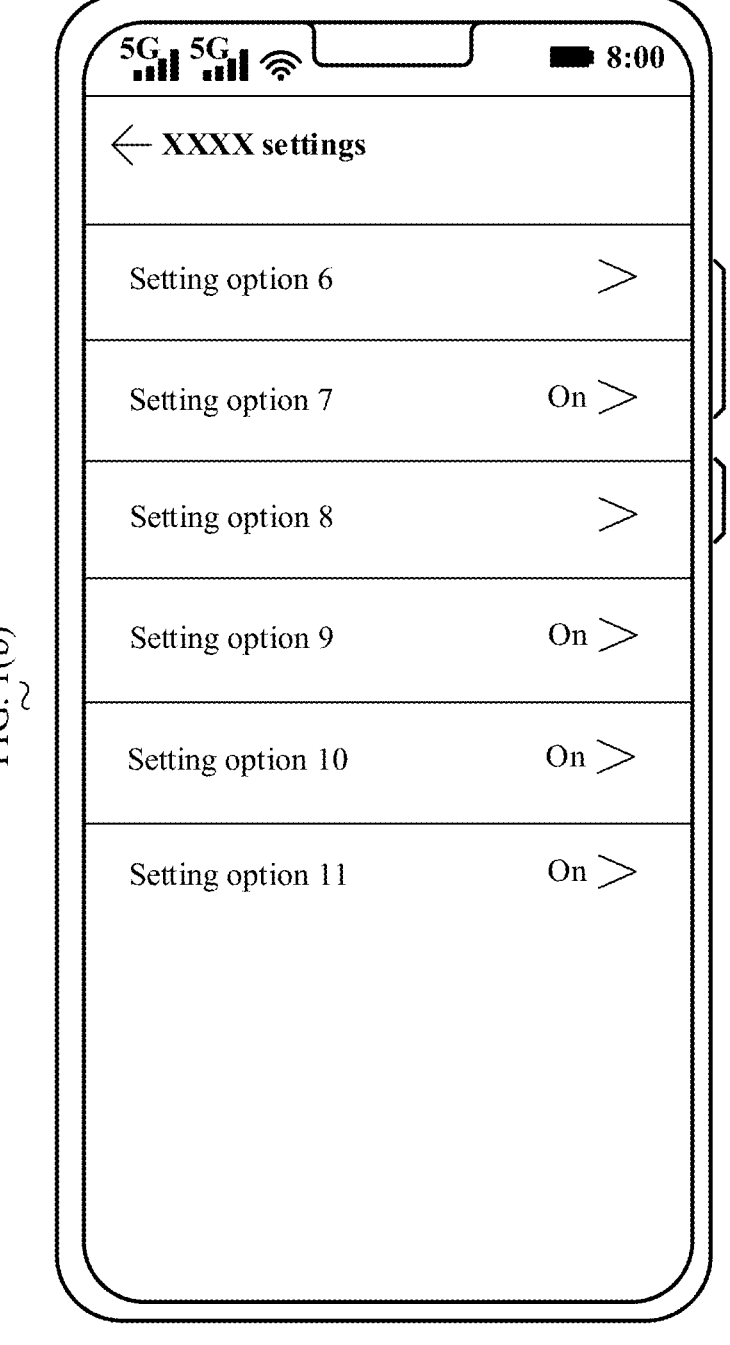

The fling operation performed by the user on the interface is usually an operation of quickly sliding the interface of the terminal device with a finger on a screen. In addition, for the fling operation, after a hand of the user leaves the screen, the screen still slides in a sliding direction of the finger with "inertia", to display an animation interface until the animation interface stops. FIG. 1(a) to FIG. 1(c) are an example diagram of a process in which a terminal device performs interface display in response to a fling operation performed by a user on an interface according to an embodiment of this application. As shown in FIG. 1(a), when displaying a settings interface, a smartphone detects a fling operation performed by the user on the settings interface from bottom to top. In response to the fling operation, in a process in which the user performs the fling operation, after a finger of the user leaves a screen of the smartphone, the smartphone slides in a fling direction of the finger with "inertia", to display an animation interface on which the settings interface slides. Finally, the animation interface stops. For example, the animation interface includes a process shown from FIG. 1(a) to FIG. 1(b) and then to FIG. 1(c). An interface shown in FIG. 1(a) is an animation start interface, and an interface shown in FIG. 1(c) is an animation stop interface. The method for performing frame interpolation in an interface display process provided in embodiments of this application may be used in the process shown from FIG. 1(a) to FIG. 1(b) and then to FIG. 1(c).

It should be noted that the method for performing frame interpolation in an interface display process provided in embodiments of this application may be applied to a process of displaying an interface with animation effect, for example, applied to a slidable interface. For example, the slidable interface may be the settings interface shown in FIG. 1(a) to FIG. 1(c). The slidable interface may be alternatively an interface of any other application, including an interface of an application (for example, a gallery application, a messaging application, an address book application, a music application, or a video application) installed on the terminal device when an operating system is installed on the terminal device before delivery, an interface of an application (for example, a map application, an email application, Toutiao®, or WeChat®) downloaded from an application store and installed on the terminal device by the user, or the like. This is not limited in this application.

The terminal device in embodiments of this application may be the smartphone shown in FIG. 1(a) to FIG. 1(c), or may be another electronic device that supports a screen touch operation. For example, the terminal device may be alternatively a netbook, a tablet computer, a smart camera, a palmtop computer, a smartwatch, a personal digital assistant (personal digital assistant, PDA), a portable multimedia player (portable multimedia player, PMP), or an augmented reality (augmented reality, AR)/virtual reality (virtual reality, VR) device. Alternatively, the terminal device may be another type or structure of electronic device that supports a screen touch operation. This is not limited in this application.

Figure 2:
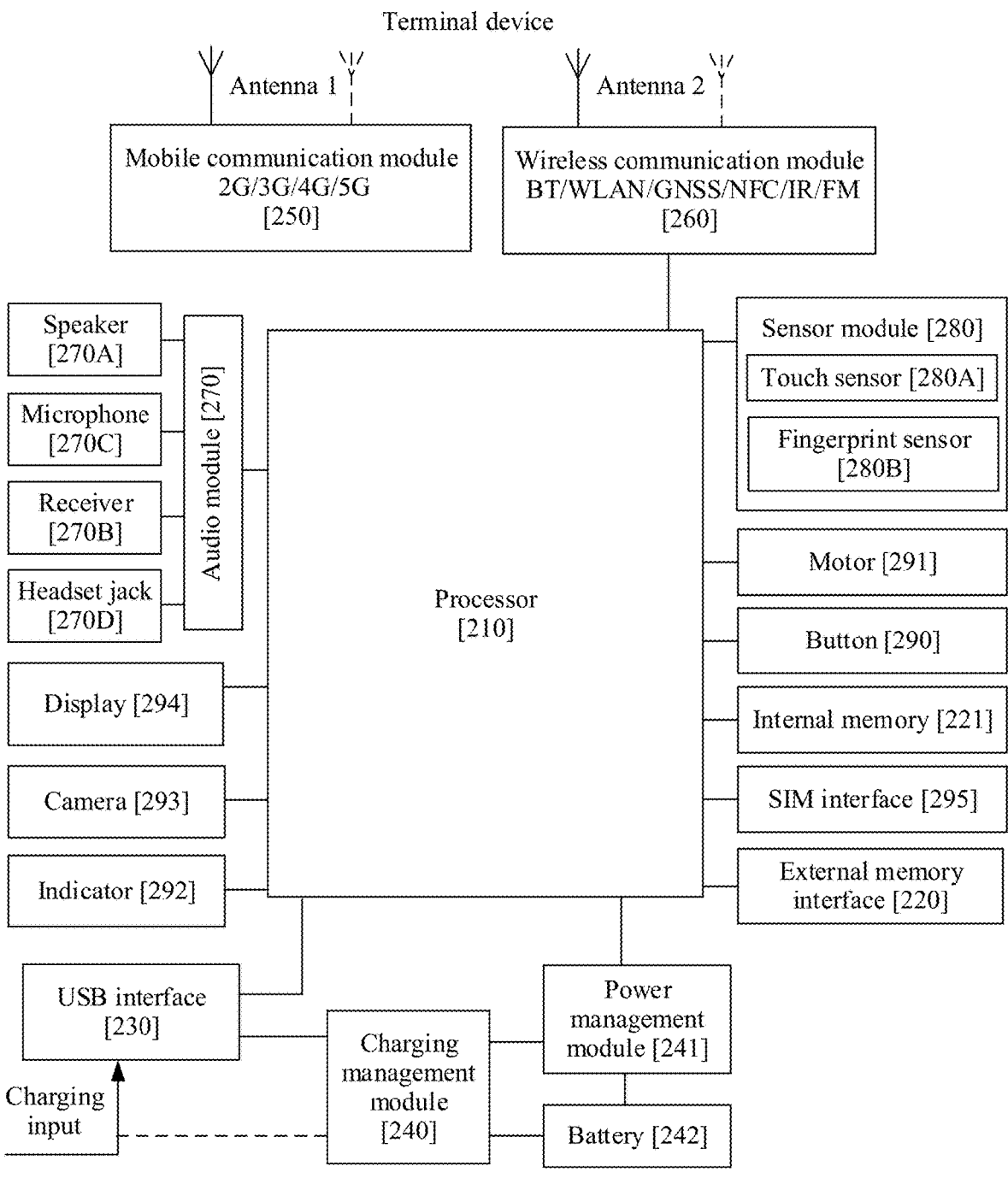
FIG. 2 is a schematic diagram of a hardware structure of a terminal device according to an embodiment of this application.

FIG. 2 is a schematic diagram of a hardware structure of a terminal device according to an embodiment of this application by using a smartphone as an example. As shown in FIG. 2, the terminal device may include a processor 210, a memory (including an external memory interface 220 and an internal memory 221), a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (subscriber identification module, SIM) card interface 295, and the like. The sensor module 280 may include a touch sensor 280A and a fingerprint sensor 280B. Further, in some embodiments, the sensor module 280 may further include one or more of a gyro sensor, an acceleration sensor, a magnetic sensor, a pressure sensor, a barometric pressure sensor, a distance sensor, an optical proximity sensor, a temperature sensor, an ambient light sensor, a bone conduction sensor, or the like.

It may be understood that the structure shown in this embodiment of the present invention constitutes no specific limitation on the terminal device. In some other embodiments of this application, the terminal device may include more or fewer components than those shown in the figure, some components may be combined, some components may be split, or there may be a different component layout. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the terminal device. The controller may complete instruction fetching according to an instruction, generate an operation control signal, and execute control of the instruction.

A memory may be further disposed in the processor 210, and is configured to store instructions and data. In some embodiments, the memory in the processor 210 is a cache. The memory may store an instruction or data just used or cyclically used by the processor 210. If the processor 210 needs to use the instruction or the data again, the processor 210 may directly invoke the instruction or the data from the memory. This avoids repeated access and reduces a waiting time of the processor 210, thereby improving system efficiency.

In some embodiments, the processor 210 may be a general-purpose central processing unit (central processing unit, CPU), a microprocessor, an application-specific integrated circuit (application-specific integrated circuit, ASIC), or one or more integrated circuits configured to control program execution of the solutions in this application. The processor 210 may include one or more CPUs. For example, the processor 210 may be a Kirin 960 chip manufactured by Huawei Technologies Co., Ltd.

In some embodiments of this application, the CPU may be configured to draw an image frame.

In some other embodiments of this application, the GPU may be configured to draw an image frame.

In some embodiments of this application, further, the GPU may be further configured to render the image frame after completing drawing of the image frame.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 240 is configured to receive a charging input from a charger. The charger may be a wireless or wired charger. In some embodiments of wired charging, the charging management module 240 may receive a charging input from the wired charger through the USB interface 230. In some embodiments of wireless charging, the charging management module 240 may receive a wireless charging input through a wireless charging coil of the terminal device. When charging the battery 242, the charging management module 240 may further supply power to the terminal device by using the power management module 241.

The power management module 241 is configured to connect the battery 242 and the charging management module 240 to the processor 210. The power management module 241 receives an input from the battery 242 and/or an input from the charging management module 240, and supplies power to the processor 210, the internal memory 221, the display 294, the camera 293, the wireless communication module 260, and the like. The power management module 241 may be further configured to monitor parameters such as a battery capacity, a battery cycle count, and a battery health status (electric leakage and impedance). In some embodiments, the power management module 241 may be alternatively disposed in the processor 210. In some other embodiments, the power management module 241 and the charging management module 240 may be alternatively disposed in a same component.

A wireless communication function of the terminal device may be implemented by using the antenna 1, the antenna 2, the mobile communication module 250, the wireless communication module 260, the modem processor, the baseband processor, and the like.

The antenna 1 and the antenna 2 are configured to transmit and receive an electromagnetic wave signal. Each antenna in the terminal device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 250 may provide a solution that includes wireless communication such as 2G, 3G, 4G, and 5G and that is applied to the terminal device. The mobile communication module 250 may include at least one filter, a switch, a power amplifier, a low noise amplifier (low noise amplifier, LNA), and the like. The mobile communication module 250 may receive an electromagnetic wave through the antenna 1, perform processing such as filtering and amplification on the received electromagnetic wave, and transmit a processed electromagnetic wave to the modem processor for demodulation. The mobile communication module 250 may further amplify a signal modulated by the modem processor, and convert an amplified signal into an electromagnetic wave for radiation through the antenna 1. In some embodiments, at least some function modules of the mobile communication module 250 may be disposed in the processor 210. In some embodiments, at least some function modules of the mobile communication module 250 may be disposed in a same component as at least some modules of the processor 210.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transferred to the application processor. The application processor outputs a sound signal by using an audio device (which is not limited to the speaker 270A, the receiver 270B, or the like), or displays an image or a video through the display 294. In some embodiments, the modem processor may be an independent component. In some other embodiments, the modem processor may be independent of the processor 210, and is disposed in a same component as the mobile communication module 250 or another function module.

The wireless communication module 260 may provide a solution that includes wireless communication such as a wireless local area network (wireless local area network, WLAN) (for example, a Wi-Fi network), Bluetooth BT, a global navigation satellite system (global navigation satellite system, GNSS), frequency modulation (frequency modulation, FM), a near field communication (near field communication, NFC) technology, and an infrared (infrared, IR) technology and that is applied to the terminal device. The wireless communication module 260 may be one or more components integrating at least one communication processing module. The wireless communication module 260 receives an electromagnetic wave through the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert a processed signal into an electromagnetic wave for radiation through the antenna 2.

In some embodiments, in the terminal device, the antenna 1 is coupled to the mobile communication module 250, and the antenna 2 is coupled to the wireless communication module 260, so that the terminal device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-synchronous code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The terminal device implements a display function by using the GPU, the display 294, the application processor, and the like. The GPU is a microprocessor for image processing, and is connected to the display 294 and the application processor. The GPU is configured to: perform mathematical and geometric computation, and render an image. The processor 210 may include one or more GPUs that execute program instructions to generate or change display information.

The display 294 is configured to display an image, a video, and the like. The display 294 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the terminal device may include one or N displays 294, where N is a positive integer greater than 1.

In this embodiment of this application, the GPU may be configured to render an application interface. Correspondingly, the display 194 may be configured to display the application interface rendered by the GPU. In some embodiments of this application, the GPU may be configured to render the image frame after the CPU completes drawing the image frame. In some embodiments of this application, further, the image frame rendered by the GPU may be sent to the display 294 for display.

The terminal device may implement a photographing function by using the ISP, the camera 293, the video codec, the GPU, the display 294, the application processor, and the like.

The external memory interface 220 may be configured to connect to an external storage card, for example, a micro SD card, to extend a storage capability of the terminal device. The external storage card communicates with the processor 210 through the external memory interface 220, to implement a data storage function. For example, files such as music and videos are stored in the external storage card.

The internal memory 221 may be configured to store computer-executable program code. The executable program code includes instructions. The internal memory 221 may include a program storage area and a data storage area. The program storage area may store an operating system, an application required by at least one function (for example, a sound playing function or an image playing function), and the like. The data storage area may store data (for example, audio data and a phone book) and the like created when the terminal device is used. In addition, the internal memory 221 may include a high-speed random access memory, or may include a non-volatile memory, for example, at least one magnetic disk storage device, a flash memory, or a universal flash storage (universal flash storage, UFS). The processor 210 runs the instructions stored in the internal memory 221 and/or the instructions stored in the memory disposed in the processor, to perform various function applications of the terminal device and data processing.

The touch sensor 280A may also be referred to as a "touch panel". The touch sensor 280A may be disposed on the display 294. The touch sensor 280A and the display 294 constitute a touchscreen that is also referred to as a "touch screen". The touch sensor 280A is configured to detect a touch operation performed on or near the touch sensor 280A. The touch sensor 280A may transfer the detected touch operation to the application processor, to determine a type of a touch event. The terminal device may provide, by using the display 294, a visual output related to the touch operation, and the like. In some other embodiments, the touch sensor 280A may be alternatively disposed on a surface of the terminal device at a position different from that of the display 294. In this embodiment of this application, the touch sensor 280A of the terminal device may be configured to detect a sliding operation, for example, a fling operation, of a user on the display of the terminal device.

The fingerprint sensor 280B is configured to collect a fingerprint. The terminal device may use a feature of the collected fingerprint to implement fingerprint-based unlocking, application lock access, fingerprint-based photographing, fingerprint-based call answering, and the like.

The terminal device may implement an audio function, for example, music playing or recording by using the audio module 270, the speaker 270A, the receiver 270B, the microphone 270C, the application processor, and the like. For specific working principles and functions of the audio module 270, the speaker 270A, the receiver 270B, and the microphone 270C, refer to descriptions in a conventional technology.

The button 290 includes a power button, a volume button, and the like. The button 290 may be a mechanical button, or a touch button. The terminal device may receive a button input, and generate a button signal input related to a user setting and function control of the terminal device.

It should be understood that hardware modules included in the terminal device shown in FIG. 2 are merely described as examples, and do not limit a specific structure of the terminal device. For example, the terminal device may alternatively include more or fewer components than those shown in FIG. 2, or two or more components may be combined, or there may be a different component configuration. The components shown in FIG. 2 may be implemented in hardware including one or more signal processing and/or application-specific integrated circuits, software, or a combination of hardware and software.

The following specifically describes, with reference to the accompanying drawings, the method for performing frame interpolation in an interface display process provided in embodiments of this application.

Figure 3A:
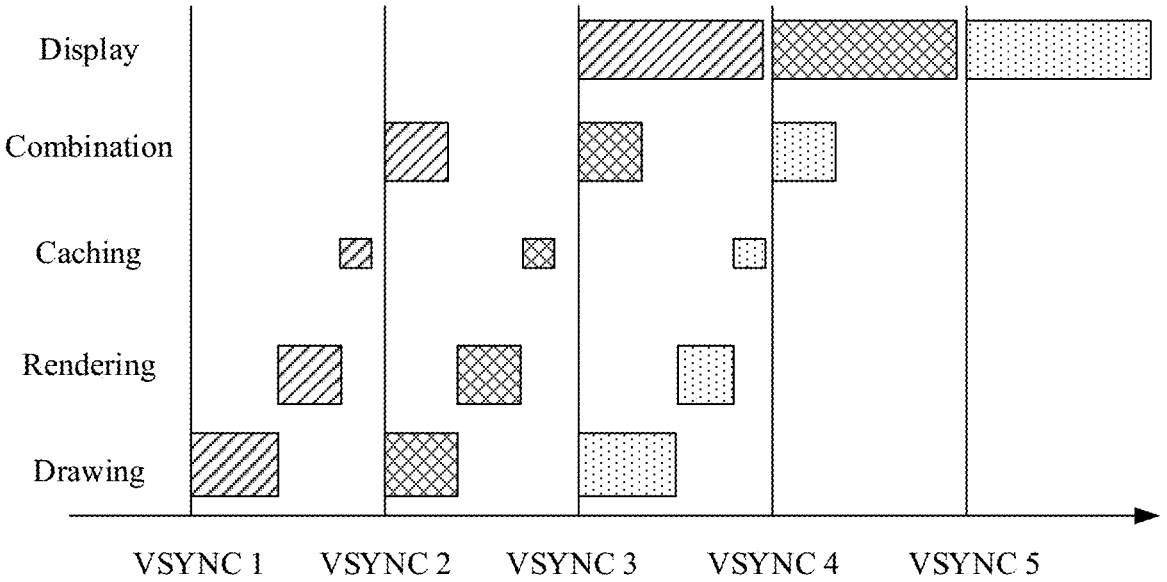
FIG. 3A is an example diagram of an interface display processing process according to an embodiment of this application.

An interface display procedure of the Android (Android) operating system is used as an example. As shown in FIG. 3A, the interface display procedure usually needs to include drawing, rendering, caching, combination, and sending for display.

Figure 3B:
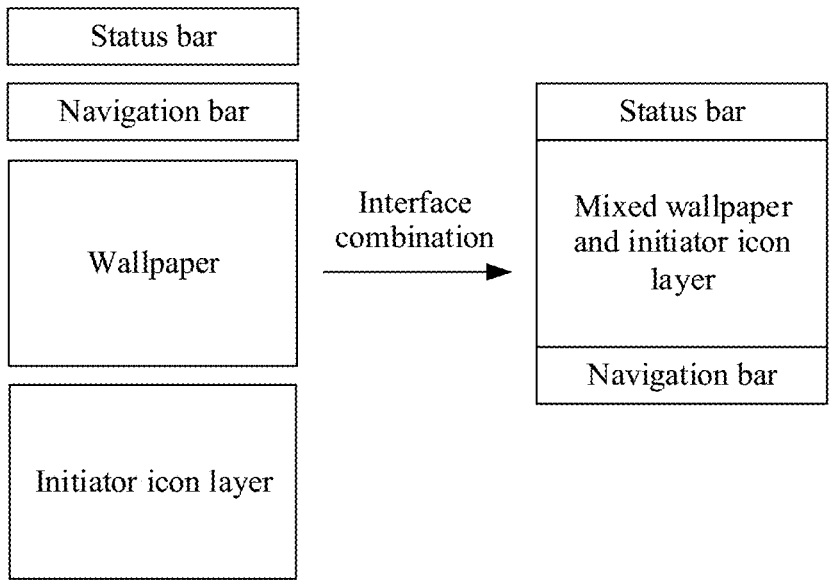
FIG. 3B is an example diagram of a structure of an application interface according to an embodiment of this application.
Figures 3C, 3D:
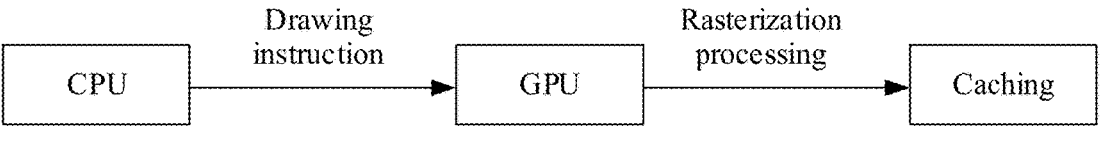
FIG. 3C is an example diagram of specific processes of drawing, rendering, and composition according to an embodiment of this application.
FIG. 3D is an example diagram of processes of rendering and caching according to an embodiment of this application.

The drawing is mainly used to draw a to-be-displayed layer. The drawing is essentially pixel filling. An application, namely, a launcher application, that is first started after the Android operating system is started and that is used to display an application list, a shortcut, a widget, and the like is used as an example. As shown in FIG. 3B, it is assumed that an interface of the launcher application includes four layers: a status bar, a navigation bar, a wallpaper, and an initiator icon layer. The drawing is mainly to draw the status bar, the navigation bar, the wallpaper, and the initiator icon layer. For example, the drawing of the status bar, the navigation bar, the wallpaper, and the initiator icon layer may be completed by a user interface (user interface, UI) thread. For another example, the status bar and the navigation bar may be drawn by a system user interface thread (system user interface thread, system UI) of Android, the wallpaper may be provided by a wallpaper service, and the initiator icon layer may be drawn by the launcher application. In FIG. 3C, an example in which the UI thread is responsible for the foregoing drawing is used.

For example, in some embodiments, as shown in FIG. 3C, the drawing may specifically include the following processes:

input, used to transfer an input event to a corresponding object for processing;

animation, used to calculate a motion position of each frame of animation;

measurement, used to obtain and store a size of each View and a size of each ViewGrop based on settings of a control attribute in an XML layout file and code;

layout, used to determine a display position of a control based on information obtained in the measurement; and drawing, used to draw all layers in an application window on a canvas (canvas) after the display position of the control is determined, and construct a drawing instruction.

The rendering is mainly used to adjust, for example, brightness, contrast, and saturation of a drawn layer without changing a status of an original layer. For example, as shown in FIG. 3D, the rendering may specifically include: A GPU receives, from a CPU, the drawing instruction obtained by the CPU in the drawing, the GPU performs rasterization processing on the layer, and the GPU caches, in a buffer, an image obtained through a rasterization operation. Rasterization is a process of converting a graphic element into a two-dimensional image. Each point on the two-dimensional image includes data such as a color, a depth, and a texture. Further, in some embodiments, after obtaining the drawing instruction in the drawing, the CPU may further send the drawing instruction to a graphics and image processing library (for example, an OpenGL for Embedded Systems (OpenGL for Embedded Systems, OpenGL ES)). The GPU may obtain the drawing instruction from the graphics and image processing library through a driver interface, and then further perform rasterization processing. As shown in FIG. 3C, the rendering may specifically include the following processes: synchronization, used to synchronize, from the CPU, the drawing instruction after the drawing; rendering, used to adjust, for example, the brightness, the contrast, and the saturation of the drawn layer; and storing in a buffer, used to store an execution result of the rendering in the buffer.

The caching is mainly used to store a rendered layer, so that when needing to read data (for example, data of the rendered layer), hardware or software first obtains required data (for example, the execution result of the rendering) from the buffer, to help the hardware or software run faster. In this embodiment of this application, the caching can alleviate a problem that an end user perceives freezing because data is not sent for display when a thread is busy.

The combination is mainly used to superpose and merge a plurality of rendered layers, for example, data of the rendered layers obtained from the buffer, in an appropriate overlapping order and the like, to obtain a complete image frame. As shown in FIG. 3B, drawn status bar, navigation bar, wallpaper, and initiator icon layer are superposed and merged in an appropriate overlapping order and the like, to obtain a complete image frame. As shown in FIG. 3C, the combination may specifically include the following processes: obtaining an execution result, used to obtain the execution result of the rendering stored in the buffer; and combination, used to superpose and merge the plurality of rendered layers in the appropriate overlapping order and the like, to obtain the complete image frame.

The sending for display is mainly used to send a combined layer to the display for display based on a specified display area.

For specific processes and descriptions of the drawing, the rendering, the caching, the combination, and the sending for display, refer to explanations and descriptions in a conventional technology. Details are not described in this application.

For example, in this embodiment of this application, the foregoing drawing, rendering, caching, combination, and sending for display may be triggered by a vertical synchronization (vertical synchronization, VSYNC) signal. As shown in FIG. 3A, with receiving of VSYNC signals (VSYNC 1, VSYNC 2, VSYNC 3, VSYNC 4, and VSYNC 5 shown in FIG. 3A), a terminal device continuously performs drawing, rendering, caching, combination, and sending for display on the layer. The VSYNC signals are signals that are sent (for example, sent at intervals of 16 ms) by the Android operating system and that are used to trigger the drawing, the rendering, the caching, the combination, and the sending for display.

Usually, there are two types of VSYNC signals in the Android operating system: a hardware VSYNC signal and a software VSYNC signal. The hardware VSYNC signal is generated by a display of the terminal device, and the hardware VSYNC signal is usually a pulse signal, and functions to enable/disable or trigger an operation. The software VSYNC signal is obtained by converting the hardware VSYNC signal by a SurfaceFlinger (SurfaceFlinger). The SurfaceFlinger (SurfaceFlinger) is a module that is responsible for combination of graphic display data and that is in the Android operating system. In the example of the display procedure shown in FIG. 3A, the VSYNC signal is a software VSYNC signal, and the VSYNC signal is a signal that is used to trigger the drawing, the rendering, the combination, and the sending for display and that is transferred to a Choreographer by using a Binder. For specific descriptions of the VSYNC signal, refer to explanations and descriptions in a conventional technology.

Usually, in an interface display process, drawing and rendering of a layer need to consume most resources (including hardware resources and software resources) and computing power. For example, drawing of the layer is usually completed by the CPU, and rendering of the layer is usually completed by the GPU. For another example, both drawing and rendering of the layer may be alternatively completed by the GPU. This is not limited in this application.

With an increasingly high refresh rate requirement, more data needs to be processed per unit of time, and duration spent on processing each frame of image becomes shorter. As shown in the following Table 1, more data needs, based on an increasingly high refresh rate requirement for the Android operating system, to be processed between two VSYNC signals, and duration spent on processing each frame of image becomes shorter.

TABLE 1

| Refresh rate | Single-frame required duration | Average single-frame required duration |
| --- | --- | --- |
| 60 Hz | 16.6 ms | 11 ms |
| 90 Hz | 11.11 ms | 9.3 ms |
| 120 Hz | 8.3 ms | 7.5 ms |
| 240 Hz | 4.15 ms | 5 ms to 6 ms estimated |

As shown in Table 1, for a refresh rate requirement of 60 Hz, the duration spent on processing each frame of image is approximately 16.6 ms. For a refresh rate requirement of 240 Hz, the duration spent on processing each frame of image is approximately 4.15 ms only. However, it is difficult for the CPU and the GPU to reach, based on existing hardware and software processing capabilities of the terminal device, image drawing and rendering speeds required by the single-frame required duration requirements. For example, for a refresh rate requirement of 240 Hz, it is difficult to complete drawing and rendering of a single frame within 4.15 ms based on the existing hardware and software processing capabilities of the terminal device. However, timeout of drawing and rendering of the single frame of image causes jitter, freezing, smearing, or the like during interface display. In addition, an increasingly high refresh rate requirement causes an exponential increase in data that needs to be processed by the CPU and the GPU of the terminal device per unit of time. The CPU and the GPU are overloaded, and correspondingly power consumption of the terminal device almost increases exponentially. Jitter, freezing, and blurry display during interface display and high power consumption of the terminal device result in poor user experience.

To resolve the foregoing problem, this application provides a method for performing frame interpolation in an interface display process. In the method, in a process in which an interface slides in a direction for display with animation effect, one or more combined frames are interpolated between a plurality of frames based on a sliding display direction, a distance, a change area, frame rate information, and content of the plurality of frames, to reduce layer drawing and rendering loads of a user interface (user interface, UI) thread and a render thread (render thread) per unit of time. This reduces power consumption of a terminal device, and avoids jitter, freezing, and blurry display in the interface display process, thereby bringing good user experience to a user. It should be noted that, in the method for performing frame interpolation in an interface display process provided in embodiments of this application, optionally, the terminal device may further first determine a quantity of frames displayed per unit of time in the interface display process, for example, a quantity of frames displayed per second (frames per second, FPS).

The quantity of frames displayed per unit of time in the interface display process, that is determined by the terminal device, may be used to determine a sliding frame rate, to further determine, based on the sliding frame rate, a quantity of combined frames interpolated between the plurality of frames.

Optionally, the sliding frame rate may be maximum FPS currently supported by the terminal device.

Optionally, the sliding frame rate may be maximum FPS currently supported by a second device that extends, for display, a flung interface started on a first device.

Specifically, when receiving a fling operation performed by the user on a display interface, the terminal device starts to slide for displaying a sliding interface. The sliding interface is a view in a first area of the display interface. The method for performing frame interpolation in an interface display process provided in embodiments of this application may include the following four phases: an input information collection phase (phase 1), a frame interpolation policy selection phase (phase 2), a native frame generation phase (phase), and a to-be-interpolated frame combination phase (phase 4).

The following specifically describes the phase 1, the phase 2, the phase 3, and the phase 4 with reference to the accompanying drawings.

Phase 1 (the Input Information Collection Phase)

As shown in FIG. 4, the input information collection phase includes step S401.

S401: In a process in which the user flings the sliding interface, the terminal device collects input information such as a fling direction, a sliding start time point t1 of the sliding interface, an initial sliding speed v of the sliding interface, a sliding frame rate x of the sliding interface, an interface size of the sliding interface, a size of a screen display area of the terminal device, and information about a plurality of image frames.

In some embodiments, if there is an obstruction on the sliding interface, the terminal device is further configured to collect information about the obstruction on the sliding interface in the process in which the user flings the sliding interface. The fling direction may include flinging from top to bottom, flinging from bottom to top, flinging from left to right, and flinging from right to left. For example, a process of flinging a settings interface from bottom to top is shown from FIG. 1(a) to FIG. 1(b) and then to FIG. 1(c).

The sliding start time point t1 is a moment at which the sliding interface on the terminal device starts to slide for display in response to the received fling operation.

The initial sliding speed v is an initial speed at which the interface slides when the sliding interface on the terminal device starts to slide for display in response to the received fling operation.

The sliding frame rate x is a quantity of frames displayed by the terminal device per unit of time in response to the received fling operation, for example, FPS. For example, the sliding frame rate x may be 60 Hz, 90 Hz, or 120 Hz.

Optionally, the sliding frame rate x may be the maximum FPS that is currently supported by the terminal device and that is determined by the terminal device based on a configuration, performance, a power consumption mode, a battery level, and the like of the terminal device. For example, the configuration of the terminal device may include but is not limited to a hardware configuration and a software configuration of a display apparatus of the terminal device. The performance of the terminal device indicates a processing capability, computing power, or the like of a CPU and/or a processing capability, computing power, or the like of a GPU of the terminal device. The power consumption mode of the terminal device may include but is not limited to a battery mode (for example, a performance mode, a power saving mode, or an ultra power saving mode) of the terminal device. The battery level is a remaining battery level of the terminal device.

Optionally, in a scenario of multi-screen collaboration, for example, in a scenario in which the terminal device (for example, the first device) extends, to the second device for display, one or more interfaces started on the first device, it is assumed that an interface that receives a fling operation performed by the user is synchronously displayed on the first device and the second device. In this case, the sliding frame rate x may be maximum FPS currently supported by the first device, or a largest value between the maximum FPS currently supported by the first device and the maximum FPS currently supported by the second device.

Optionally, in a scenario of multi-screen collaboration, for example, in a scenario in which the terminal device (for example, the first device) extends, to the second device for display, one or more interfaces started on the first device, it is assumed that an interface that receives a fling operation performed by the user is displayed only on the second device, and is not displayed on the first device. In this case, the sliding frame rate x is maximum FPS currently supported by the second device.

Optionally, in a scenario of multi-screen collaboration, for example, in a scenario in which the terminal device (for example, the first device) extends, to a plurality of second devices for display, one or more interfaces started on the first device, it is assumed that an interface that receives a fling operation performed by the user is synchronously displayed on the first device and the plurality of second devices. In this case, the sliding frame rate x may be maximum FPS currently supported by the first device, or a largest value between the maximum FPS currently supported by the first device and maximum FPS currently supported by the plurality of second devices.

Optionally, for example, in a scenario of multi-screen collaboration, an interface that receives a fling operation performed by the user is displayed only on a plurality of second devices. In this case, the sliding frame rate x may be a largest value between maximum FPS currently supported by the plurality of second devices.

The maximum FPS currently supported by the second device may be determined based on a configuration, performance, a power consumption mode, a battery level, and the like of the second device.

Figure 5A:
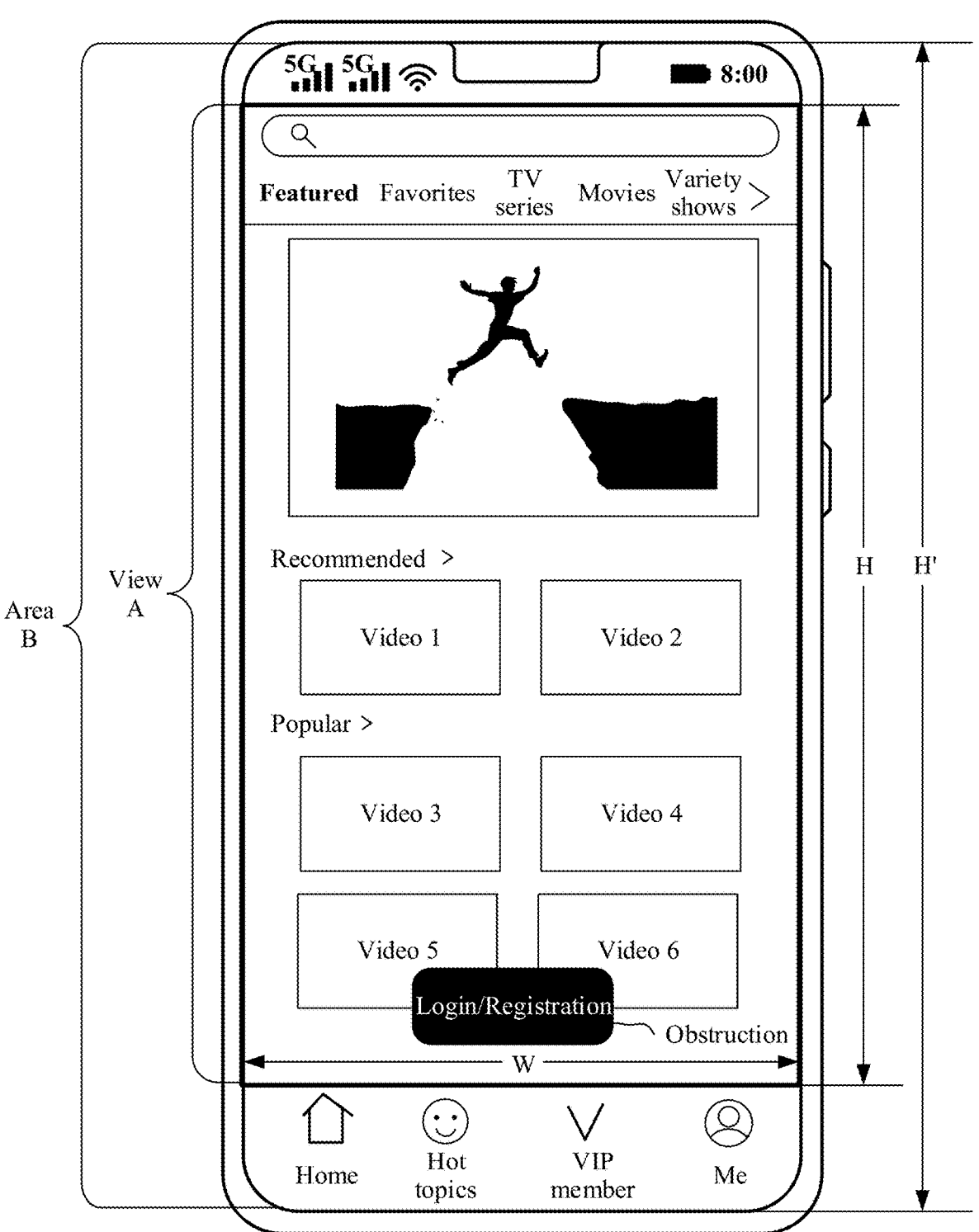
FIG. 5A is an example diagram of an interface according to an embodiment of this application.

The interface size is a size of a display area of a sliding interface view (referred to as an interface view for short below), for example, a width W and a height H of the display area of the interface view. The interface view is an interface area view that slides for display in response to the fling operation performed by the user. A video interface shown in FIG. 5A is used as an example. The interface view is a view A shown in FIG. 5A, and the display area of the interface view is an area corresponding to the view A shown in FIG. 5A. A size of the area (namely, an interface view display area) corresponding to the view A is a width W and a height H. In the example shown in FIG. 5A, content on the video interface (namely, the view A shown in FIG. 5A) changes in response to a received fling operation performed by the user on the video interface (namely, the view A shown in FIG. 5A). For example, a sliding animation interface is displayed on the video interface (namely, the view A shown in FIG. 5A) until the animation interface stops.

Whether the interface is blocked means whether there is a display area that does not change with the interface and that is at a layer at which the interface view is located (namely, a layer corresponding to the sliding interface), for example, a floating window, a floating box, a floating control, or a floating icon. The video interface shown in FIG. 5A is used as an example. A "Login/Registration" control is at a same layer as the video interface, and is displayed above a video interface view in a floating manner. In a process in which the video interface (namely, the view A shown in FIG. 5A) slides for display in response to the received fling operation performed by the user on the video interface (namely, the view A shown in FIG. 5A), the "Login/Registration" control remains unchanged in position, and always blocks a part of the video interface view. The "Login/Registration" control is an obstruction. In this case, it is considered that the video interface is blocked (that is, the layer at which the interface view is located is blocked).

Figure 5B:
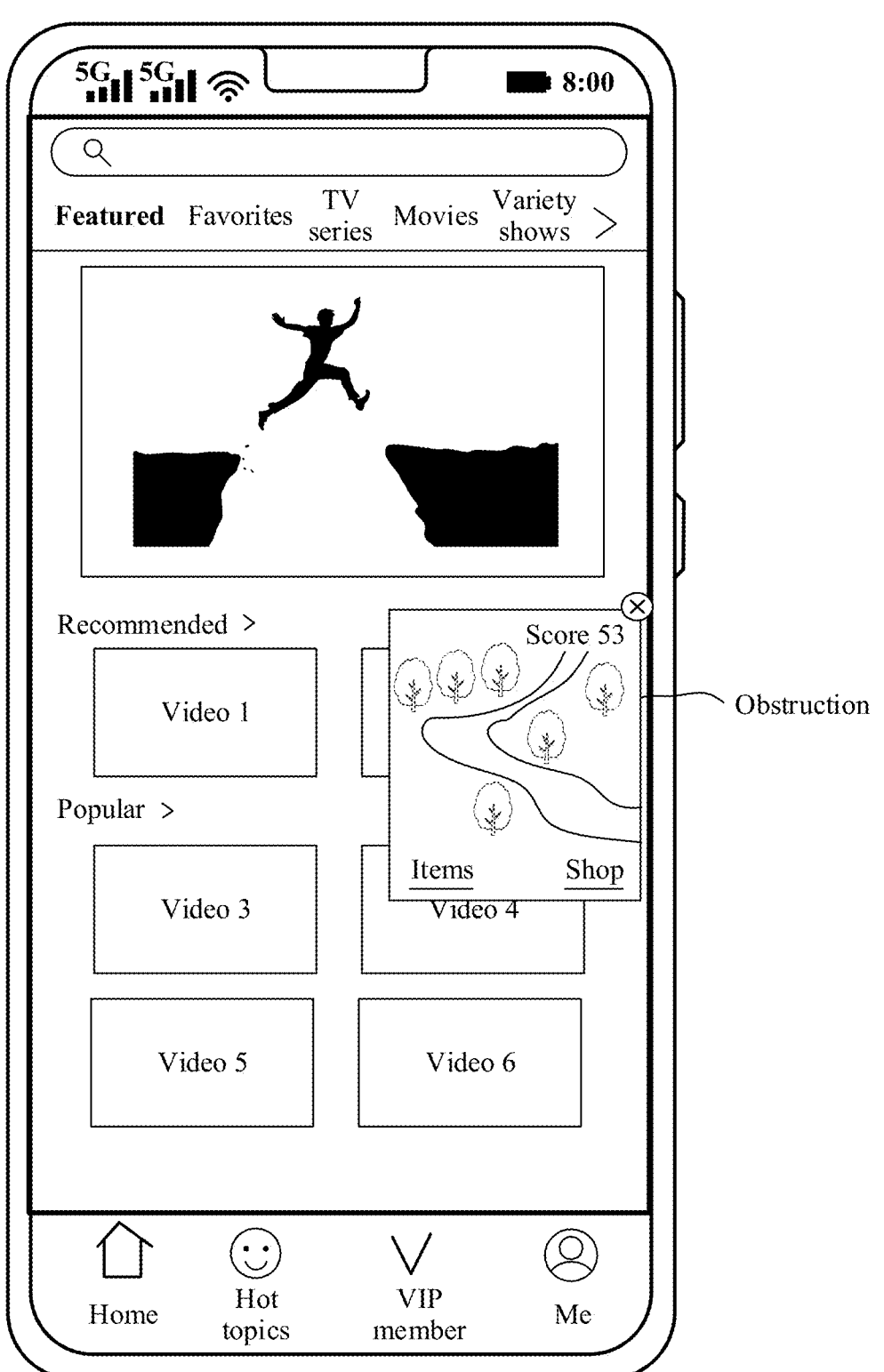
FIG. 5B is an example diagram of another interface according to an embodiment of this application.

For another example, FIG. 5B shows an example of an interface including a floating window obstruction. As shown in FIG. 5B, a floating small window layer of a game application is always displayed in a floating manner at a layer at which a video interface is located. In a process in which the video interface (namely, a view A shown in FIG. 5B) slides for display in response to a received fling operation performed by the user on the video interface (namely, the view A shown in FIG. 5B), a floating small window remains unchanged in position, and always blocks a part of a video interface view. The floating small window is an obstruction. In this case, it is considered that the video interface is blocked.

The size of the screen display area is the size of the screen display area of the terminal device. The video interface shown in FIG. 5A is used as an example. The screen display area is an area B shown in FIG. 5A. A size of the area B (namely, the size of the screen display area of the terminal device) is the width being W and a height being H'.

The information about the plurality of image frames is configuration information of the plurality of image frames in a process in which the sliding interface slides for display on the terminal device in response to the received fling operation performed by the user. The configuration information may include but is not limited to an application development attribute/application data configuration, boundary information of an application interface, application orientation, an icon on the application interface, a text on the application interface, a position, a size, and a color of the icon, a display position, a size, and a color of the text, and the like.

For example, the information about the plurality of image frames may include a $1^{st}$ image frame and a last image frame in the process in which the sliding interface slides for display on the terminal device in response to the received fling operation performed by the user. A process in which the settings interface shown in FIG. 1($a$) to FIG. 1($c$) changes is used as an example. The information about the plurality of image frames may include a $1^{st}$ settings interface image frame shown in FIG. 1($a$) and a last settings interface image frame shown in FIG. 1($c$).

It should be noted that, for example, in the scenario of multi-screen collaboration, for example, in a scenario in which the terminal device (for example, the first device) extends, to one or more second devices for display, one or more interfaces started on the first device, if a flung interface is not displayed on the first device, the terminal device (for example, the first device) may determine, by obtaining coordinate information of a fling operation received by the second device, whether the fling operation performed by the user is received on the extended interface, and when determining that the fling operation performed by the user is received on the extended interface, collect the input information and perform subsequent frame interpolation.

In a possible implementation, the terminal device may collect, based on the following indicators, input information including the fling direction, the sliding start time point, the initial sliding speed, the sliding frame rate, and configuration information of the $1^{st}$ image frame, namely, an F1 frame, in the process in which the user flings the sliding interface: whether the fling operation performed by the user is received, whether the sliding interface starts to change, and whether the sliding interface is blocked.

The following describes, by using an example in which a flung sliding interface is displayed on the terminal device, a flowchart of collecting input information by the terminal device when the interface is flung by the user.

Figure 6:
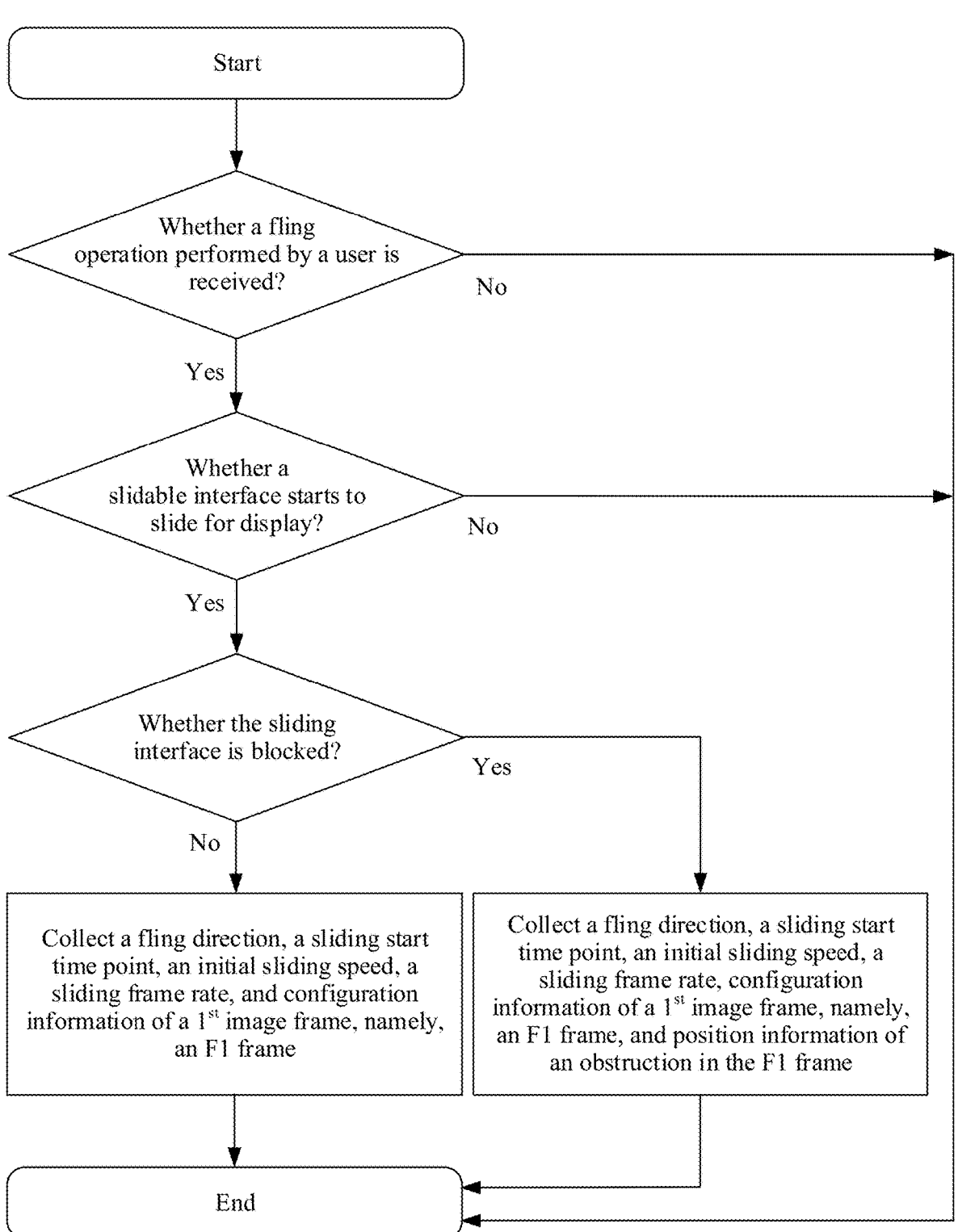
FIG. 6 is a flowchart of collecting input information by a terminal device when an interface is flung by a user according to an embodiment of this application.

As shown in FIG. 6, the terminal device first determines whether a fling operation performed by the user is received.

For example, the terminal device may detect, by using a touch sensor (for example, the touch sensor 280A shown in FIG. 2), a touch operation performed on or near the terminal device. When the touch sensor detects a touch operation performed on a slidable area of the display interface, the touch sensor may transfer the detected touch operation to an application processor of the terminal device, so that the application processor determines a touch event type, for example, a fling operation.

Alternatively, an Android operating system is used as an example. The terminal device may determine, by determining whether an OverScroller control starts to work, whether the fling operation performed by the user is received. The OverScroller control is a control that is used to calculate a sliding motion distance and a rebound effect in drawing performed each time in the Android operating system. If the OverScroller control starts to work, it may be considered that the terminal device receives the fling operation performed by the user.

Further, after the terminal device determines that the fling operation performed by the user is received, the terminal device determines whether a slidable interface (namely, the view in the first area of the display interface) starts to slide for display. The Android operating system is used as an example. The terminal device may determine, by determining whether a ListView control or a RecyclerView control starts to work, whether the slidable interface starts to slide for display. The ListView control and the RecyclerView control are controls used to achieve interface sliding effect in the Android operating system.

Further, after the terminal device determines that the slidable interface starts to slide for display, the slidable interface is the following sliding interface, and the terminal device determines whether the sliding interface is blocked. For example, the terminal device may determine, by determining whether there is a control, an icon, or a window, that remains unchanged in position, at a layer, at which an interface view is located, in a process in which the sliding interface changes, whether the sliding interface is blocked. For example, in a sliding display process of the sliding interface, if there is the window (namely, a floating window), a display box (namely, a floating box), the control (namely, a floating control), or an icon (namely, a floating icon) window, that remains unchanged in position, at the layer at which the interface view is located, the terminal device determines that the sliding interface is blocked.

Further, after the terminal device determines that the sliding interface is not blocked, the terminal device collects the following input information: a fling direction, a sliding start time point, an initial sliding speed, a sliding frame rate, and configuration information of a $1^{st}$ image frame, namely, an F1 frame.

Alternatively, after the terminal device determines that the sliding interface is blocked, the terminal device collects the following input information: a fling direction, a sliding start time point, an initial sliding speed, a sliding frame rate, configuration information of a $1^{st}$ image frame, namely, an F1 frame, and information about an obstruction in the F1 frame. The information about the obstruction may include but is not limited to coordinate information of the obstruction. The video interface shown in FIG. 5A is used as an example. The position information about the obstruction may include coordinate information of the "Login/Registration" control. The interface shown in FIG. 5B is used as an example. The position information about the obstruction may include coordinate information of the floating small window of the game application.

In a possible implementation, the terminal device may collect, based on the following indicators, configuration information of the last image frame, namely, an Fn frame, in the process in which the user flings the sliding interface: whether the fling operation performed by the user is received, whether the sliding interface is blocked, and whether display areas of the Fn frame and the F1 frame are consistent.

Figure 7:
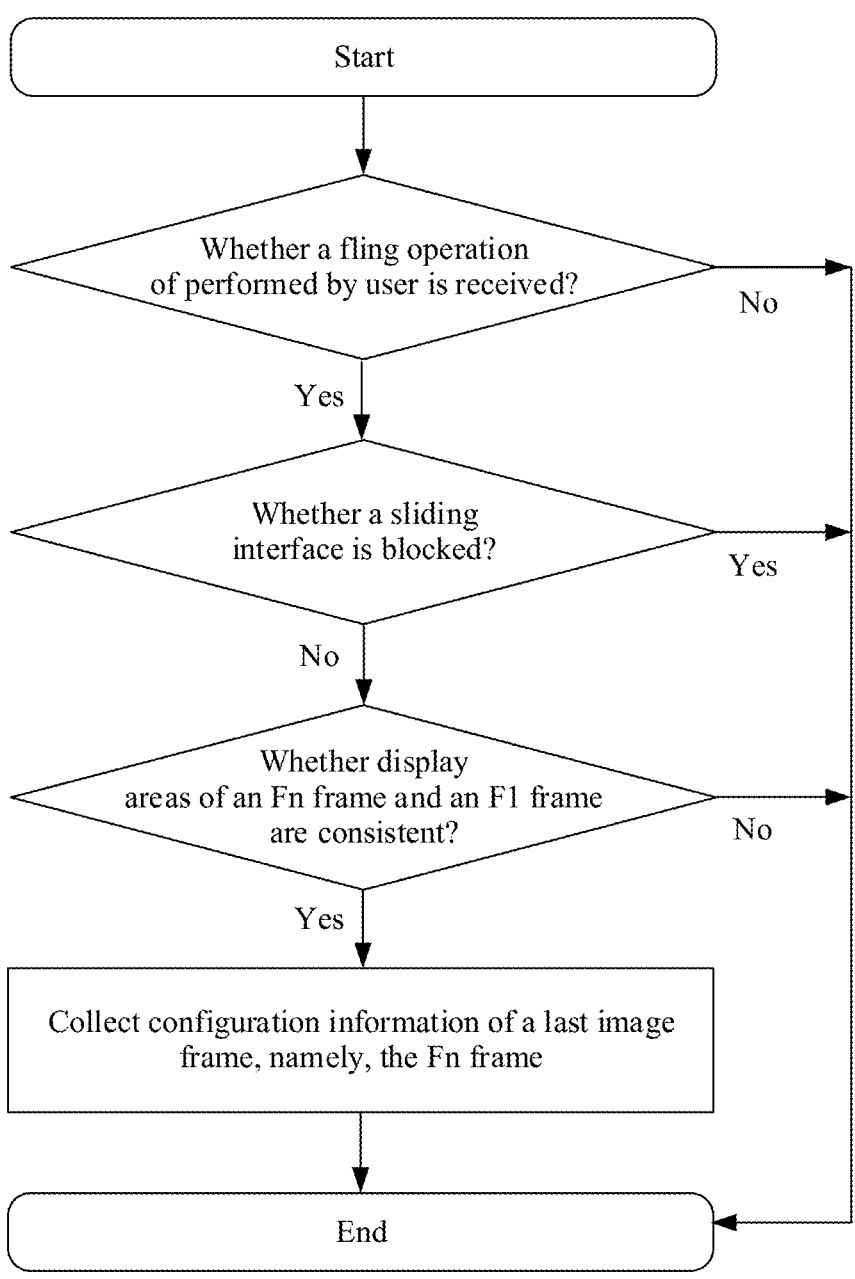
FIG. 7 is a flowchart of collecting configuration information of a last image frame by a terminal device according to an embodiment of this application.

FIG. 7 is a flowchart of collecting configuration information of a last image frame by the terminal device according to an embodiment of this application by using an example in which a flung sliding interface is displayed on the terminal device. As shown in FIG. 7, the terminal device first determines whether a fling operation performed by the user is received. Further, after the terminal device determines that the fling operation performed by the user is received, the terminal device determines whether the sliding interface is blocked. For a specific method for determining, by the terminal device, whether the fling operation performed by the user is received and a specific method for determining, by the terminal device, whether the interface is blocked, refer to the foregoing explanations and descriptions of the related processes in FIG. 6. Details are not described herein again.

Further, after the terminal device determines that the sliding interface is not blocked, the terminal device determines whether display areas of the Fn frame and an F1 frame are consistent. In this embodiment of this application, that the display areas of the Fn frame and the F1 frame are consistent means that the display areas of the Fn frame and the F1 frame have same position information, that is, coordinates, widths, and heights are the same.

It may be understood that a visible area changes on some display interfaces with sliding display of the sliding interface. In this embodiment of this application, a to-be-interpolated frame is obtained through calculation based on interface content of the F1 frame and the Fn frame with same display areas. Therefore, when the visible area changes, frame interpolation between the F1 frame and the Fn frame cannot be performed.

Figure 8A:
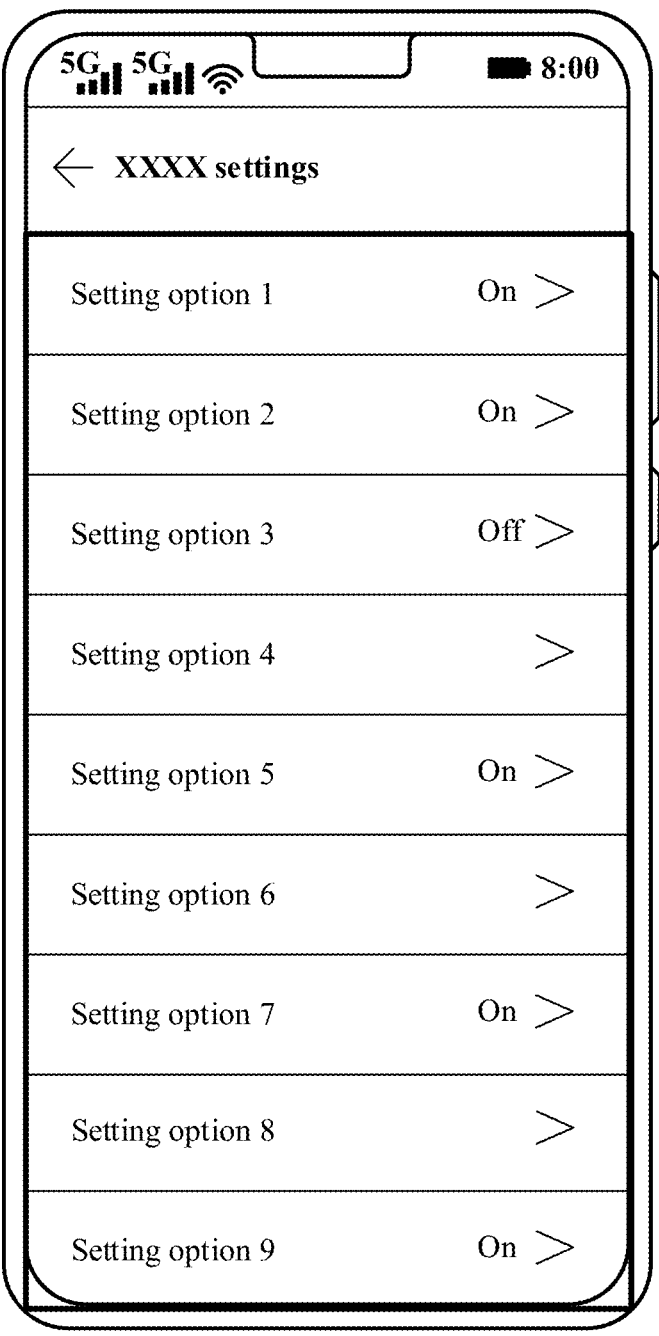
FIG. 8(a) to FIG. 8(c) are an example diagram of consistency and inconsistency between display areas of an Fn frame and an F1 frame according to an embodiment of this application.
Figure 8B:
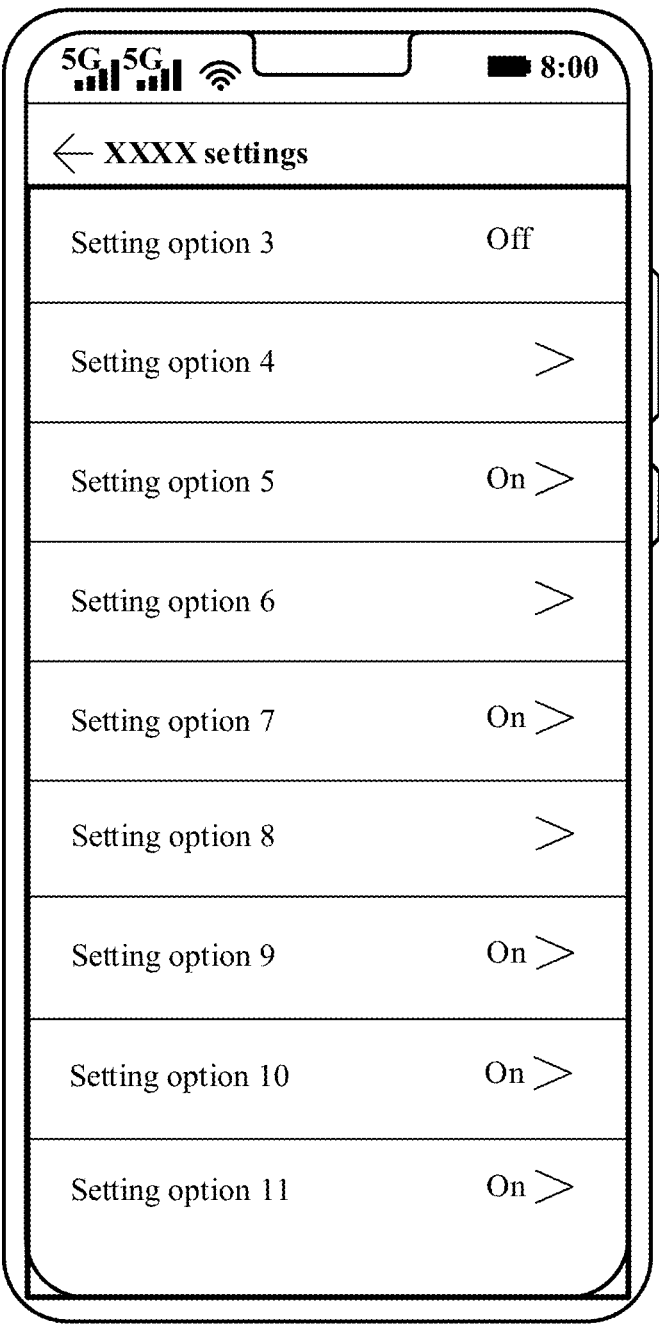
Figure 8C:
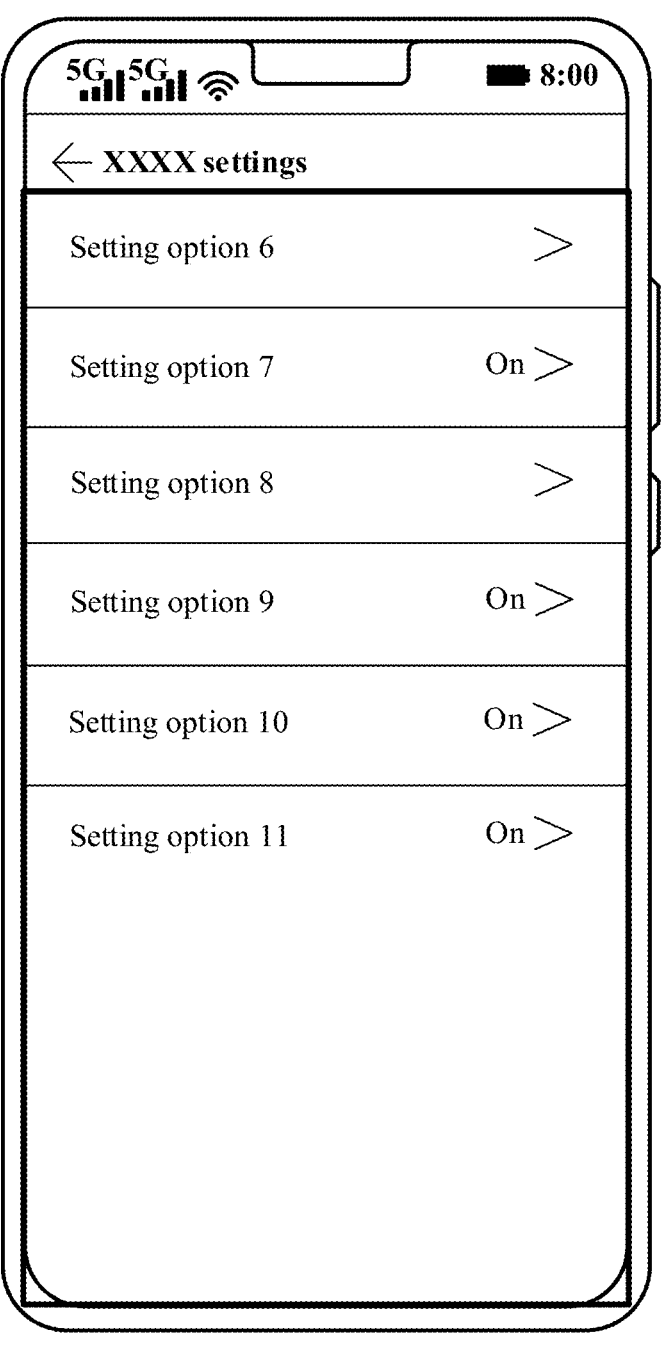

For example, it is assumed that the F1 frame of the settings interface is in a state shown in FIG. 8(*a*), and the Fn frame of the settings interface is in a state shown in FIG. 8(*b*). When the settings interface changes from the state shown in FIG. 8(*a*) to the state shown in FIG. 8(*b*), display areas of the Fn frame and the F1 frame are inconsistent. In this case, no frame can be interpolated between the image frame shown in FIG. 8(*a*) and the image frame shown in FIG. 8(*b*).

However, it is assumed that the F1 frame of the settings interface is in a state shown in FIG. 8(*b*), and the Fn frame of the settings interface is in a state shown in FIG. 8(*c*). When the settings interface changes from the state shown in FIG. 8(*b*) to the state shown in FIG. 8(*c*), display areas of the Fn frame and the F1 frame are consistent. In this case, a frame may be interpolated between the image frame shown in FIG. 8(*b*) and the image frame shown in FIG. 8(*c*).

Phase 2 (the Frame Interpolation Policy Selection Phase)

As shown in FIG. 4, the frame interpolation policy selection phase includes step S402.

S402: The terminal device calculates a maximum quantity of interpolable frames based on the collected input information, and determines a frame interpolation policy based on the maximum quantity of interpolable frames.

In a possible implementation, the terminal device may obtain, through calculation, the maximum quantity M of interpolable frames by using the following calculation formula:

$$M = (\max\_t/y) - 1 \qquad \text{(formula 1)}$$

Herein, y is single-frame required duration, $y = 1000/x$, x is the sliding frame rate collected by the terminal device in the phase 1, max_t is the maximum sliding duration of the interface, and max_t may be obtained through calculation according to the following formula 2:

$$Fun(t1, \max\_t, v) < \max\_distance \qquad \text{(formula 2)}$$

Herein, t1 is the sliding start time point collected by the terminal device in the phase 1, v is the initial sliding speed collected by the terminal device in the phase 1, and max_distance is a maximum sliding distance of the sliding interface. The video interface shown in FIG. 5A is used as an example. If the fling direction is from top to bottom or from bottom to top, the maximum sliding distance of the interface is H. If the fling direction is from left to right or from right to left, the maximum sliding distance of the sliding interface is W.

For a specific calculation process of the formula 2, refer to the following descriptions of a calculation process of a formula 5.

For example, in this embodiment of this application, the frame interpolation policy may include a fixed frame interpolation policy and a variable frame interpolation policy.

The fixed frame interpolation policy means interpolating a fixed quantity m of combined frames (namely, to-be-interpolated frames) between two adjacent image frames (for example, between the F1 frame and the Fn frame) in the plurality of image frames. Herein, m is a positive integer, and m is less than or equal to the maximum quantity M of interpolable frames.

Figure 9:
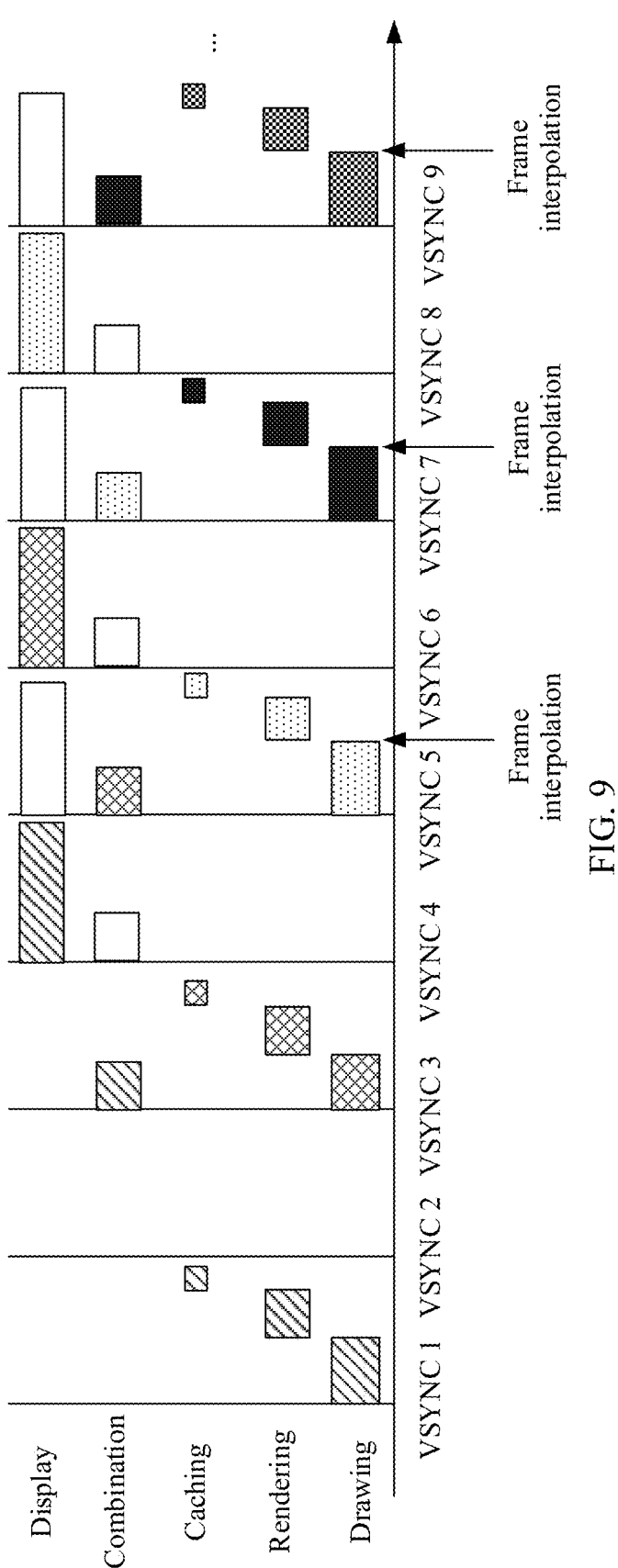
FIG. 9 is a schematic diagram of a fixed frame interpolation policy according to an embodiment of this application.

FIG. 9 is a schematic diagram of a fixed frame interpolation policy according to an embodiment of this application by using an example in which m=1. As shown in FIG. 9, for a fixed frame interpolation policy of interpolating one frame between two frames, the terminal device performs layer drawing and rendering once every other frame. For example, when receiving signals VSYNC 2, VSYNC 4, VSYNC 6, and VSYNC 8, the terminal device does not perform layer drawing and rendering. When the terminal device receives the signals VSYNC 4, VSYNC 6, and VSYNC 8, the terminal device combines two frames of most recently cached images, to interpolate a combined frame between the two frames of images during sending for display.

The variable frame interpolation policy means interpolating a variable quantity n of combined frames (namely, to-be-interpolated frames) between two adjacent image frames (for example, between the F1 frame and the Fn frame) in the plurality of image frames. Herein, n is a positive integer, and n is less than or equal to the maximum quantity M of interpolable frames. For example, the terminal device may fixedly interpolate n variable frames between two frames, and a maximum quantity of interpolable frames during frame interpolation performed each time increases as a sliding speed decreases.

Figure 10:
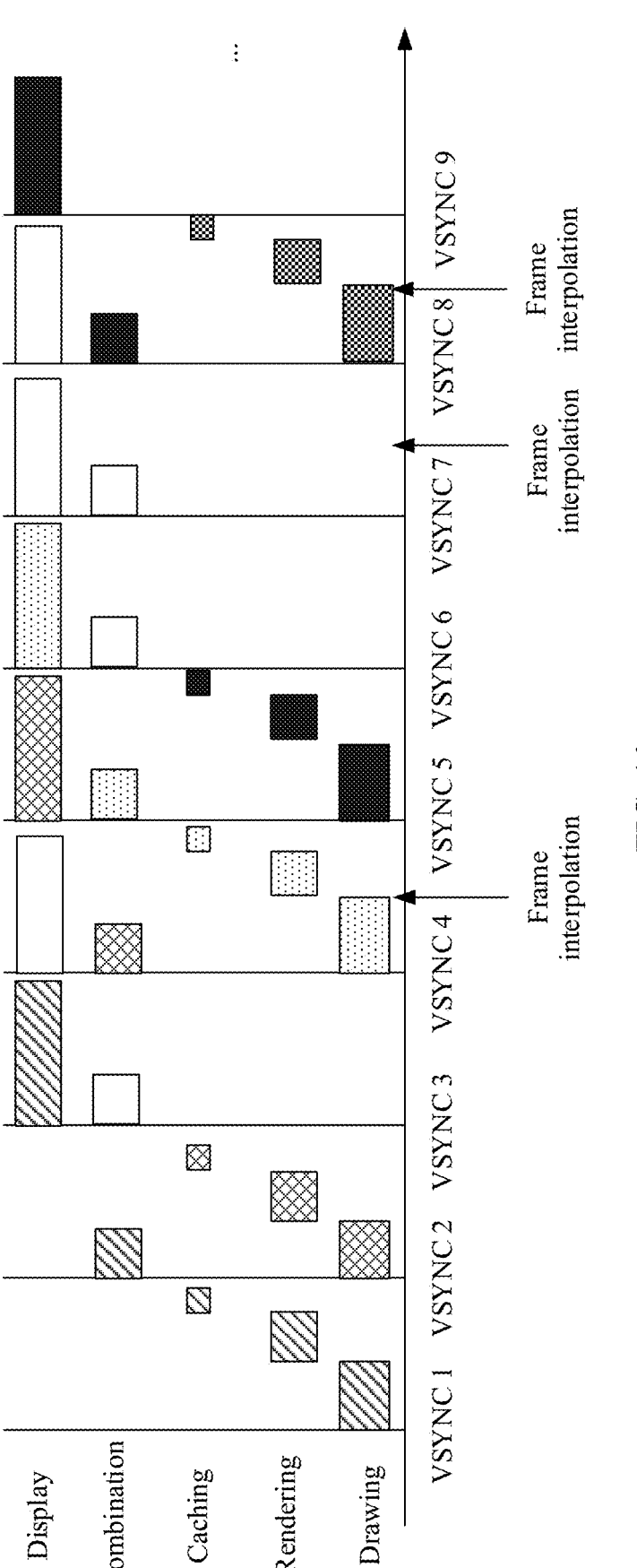
FIG. 10 is a schematic diagram of a variable frame interpolation policy according to an embodiment of this application.

FIG. 10 is a schematic diagram of a variable frame interpolation policy according to an embodiment of this application by using an example in which a variable quantity of combined frames are interpolated at an increment rate of a step being 1 with a quantity of initial to-be-interpolated frames being 1. As shown in FIG. 10, the terminal device interpolates one combined frame between two frames for the first time, interpolates two combined frames between two frames for the second time, . . . , and so on. When receiving signals VSYNC 3, VSYNC 6, and VSYNC 7, the terminal device does not perform layer drawing and rendering, but combines two frames of most recently cached images, to interpolate a corresponding quantity of combined frames between the two frames of images during sending for display.

Phase 3 (the Native Frame Generation Phase)

As shown in FIG. 4, the native frame generation phase includes step S403.

S403: The terminal device draws and renders the plurality of collected image frames (for example, the F1 frame and the Fn frame).

In this embodiment of this application, the Android operating system is used as an example. When the terminal device receives a VSYNC signal, a user interface UI thread needs to perform processing for specific types of different image frames by using different drawing and rendering policies.

For example, as shown in FIG. 11(*a*) to FIG. 11(*c*), for the F1 frame, the terminal device may normally perform drawing and rendering based on the image frame information of the F1 frame. For a to-be-interpolated frame, the terminal device does not perform drawing and rendering. For the Fn frame, the terminal device may normally perform drawing and rendering or perform drawing and rendering in advance based on image frame information of the Fn frame.

The to-be-interpolated frame is a combined frame interpolated between the F1 frame and the Fn frame. As shown in FIG. 9, the to-be-interpolated frame is an image frame sent by the terminal device for display when signals VSYNC 5, VSYNC 7, and VSYNC 9 are received. Still as shown in FIG. 10, the to-be-interpolated frame is an image frame sent by the terminal device for display when signals VSYNC 4, VSYNC 7, and VSYNC 8 are received.

In this embodiment of this application, the terminal device may draw and render the F1 frame and the Fn frame based on an interface sliding distance F1_distance corresponding to the F1 frame and an interface sliding distance Fn_distance corresponding to the Fn frame. F1_distance may be understood as an initial sliding distance, and is recorded by the terminal device. Fn_distance may be obtained by the terminal device through calculation according to the following formula 3:

$$Fun(t1, Fn\_t2, v) = Fn\ \text{distance} \qquad \text{(formula 3)}$$

Herein, t1 is the sliding start time point collected by the terminal device in the phase 1, v is the initial sliding speed collected by the terminal device in the phase 1, and Fn_t2 is a moment at which the terminal device triggers drawing and rendering. For a specific calculation process of the formula 3, refer to the following descriptions of the calculation process of the formula 5.

In some embodiments, a policy of normal drawing and rendering is used for the Fn frame. In this case, Fn_t2 is a moment at which the terminal device receives a corresponding VSYNC signal.

In some other embodiments, a policy of advanced drawing and rendering is used for the Fn frame. In this case, drawing and rendering of the Fn frame are not triggered by a received corresponding VSYNC signal, but Fn_t2 is obtained through calculation according to the following formula 4:

$$Fn\_t2 = t1 + (M+1) \times 1000/x \qquad \text{(formula 4)}$$

Herein, x is the sliding frame rate collected by the terminal device in the phase 1, and M is the maximum quantity of interpolable frames that is obtained by the terminal device through calculation in the phase 2.

As described above, for the Fn frame, the terminal device may use the policy of normal drawing and rendering, or may use the policy of advanced drawing and rendering. In a possible implementation, the terminal device may further determine, based on the frame interpolation policy determined by the terminal device in the phase 2, whether to use the policy of normal drawing and rendering or a policy of advanced drawing and rendering. For example, if the frame interpolation policy is the fixed frame interpolation policy, the terminal device uses the policy of normal drawing and rendering. If the frame interpolation policy is the variable frame interpolation policy, the terminal device uses the policy of advanced drawing and rendering.

Phase 4 (to-be-Interpolated Frame Combination Phase)

As shown in FIG. 4, the to-be-interpolated frame combination phase includes step S404.

S404: The terminal device performs splicing and combination on a plurality of display areas of the plurality of image frames (for example, the F1 frame and the Fn frame)

to obtain one or more to-be-interpolated frames (for example, a to-be-interpolated frame Mi frame between the F1 frame and the Fn frame).

For example, in this embodiment of this application, the to-be-interpolated frame combination phase may include the following two steps.

Step 1: Split the plurality of image frames into a plurality of parts.

It may be understood that, for a terminal device that displays an application interface, the plurality of image frames may be split into at least two parts: a system status bar view (View) and an interface view. Each part is located in a display area of an image frame. The interface view is an interface area view in which a sliding change occurs in response to the fling operation performed by the user.

For example, an interface is displayed in full screen on a display of the terminal device in a portrait mode, and an interface view is not blocked. In a possible implementation, the terminal device may split a plurality of image frames (for example, an F1 frame and an Fn frame) into a plurality of parts according to the following splitting policy.

1. Split the image frame into two parts if an interface view display area fully overlaps a layer at which the interface view is located.

For example, the terminal device may determine, by analyzing coordinate information of the interface view display area and coordinate information of the layer at which the interface view is located, a relative position relationship between the interface view display area and the layer at which the interface view is located.

For example, a reference coordinate system is an xOy coordinate system shown in FIG. 11(*a*) (where an origin O is the upper left corner of an interface, an x axis is a horizontal edge of the interface, and a y axis is a vertical edge of the interface). As shown in FIG. 11(*a*), the terminal device may determine that coordinates of an interface view display area fully overlap coordinates of a layer at which an interface view is located.

In the case shown in FIG. 11(*a*), in response to a fling operation performed by the user on the interface shown in the figure, the terminal device slides and changes content at the layer at which the interface view is located. For a display interface in a similar case, the terminal device splits an image frame into two parts, for example, including a system status bar view and the interface view (namely, the layer at which the interface view is located) that are shown in FIG. 11(*a*). Each part is located in a display area of an image frame.

2. If the upper left corner of an interface view display area does not overlap the upper left corner of a layer at which the interface view is located, but the lower left corner of the interface view display area overlaps the lower left corner of the layer at which the interface view is located, split the image frame into three parts.

For example, if vertical coordinates of the upper left corner of the interface view display area and the upper left corner of the layer at which the interface view is located are different, but vertical coordinates of the lower left corner of the interface view display area and the lower left corner of the layer at which the interface view is located are same, it may be determined that the upper left corner of the interface view display area does not overlap the upper left corner of the layer at which the interface view is located, but the lower left corner of the interface view display area overlaps the lower left corner of the layer at which the interface view is located.

For example, a reference coordinate system is an xOy coordinate system shown in FIG. 11(*b*) (where an origin O is the upper left corner of an interface, an x axis is a horizontal edge of the interface, and a y axis is a vertical edge of the interface). As shown in FIG. 11(*b*), the upper left corner of an interface view display area and the upper left corner of a layer at which an interface view is located have a same horizontal coordinate but different vertical coordinates. In addition, the lower left corner of the interface view display area and the lower left corner of the layer at which the interface view is located have a same horizontal coordinate and a same vertical coordinate. In this case, the terminal device may determine that the upper left corner of the interface view display area does not overlap the upper left corner of the layer at which the interface view is located, but the lower left corner of the interface view display area overlaps the lower left corner of the layer at which the interface view is located.

In the case shown in FIG. 11(*b*), in response to a fling operation performed by the user on the interface shown in the figure, the terminal device slides and changes content in the interface view, but content in another display area (an area r shown in FIG. 11(*b*)) at the layer at which the interface view is located remains unchanged. For an interface in a similar case, the terminal device splits an image frame into three parts, for example, including a system status bar view, a view, that corresponds to the area r, and the interface view that are shown in FIG. 11(*b*). Each part is located in a display area of an image frame.

3. Split the image frame into four parts if the upper left corner of an interface view display area does not overlap both the upper left corner and the lower left corner of a layer at which the interface view is located.

For example, if vertical coordinates of the upper left corner of the interface view display area and the upper left corner of the layer at which the interface view is located are different, and vertical coordinates of the lower left corner of the interface view display area and the lower left corner of the layer at which the interface view is located are different, it may be determined that the upper left corner of the interface view display area does not overlap both the upper left corner and the lower left corner of the layer at which the interface view is located.

For example, a reference coordinate system is an xOy coordinate system shown in FIG. 11(*c*) (where an origin O is the upper left corner of an interface, an x axis is a horizontal edge of the interface, and a y axis is a vertical edge of the interface). As shown in FIG. 11(*c*), the upper left corner of an interface view display area and the upper left corner of a layer at which an interface view is located have a same horizontal coordinate but different vertical coordinates. In addition, the lower left corner of the interface view display area and the lower left corner of the layer at which the interface view is located have a same horizontal coordinate but different vertical coordinates. In this case, the terminal device may determine that the upper left corner of the interface view display area does not overlap both the upper left corner and the lower left corner of the layer at which the interface view is located.

In the case shown in FIG. 11(*c*), in response to a fling operation performed by the user on the interface shown in the figure, the terminal device slides and changes content in the interface view, but content in other display areas (an area r and an area s that are shown in FIG. 11(*c*)) at the layer at which the interface view is located remains unchanged. For an interface in a similar case, the terminal device splits an image frame into four parts, for example, including a system status bar view, a view, that corresponds to the area r, the interface view, and a view, that corresponds to the area s, that are shown in FIG. 11(*c*). Each part is located in a display area of an image frame.

It should be noted that, in FIG. 11(*a*) to FIG. 11(*c*), an example in which the interface view is not blocked is used to describe the splitting policy of the image frame. In a case in which the interface view is blocked, the terminal device may further obtain, according to the foregoing splitting policy through splitting, a view corresponding to an obstruction. An interface shown in FIG. 12 is used as an example. The interface includes a system status bar layer (a layer 1 shown in FIG. 12) and a video interface layer (a layer 2 shown in FIG. 12). The layer 2 may be split into a rounded-corner view (View) 1 located at the top of the layer 2, a rounded-corner view 2 located at the bottom of the layer 2, and an interface view A located in the middle of the layer 2. The view A does not overlap both the upper left corner and the lower left corner of the layer 2, and there is an obstruction, namely, a "Login/Registration" control, on the interface view A. Therefore, the terminal device may split an image frame of the interface shown in FIG. 12 into five parts: a view corresponding to the layer 1, a rounded-corner view 1, a view A, a rounded-corner view 2, and a view corresponding to the "Login/Registration" control. Each part is located in a display area of an image frame.

Figure 13A:
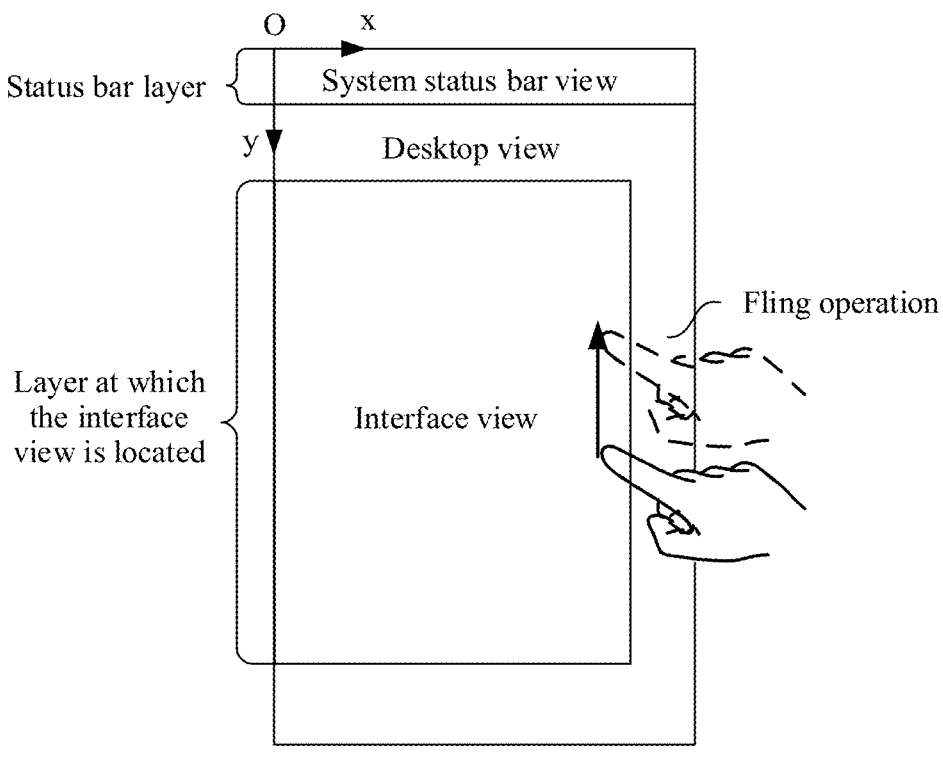
FIG. 13(a) to FIG. 13(c) are an example diagram of splitting other three image frames according to an embodiment of this application.
Figure 13B:
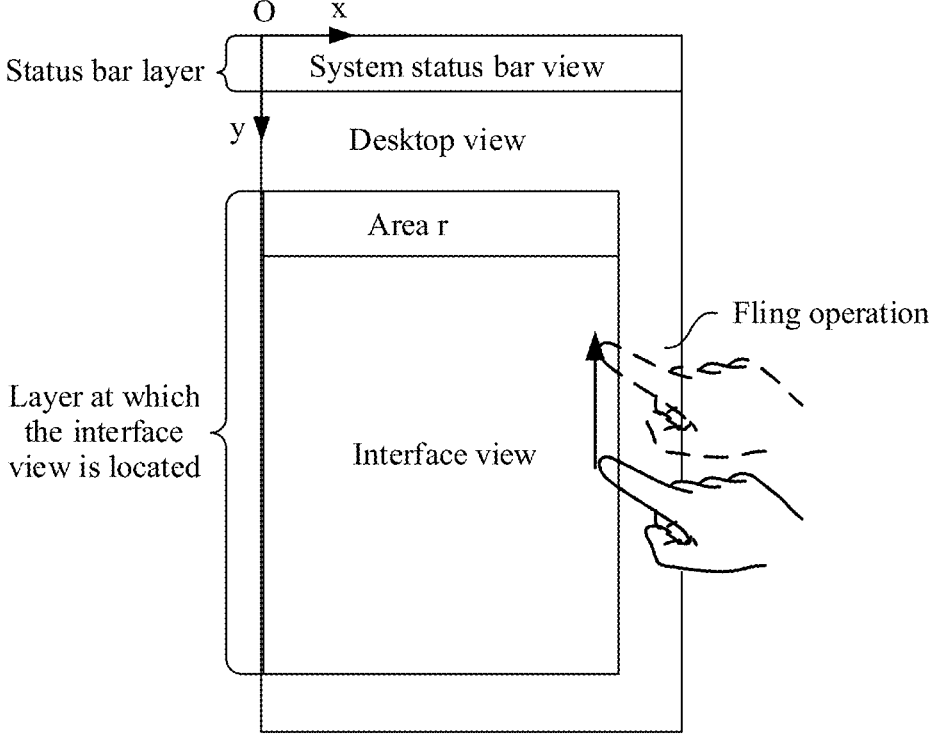

In addition, in FIG. 11(*a*) to FIG. 11(*c*), an example in which the interface view is displayed in full screen on the display of the terminal device is used to describe the splitting policy of the image frame of the interface. In a case in which the interface view is not displayed in full screen on the display of the terminal device, a similar policy may be used to split the image frame of the interface. For example, FIG. 13(*a*) to FIG. 13(*c*) are an example diagram of splitting image frames of other three interfaces according to an embodiment of this application.

In a case shown in FIG. 13(*a*), in response to a fling operation performed by the user on an interface shown in the figure, the terminal device slides and changes content at a layer at which an interface view is located. For an interface in a similar case, the terminal device splits an image frame into three parts, for example, including a system status bar view, a desktop view, and the interface view (namely, the layer at which the interface view is located) that are shown in FIG. 13(*a*). Each part is located in a display area of an image frame.

In a case shown in FIG. 13(*b*), in response to a fling operation performed by the user on an interface shown in the figure, the terminal device slides and changes content in an interface view, but content in another display area (an area r shown in FIG. 13(*b*)) at a layer at which the interface view is located remains unchanged. For an interface in a similar case, the terminal device splits an image frame of the interface into four parts, for example, including a system status bar view, a desktop view, a view, that corresponds to the area r, and the interface view that are shown in FIG. 13(*b*). Each part is located in a display area of an image frame.

Figure 13C:
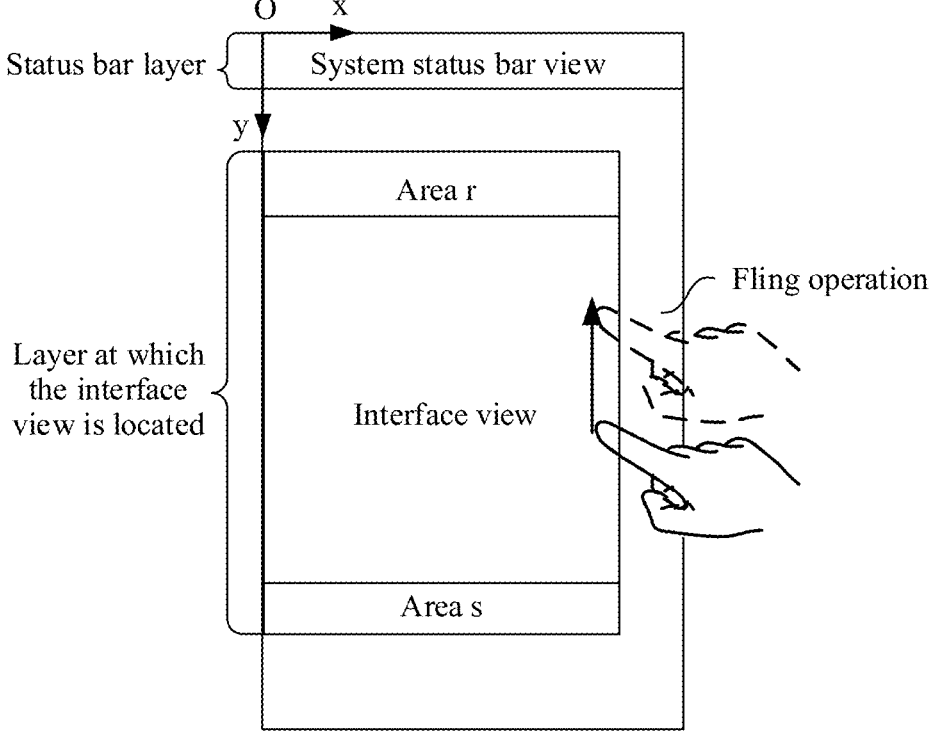

In a case shown in FIG. 13(*c*), in response to a fling operation performed by the user on an interface shown in the figure, the terminal device slides and changes content in an interface view, but content in other display areas (an area r and an area s that are shown in FIG. 13(*c*)) at a layer at which the interface view is located remains unchanged. For an interface in a similar case, the terminal device splits an image frame into five parts, for example, including a system status bar view, a desktop view, a view, that corresponds to the area r, the interface view, and a view, that corresponds to the area s, that are shown in FIG. 13(c). Each part is located in a display area of an image frame.

Figure 11A:
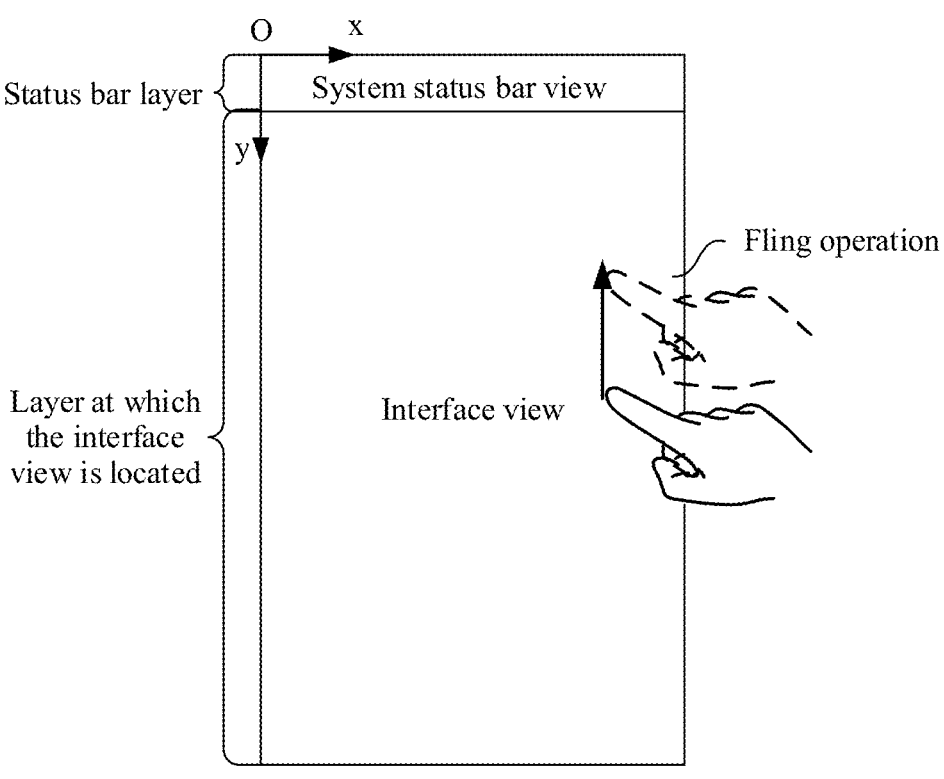
FIG. 11(a) to FIG. 11(c) are an example diagram of splitting three image frames according to an embodiment of this application.
Figure 11B:
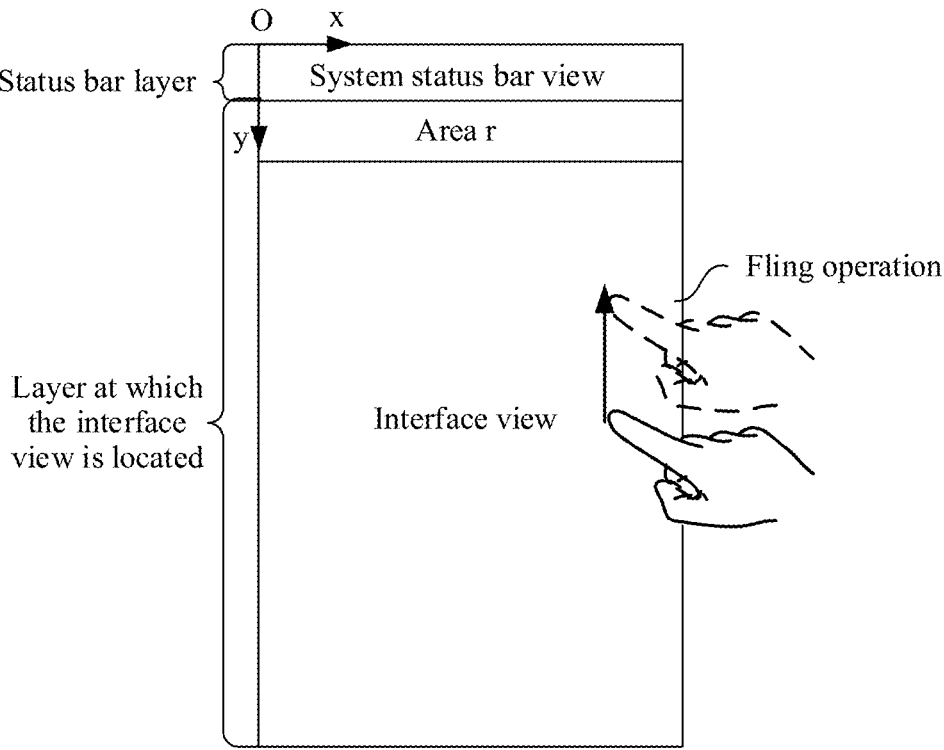
Figure 11C:
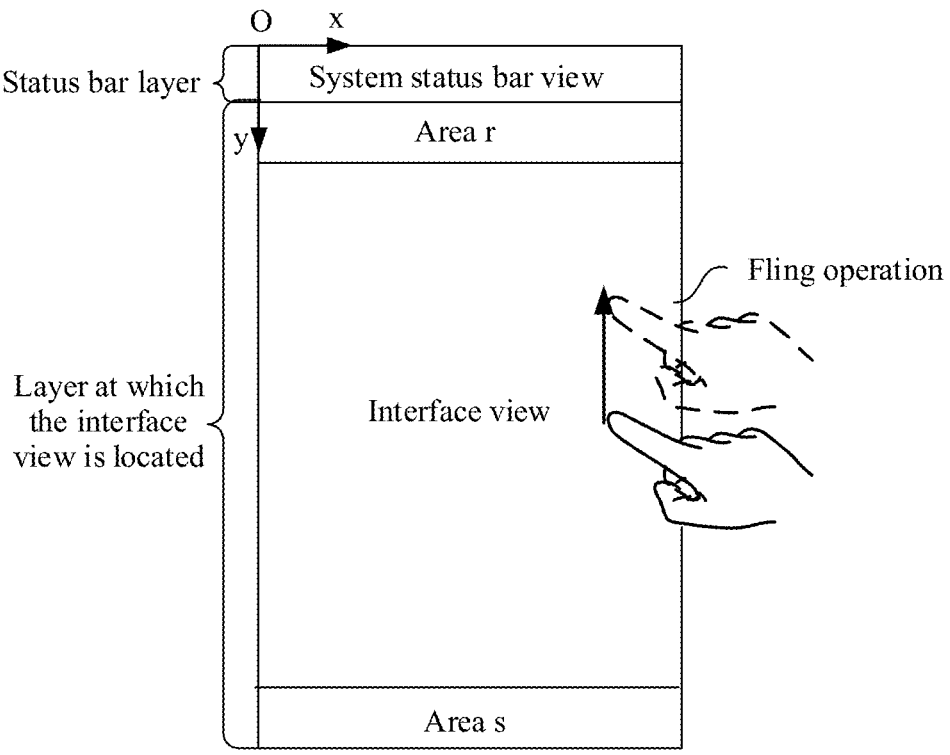
Figure 12:
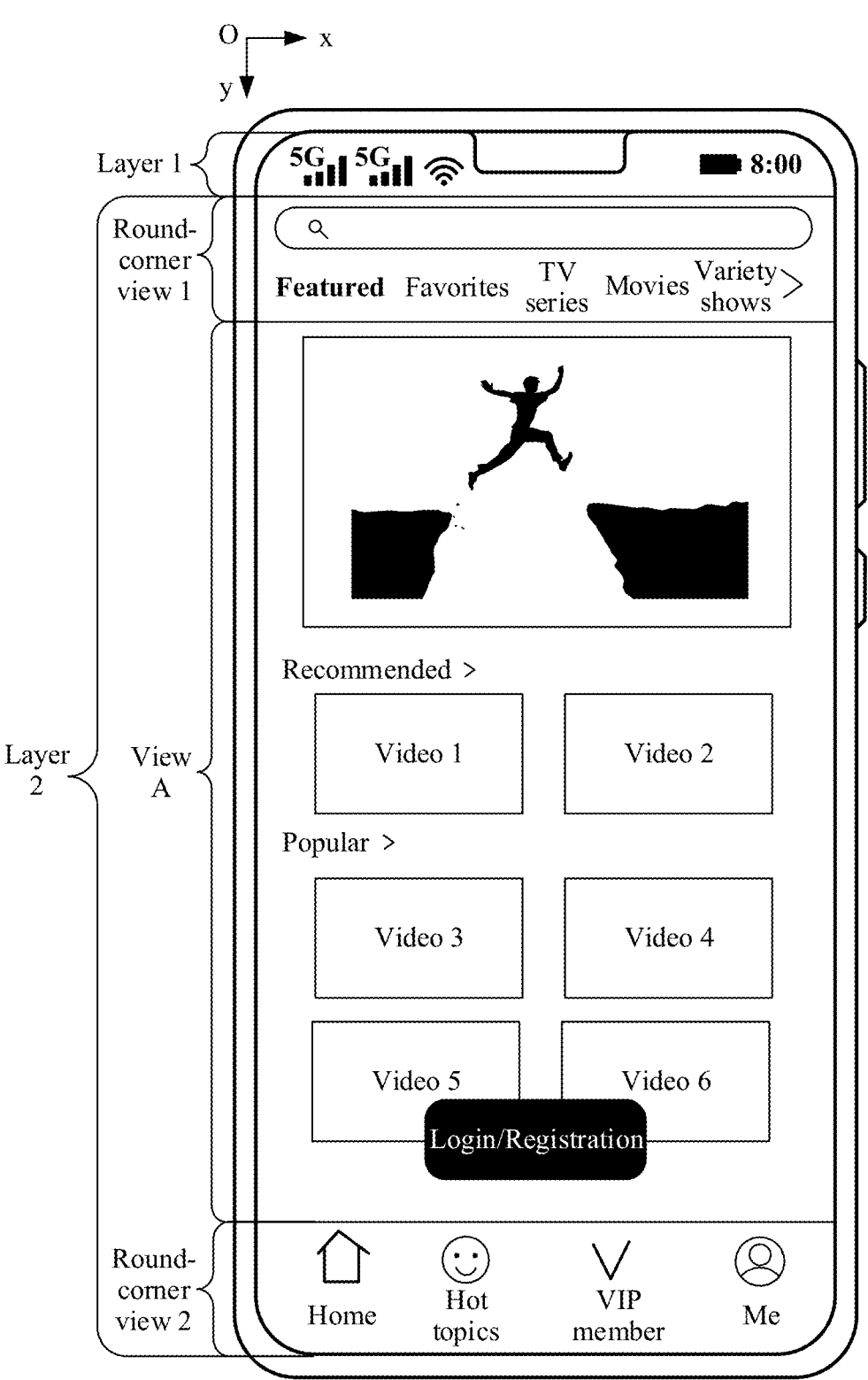
FIG. 12 is an example diagram of splitting an image frame according to an embodiment of this application.

In addition, in FIG. 11(a) to FIG. 11(c), an example in which the interface view is displayed on the display of the terminal device in the portrait mode is used to describe the splitting policy of the image frame. For a case in which the interface view is displayed on the display of the terminal device in a landscape mode, refer to the splitting policy of the image frame shown in FIG. 11(a) to FIG. 11(c) or FIG. 13(a) to FIG. 13(c) in embodiments of this application. Details are not described herein again.

Step 2: Obtain one or more to-be-interpolated frames through splicing.

In this embodiment of this application, the to-be-interpolated frame may be formed by splicing at least the following two types of views: a system status bar view and an interface view. It may be understood that, after the fling operation performed by the user on the slidable interface is received, the system status bar view of the terminal device remains changed.

Further, in some embodiments, for example, for an interface including one or more of a rounded-corner layer, a navigation bar view (layer), and an obstruction, the to-be-interpolated frame may be formed by splicing at least one or more of the system status bar view, the interface view, a rounded-corner view, the navigation bar view, and an obstruction view (namely, a view corresponding to the obstruction). After the fling operation performed by the user on the slidable interface is received, the rounded-corner view, the navigation bar view, and the view, that corresponds to the obstruction, that are of the terminal device also remain unchanged.

For example, an interface is a Toutiao® interface. FIG. 14 is an example diagram of a progress in which a Surface-Flinger SurfaceFlinger of the Android operating system combines parts of an image frame including the Toutiao® interface. As shown in FIG. 14, the interface includes the system status bar view, the interface view, a bottom rounded-corner view located at the bottom of the Toutiao® interface, and a top rounded-corner view located at the top of the Toutiao® interface. The to-be-interpolated frame (namely, the combined frame) in this embodiment of this application may be obtained by splicing the foregoing several views.

In this embodiment of this application, a core of step 2 is determining each interface view of the one or more to-be-interpolated frames. Usually, each interface view of the one or more to-be-interpolated frames may be determined based on an interface view of the F1 frame and/or an interface view of the Fn frame. For example, each interface view of the one or more to-be-interpolated frames may be obtained by splicing some areas in the F1 frame and/or some areas in the Fn frame.

Figure 15A:
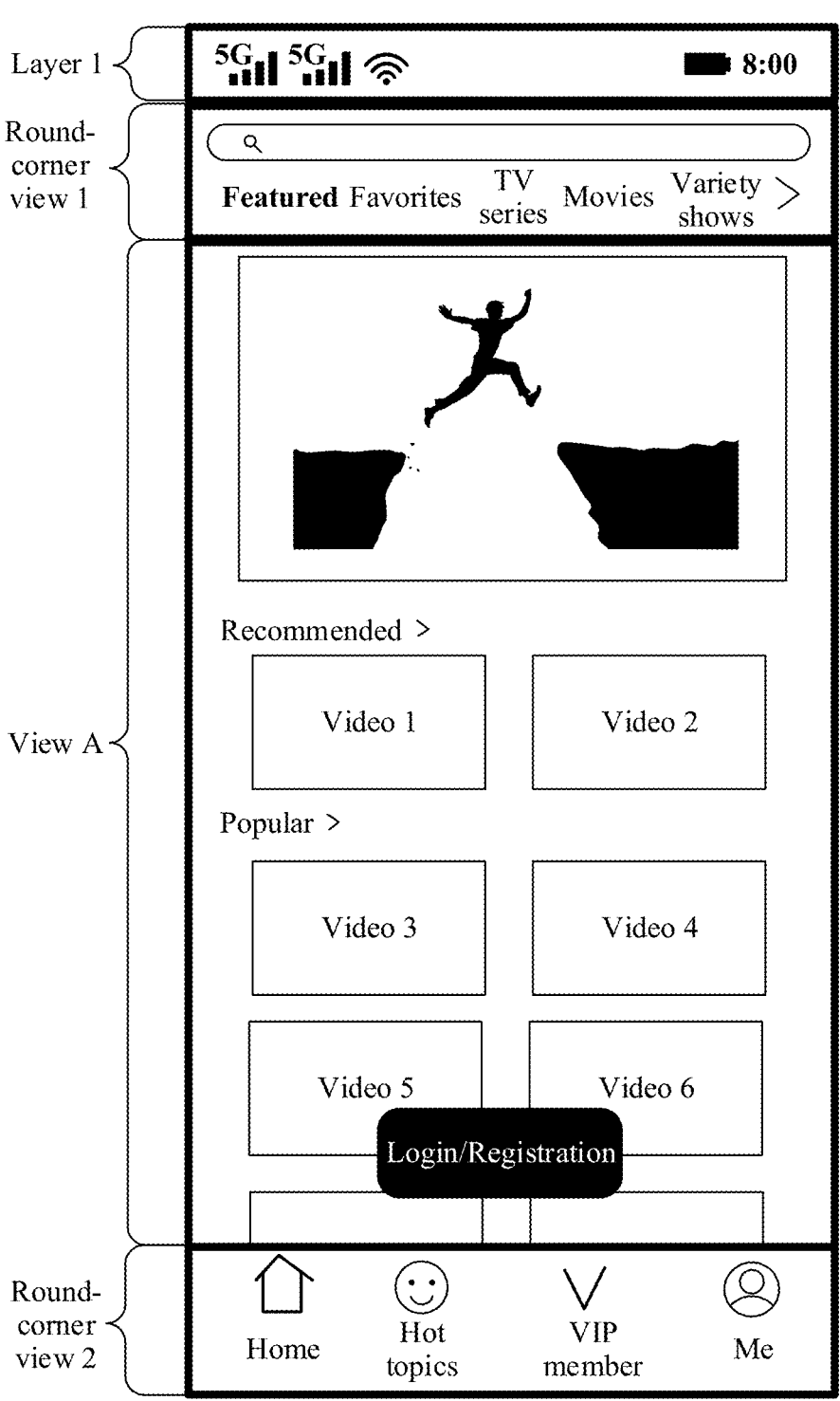
FIG. 15(a) to FIG. 15(c) are an example diagram of frame interpolation in an interface display process according to an embodiment of this application.
Figure 15B:
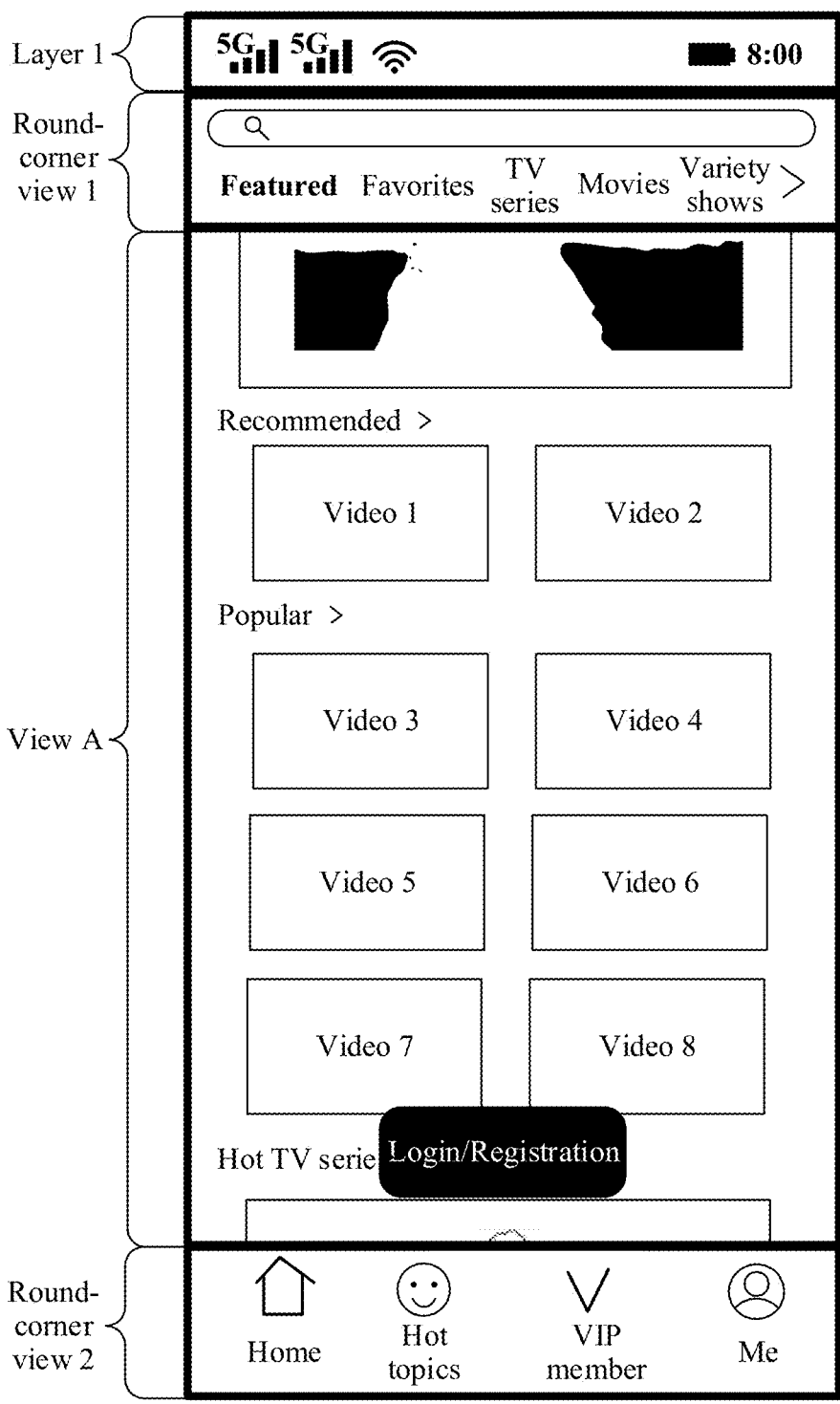
Figure 15C:
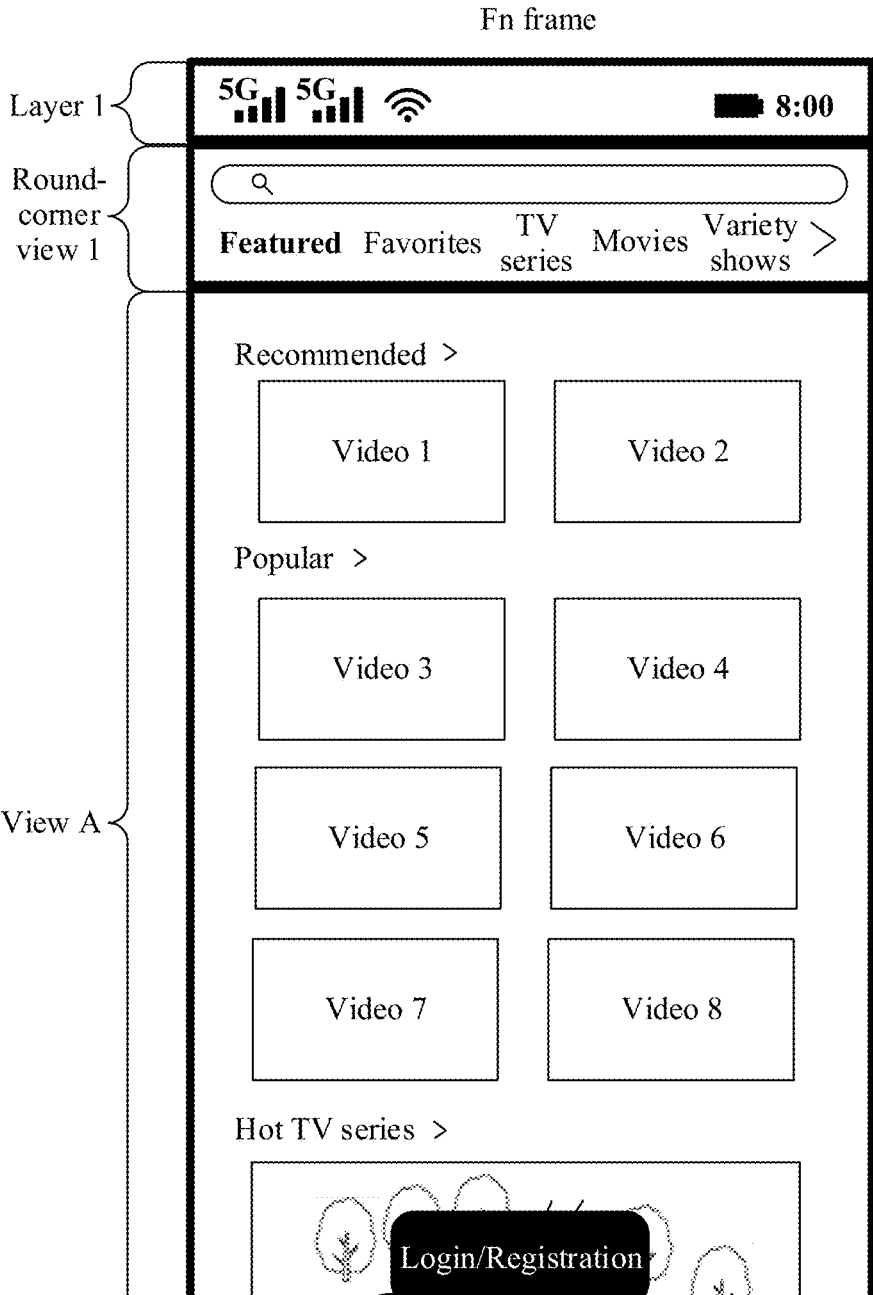

For example, the F1 frame is shown in FIG. 15(a), and the Fn frame is shown in FIG. 15(c). As shown in FIG. 15(a), the F1 frame and the Fn frame are split by the terminal device into five parts: a system status bar view corresponding to a layer 1, a rounded-corner view 1 located at the top of a video interface, an interface view A, a rounded-corner view 2 located at the bottom of the video interface, and a view corresponding to an obstruction, namely, a "Login/ Registration" control, that is displayed above the interface view A in a floating manner. According to the method for performing frame interpolation in an interface display process provided in this embodiment of this application, a to-be-interpolated frame shown in FIG. 15(b) may be combined based on the F1 frame shown in FIG. 15(a) and the Fn frame shown in FIG. 15(c).

For example, FIG. 16(a)-1 to FIG. 16(b)-2 are a schematic diagram of a method for splicing a to-be-interpolated frame according to an embodiment of this application by using an example in which the to-be-interpolated frame shown in FIG. 15(b) may be combined based on the F1 frame shown in FIG. 15(a) and the Fn frame shown in FIG. 15(c).

Figures 1, 16A:
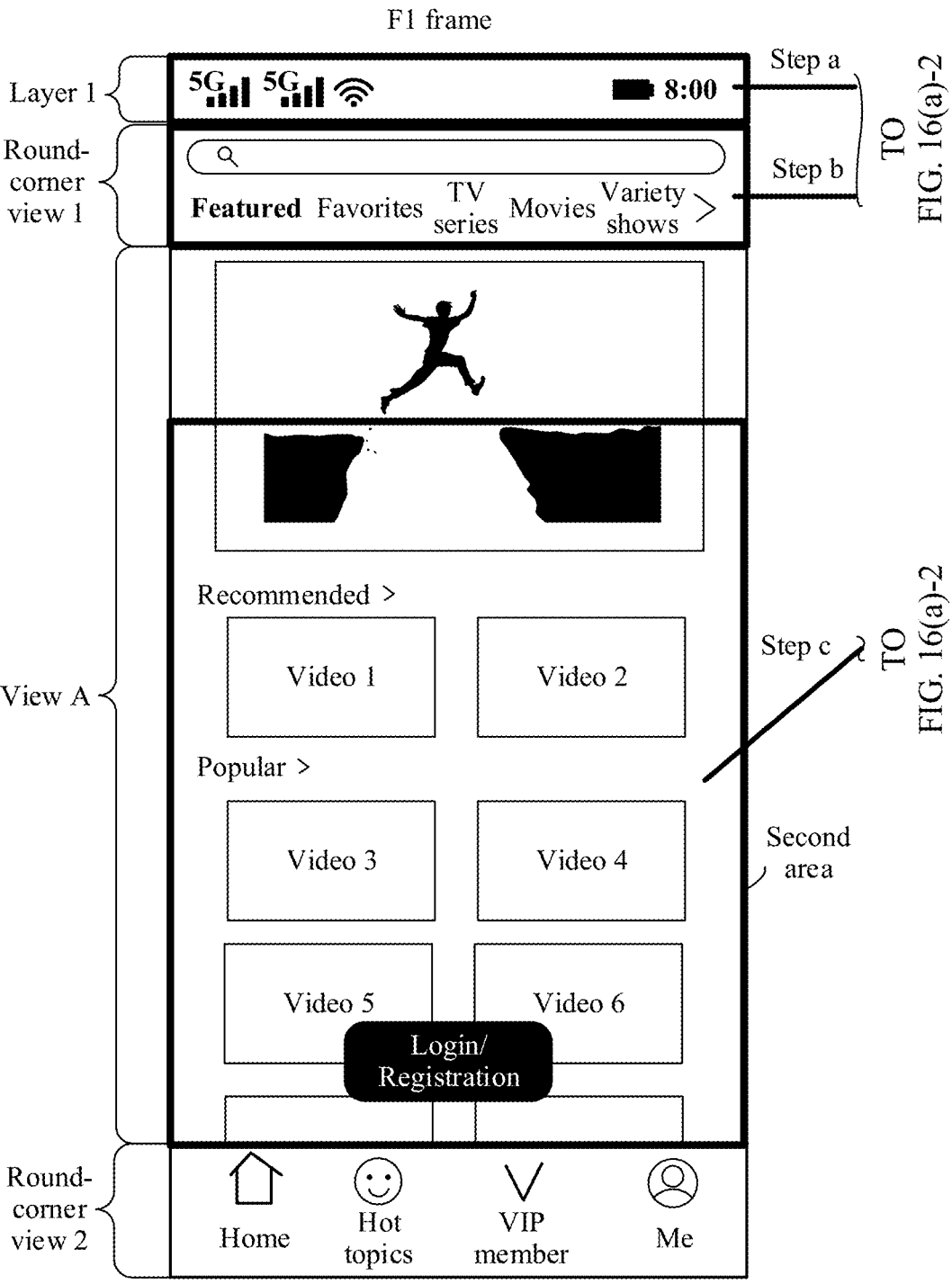
Figures 2, 16A:
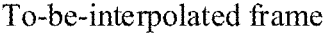
Figures 1, 16B:
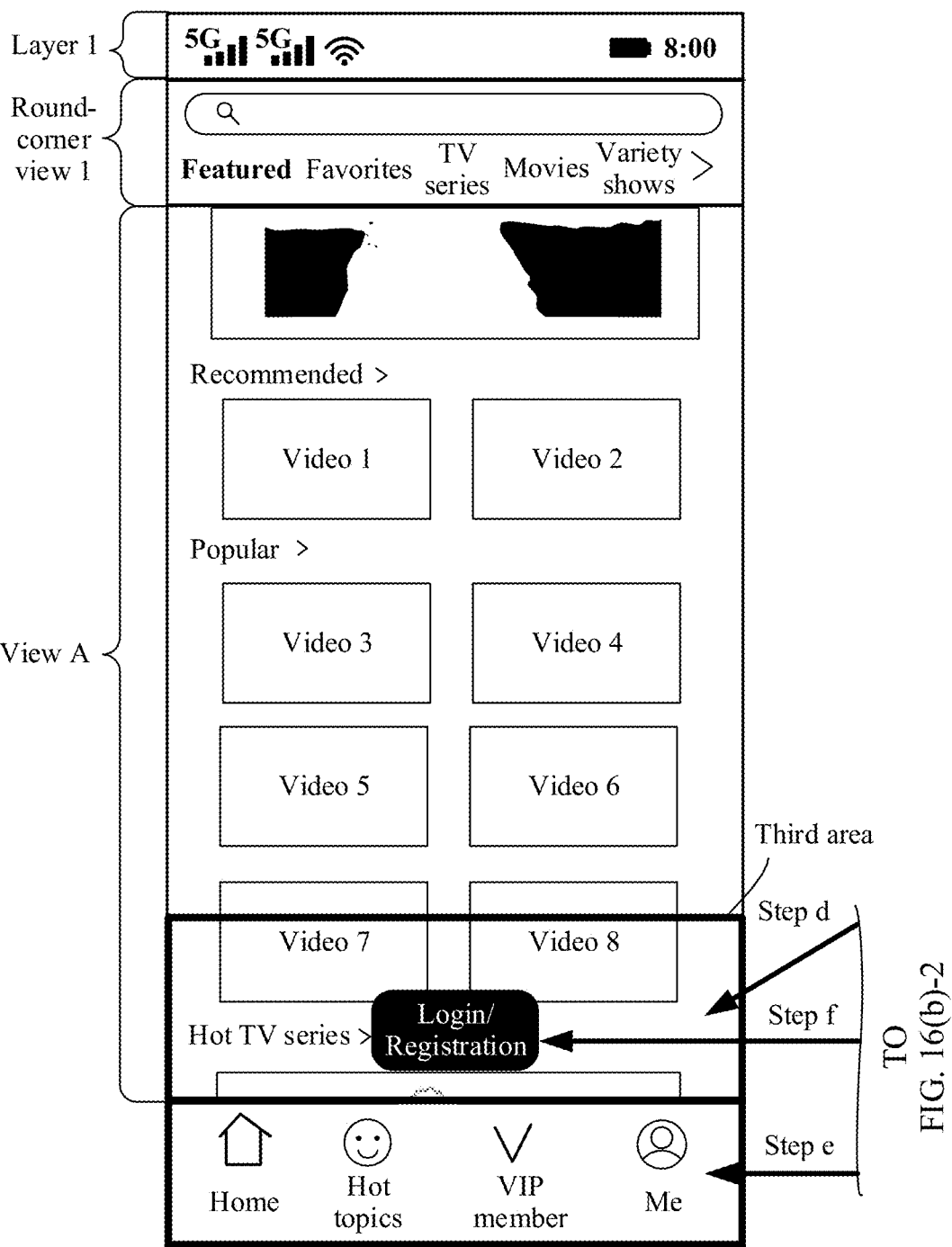
Figures 2, 16B:
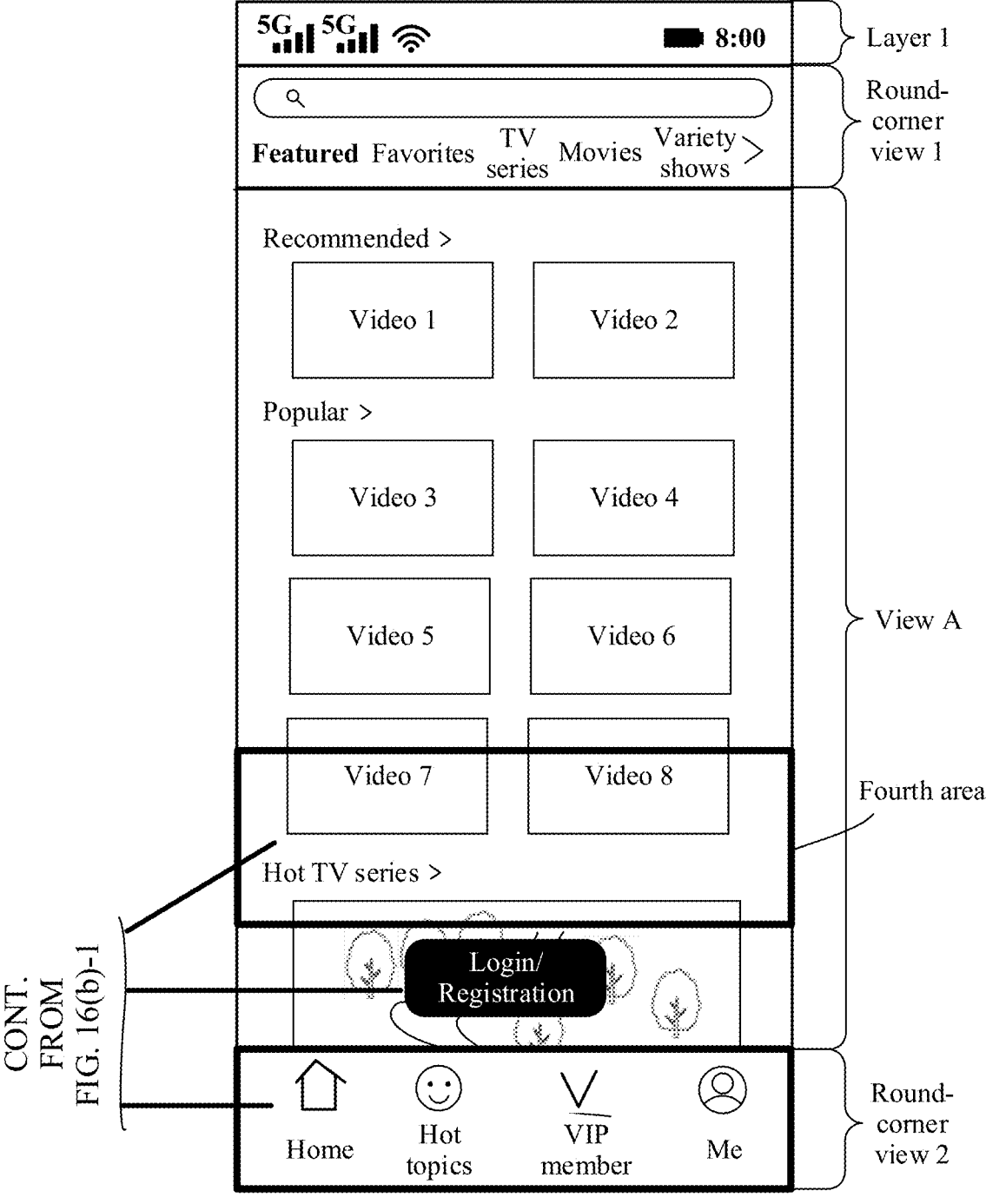

In the example shown in FIG. 16(a)-1 to FIG. 16(b)-2, only one to-be-interpolated frame is interpolated between the F1 frame and the Fn frame. Therefore, the to-be-interpolated frame shown in FIG. 16(b)-1 and FIG. 16(b)-2 is obtained by splicing and combining a plurality of display areas of the F1 frame shown in FIG. 16(a)-1 and FIG. 16(a)-2 and the Fn frame shown in FIG. 16(b)-1 and FIG. 16(b)-2. Splicing of the to-be-interpolated frames shown in FIG. 16(a)-1 to FIG. 16(b)-2 may specifically include the following six steps.

Step a: Copy the system status bar view of the F1 frame to a corresponding position in the to-be-interpolated frame.

In step a, the corresponding position is a same coordinate position.

As shown in step a in FIG. 16(a)-1 and FIG. 16(a)-2, the terminal device copies the system status bar view (namely, a view corresponding to the layer 1) of the F1 frame to the same coordinate position, namely, a position of a system status bar, in the to-be-interpolated frame.

For example, a reference coordinate system is an xOy coordinate system in which an origin O is the upper left corner of an interface, an x axis is a horizontal edge of the interface, and a y axis is a vertical edge of the interface. The terminal device may copy, to a coordinate position (0, 0, W, Y1) in the to-be-interpolated frame, a rendered interface that is in a display area with a coordinate position being (0, 0, w, Y1) and that is in the F1 frame. Herein, (0, 0) indicates coordinates of the upper left corner of the system status bar, (W, Y1) indicates coordinates of the lower right corner of the system status bar, W is a width of the system status bar, and Y1 is a height of the system status bar.

Step b: Copy the rounded-corner view 1 of the F1 frame to a corresponding position in the to-be-interpolated frame.

In step b, the corresponding position is a same coordinate position.

As shown in step b in FIG. 16(a)-1 and FIG. 16(a)-2, the terminal device copies, to the same coordinate position of the to-be-interpolated frame, a rounded-corner view (namely, the rounded-corner view 1) that is located at the top of the video interface and that is in the F1 frame.

For example, the reference coordinate system is the xOy coordinate system in which the origin O is the upper left corner of the interface, the x axis is the horizontal edge of the interface, and the y axis is the vertical edge of the interface. The terminal device may copy, to a coordinate position (0, Y1, W, Y1+Y2) in the to-be-interpolated frame, a rendered interface that is in a display area with a coordinate position being (0, 0, w, Y1) and that is in the F1 frame. Herein, (0, Y1) indicates coordinates of the upper left corner of a top rounded corner, and (W, Y1+Y2) indicates coordinates of the lower right corner of the top rounded-corner. W is a width of the top rounded corner, Y1 is the height of the system status bar, and Y2 is a height of the top rounded corner.

Step c: Copy a second part of the interface view A of the F1 frame to a first area of the to-be-interpolated frame.

As shown in step c in FIG. 16(a)-1 and FIG. 16(a)-2, the terminal device copies, to the first area of the to-be-interpolated frame, an interface view that corresponds to a second area of the interface view A and that is in the F1 frame.

In step c, the terminal device may determine that a coordinate position that is of the second area of the interface view A and that is in the F1 frame is (0, Y1+Y2+ (M1_distance− F1_distance), W, Y1+H). In addition, the terminal device may further determine that a coordinate position of the first area of the to-be-interpolated frame is (0, Y1+Y2, W, Y1+Y2+H−(M1_distance−F1_distance)).

Y1 is the height of the system status bar, and Y2 is the height of the top rounded corner. W is a width of the interface view A, and H is a height of the interface view A. (M1_distance− F1_distance) is a sliding distance of the to-be-interpolated frame shown in FIG. 16(*b*)-1 and FIG. 16(*b*)-2 relative to the F1 frame shown in FIG. 16(*a*)-1 and FIG. 16(*a*)-2. F1_distance is a sliding distance corresponding to the F1 frame, and M1_distance is a sliding distance corresponding to the to-be-interpolated frame shown in FIG. 16(*b*)-1 and FIG. 16(*b*)-2.

For example, the terminal device may obtain, through calculation according to the following formula 5, the sliding distance M1_distance corresponding to the to-be-interpolated frame shown in FIG. 16(*b*)-1 and FIG. 16(*b*)-2:

$$Mi\_distance=Fun(t1,Mi\_t2,v) \quad \text{(formula 5)}$$

Mi_distance is a sliding distance Mi_distance corresponding to an $i^{th}$ to-be-interpolated frame, i is a positive integer, and i≤M.

Herein, t1 is the sliding start time point collected by the terminal device in the phase 1, v is the initial sliding speed collected by the terminal device in the phase 1, and Mi_t2 is a moment corresponding to the $i^{th}$ to-be-interpolated frame. Mi_t2 may be obtained through calculation according to the following formula 6:

$$Mi\_t2=t1+i\times1000/x \quad \text{(formula 6)}$$

In an example, a calculation process of the formula 5 may specifically include the following three steps.

Step 1: Obtain an initial position, and obtain, through calculation, Fn_t2 and Fn_distance based on the initial sliding speed.

Figure 17:
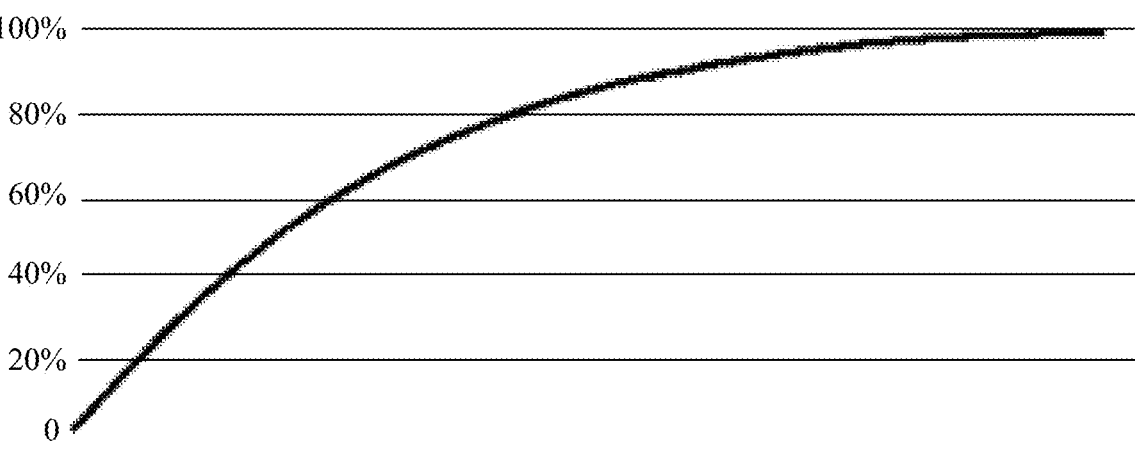
FIG. 17 is an example diagram of dividing a sliding process according to an embodiment of this application.

Step 2: Divide a sliding process into r equal parts. As shown in FIG. 17, it is assumed that the sliding process is divided into 100 equal parts. It may be understood that the sliding process includes 100 times of sliding. As shown in FIG. 17, 1% of the sliding process is completed after the $1^{st}$ time of sliding, 60% of the sliding process is completed after the $25^{th}$ time of sliding, and 100% of the sliding process is completed after the $100^{th}$ time of sliding.

Step 3: Obtain an index through calculation according to a formula that is index=(Mi_t2−t1)/Fn_t2×100, and obtain, based on a specific position of the index in the sliding process shown in FIG. 17, the sliding distance Mi_distance corresponding to the moment Mi_t2.

For example, the following shows an example of a computer executable code for calculating Mi_distance:

```
static {
    float x_min=0.0f;
    float y_min=0.0f;
    for (int i=0; i<NB_SAMPLES; i++) {
    final float alpha=(float) i/NB_SAMPLES;
    float x_max=1.0f;
    float x, tx, coef;
    while (true) {
        x=x_min+(x_max−x_min)/2.0f;
        coef=3.0fxxx(1.0f−x);
        tx=coefx((1.0f−x)xP1+xxP2)+xxxxx;
        if (Math.abs(tx−alpha)<1E−5) break;
        if (tx>alpha)x_max=x;
        else x_min=x;
    }
    SPLINE_POSITION[i]=coefx((1.0f−x)xSTART_TENSION+x)+xxxxx;
    float y_max=1.0f;
    float y, dy;
    while (true) {
        y=y_min+(y_max−y_min)/2.0f;
        coef=3.0fxyx(1.0f−y);
        dy=coefx((1.0f−y)xSTART_TENSION+y)+yxyxy;
        if (Math.abs(dy−alpha)<1E−5) break;
        if (dy>alpha) y_max=y;
        else y_min=y;
    }
    SPLINE_TIME[i]=coefx((1.0f−y)xP1+yxP2)+yxyxy;
    }
    SPLINE_POSITION[NB_SAMPLES]=SPLINE_TIME[NB_SAMPLES]=1.0f;
}
double distance=0.0;
final long time=AnimationUtils.currentAnimationTimeMillis( );
final long currentTime=time−mStartTime;
final float t=(float) currentTime/mSplineDuration;
final int index=(int) (NB_SAMPLESxt);
float distanceCoef=1.f;
float velocityCoef=0.f;
if (index<NB_SAMPLES) {
    final float t_inf=(float) index/NB_SAMPLES;
    final float t_sup=(float) (index+1)/NB_SAMPLES;
    final float d_inf=SPLINE_POSITION[index];
    final float d_sup=SPLINE_POSITION[index+1];
    velocityCoef=(d_sup−d_inf)/(t_sup−t_inf);
```

-continued

```
    distanceCoef=d_inf+(t-t_inf)×velocityCoef;
}
distance=distanceCoef×mSplineDistance
```

Step d: Copy a fourth part of an interface view A of the Fn frame to a third area of the to-be-interpolated frame.

As shown in step d in (a) in FIG. 16(*a*)-1 to FIG. 16(*b*)-2, the terminal device copies, to the third area of the to-be-interpolated frame, an interface view that corresponds to a fourth area of the interface view A and that is in the Fn frame.

In step d, the terminal device may determine that a coordinate position that is of the fourth area of the interface view A and that is in the Fn frame is (0, Y1+Y2+H−(Fn_distance− M1_distance)−(M1_distance−F1_distance), W, Y1+Y2+H−(Fn_distance−M1_distance)). In addition, the terminal device may further determine that a coordinate position of the third area of the to-be-interpolated frame is (0, Y1+Y2+H−(Mi_distance—F1_distance), W, Y1+Y2+H).

Y1 is the height of the system status bar, and Y2 is the height of the top rounded corner. W is the width of the interface view A, and H is the height of the interface view A. (Fn_distance− M1_distance) is a sliding distance of the Fn frame shown in FIG. 16(*b*)-1 and FIG. 16(*b*)-2 relative to the to-be-interpolated frame shown in FIG. 16(*b*)-1 and FIG. 16(*b*)-2. (M1_distance− F1_distance) is the sliding distance of the to-be-interpolated frame shown in FIG. 16(*b*)-1 and FIG. 16(*b*)-2 relative to the F1 frame shown in FIG. 16(*a*)-1 and FIG. 16(*a*)-2. F1_distance is the sliding distance corresponding to the F1 frame, and M1_distance is the sliding distance corresponding to the to-be-interpolated frame shown in FIG. 16(*b*)-1 and FIG. 16(*b*)-2. The terminal device may obtain M1_distance through calculation according to the formula 5.

Step e: Copy the rounded-corner view 2 of the Fn frame to a corresponding position in the to-be-interpolated frame.

In step e, the corresponding position is a same coordinate position.

As shown in step e in FIG. 16(*b*)-1 and FIG. 16(*b*)-2, the terminal device copies, to the same coordinate position in the to-be-interpolated frame, for example, a bottom position of the display interface shown in FIG. 16(*b*)-1 and FIG. 16(*b*)-2, a rounded-corner view (namely, the rounded-corner view 2) that is located at the bottom of the video interface and that is in the Fn frame.

For example, the reference coordinate system is the xOy coordinate system in which the origin O is the upper left corner of the interface, the x axis is the horizontal edge of the interface, and the y axis is the vertical edge of the interface. The terminal device may copy, to a coordinate position (0, Y1+Y2+H, W, H') in the to-be-interpolated frame, a rendered interface that is in a display area with a coordinate position being (0, Y1+Y2+H, W, Y1+Y2+H+Y3) and that is in the Fn frame. Herein, (0, Y1+Y2+H) indicates coordinates of the upper left corner of a bottom rounded corner, and (W, H') indicates coordinates of the lower right corner of the bottom rounded corner. H'=Y1+Y2+H+Y3, and W is a width of the bottom rounded corner. Y1 is the height of the system status bar, Y2 is the height of the top rounded corner, and Y3 is a height of the bottom rounded corner.

Step f: Copy each view corresponding to one or more obstructions in the F1 frame or the Fn frame to a corresponding position in the to-be-interpolated frame.

In step f, the corresponding position is a same coordinate position.

For example, the terminal device copies the view corresponding to the obstruction in the Fn frame to the corresponding position in the to-be-interpolated frame. As shown in step f in FIG. 16(*b*)-1 and FIG. 16(*b*)-2, the terminal device copies the view corresponding to the construction, namely, the "Login/Registration" control, in the Fn frame to the same coordinate position in the to-be-interpolated frame.

For example, the reference coordinate system is the xOy coordinate system in which the origin O is the upper left corner of the interface, the x axis is the horizontal edge of the interface, and the y axis is the vertical edge of the interface. The terminal device may copy, to a coordinate position (x1, y1, x2, y2) in the to-be-interpolated frame, a rendered interface that is in a display area with a coordinate position being (x1, y1, x2, y2) and that is in the Fn frame. Herein, (x1, y1) indicates coordinates of the upper left corner of the "Login/Registration" control, and (x2, y2) indicates coordinates of the lower right corner of the "Login/Registration" control. In this embodiment of this application, the terminal device can determine the coordinate values x1, y1, x2, and y2 based on obtained position information of the obstruction (for example, coordinate information of the obstruction relative to the reference coordinate system).

In the foregoing splicing process from step a to step f, the terminal device can obtain, through combination based on the F1 frame shown in FIG. 16(*a*)-1 and FIG. 16(*a*)-2 and the Fn frame shown in FIG. 16(*b*)-1 and FIG. 16(*b*)-2, the to-be-interpolated frame shown in FIG. 16(*b*)-1 and FIG. 16(*b*)-2. When the terminal device performs interface display in response to a fling operation performed by the user on the video interface shown in FIG. 16(*a*)-1 and FIG. 16(*a*)-2, the to-be-interpolated frame shown in FIG. 16(*b*)-1 and FIG. 16(*b*)-2 is interpolated between the F1 frame shown in FIG. 16(*a*)-1 and FIG. 16(*a*)-2 and the Fn frame shown in FIG. 16(*b*)-1 and FIG. 16(*b*)-2. This can prevent the fling operation from causing problems such as freezing, jitter, and blurry display during interface display.

Further, in the method for performing frame interpolation in an interface display process provided in this embodiment of this application, the terminal device obtains the to-be-interpolated frame through splicing and combination based on a plurality of previous and latter image frames. Therefore, the to-be-interpolated frame does not need to be drawn and rendered.

Figure 18A:
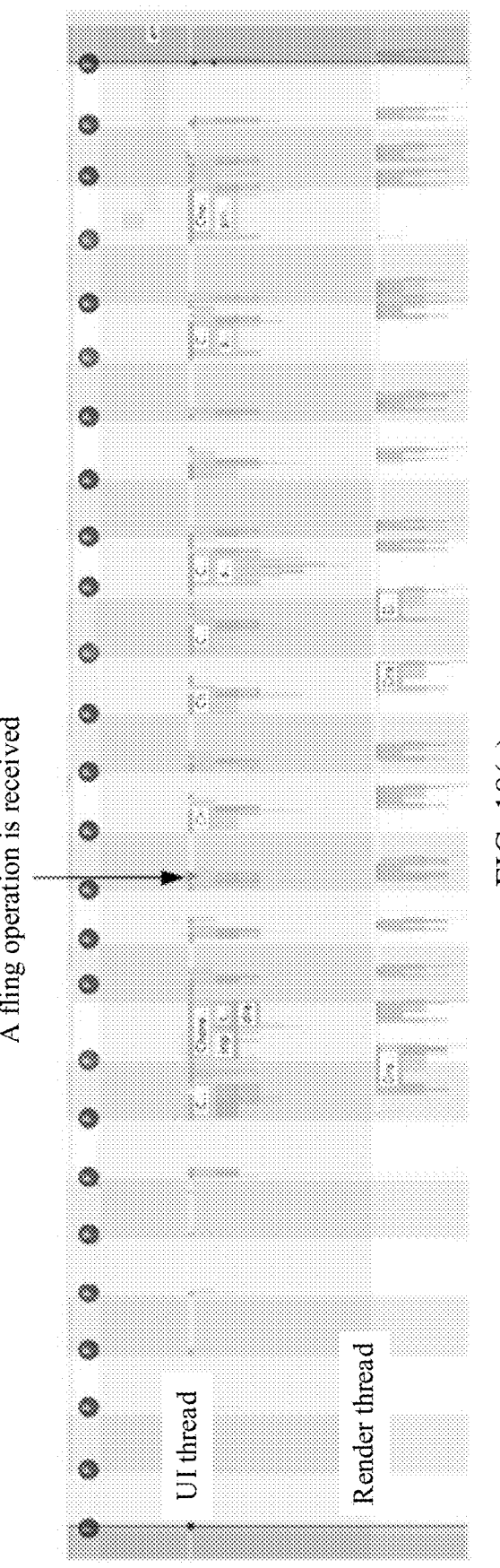
FIG. 18(a) and FIG. 18(b) are a comparison diagram of SysTrace in two interface display processes according to an embodiment of this application.
Figure 18B:
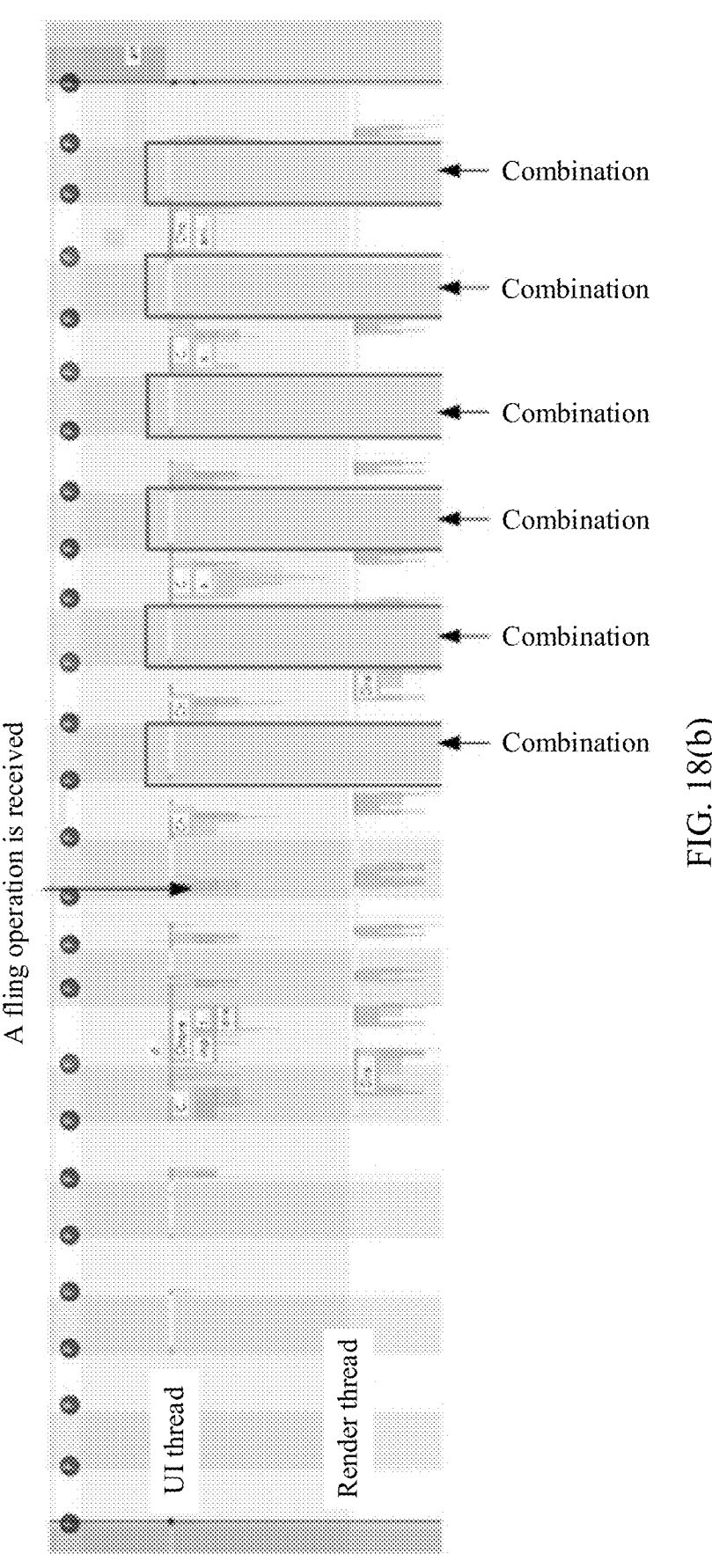

For example, FIG. 18(*a*) and FIG. 18(*b*) show SysTrace in two interface display processes by using the Android operating system as an example. FIG. 18(*a*) shows SysTrace in a conventional interface display process, and FIG. 18(*b*) shows SysTrace in an interface display process according to an embodiment of this application. As shown in FIG. 18(*a*), the user interface UI thread and the render thread Render of the terminal device draw and render each frame of image. However, in the display process shown in FIG. 18(*b*), the terminal device only combines a to-be-interpolated frame between two frames.

Therefore, compared with that in a conventional case in which each frame of image sent for display is drawn and rendered by the terminal device, the method for performing frame interpolation in an interface display process provided in this embodiment of this application can greatly reduce consumption of resources (including hardware resources and software resources) and computing power of the terminal device, reduce loads of the CPU, the GPU, and the like of the terminal device, and reduce power consumption of the terminal device. For example, power consumption of the CPU and the GPU may be reduced by approximately 40%, and power consumption of the terminal device may be reduced by approximately 20%. The more to-be-interpolated frames are interpolated between two frames, the more power consumption is reduced.

In addition, in the method for performing frame interpolation in an interface display process provided in this embodiment of this application, the terminal device splices and combines the to-be-interpolated frame by using a distance (for example, a sliding distance of a view) at which the interface slides in a direction with animation effect, and calculation is accurate. Therefore, a problem of blurry display of interfaces such as the to-be-interpolated frame and a spliced boundary does not occur.

In addition, the method for performing frame interpolation in an interface display process provided in this embodiment of this application can support a higher refresh rate.

In conclusion, the method for performing frame interpolation in an interface display process provided in embodiments of this application can improve interface display effect, reduce a power consumption speed of the terminal device, and improve user experience under a high refresh rate requirement.

It should be understood that the solutions in embodiments of this application may be appropriately combined for use, and explanations or descriptions of terms in embodiments may be cross-referenced or explained in embodiments. This is not limited.

It should be further understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

It may be understood that, to implement functions of any one of the foregoing embodiments, the terminal device includes a corresponding hardware structure and/or software module for executing each function. A person skilled in the art should easily be aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each specific application, but it should not be considered that the implementation goes beyond the scope of this application.

In embodiments of this application, the terminal device may be divided into function modules. For example, each function module corresponding to each function may be obtained through division, or two or more functions may be integrated into one processing module. The integrated module may be implemented in a form of hardware, or may be implemented in a form of a software function module. It should be noted that, in embodiments of this application, division into the modules is an example, and is merely logical function division. During actual implementation, another division manner may be used.

Figure 19:
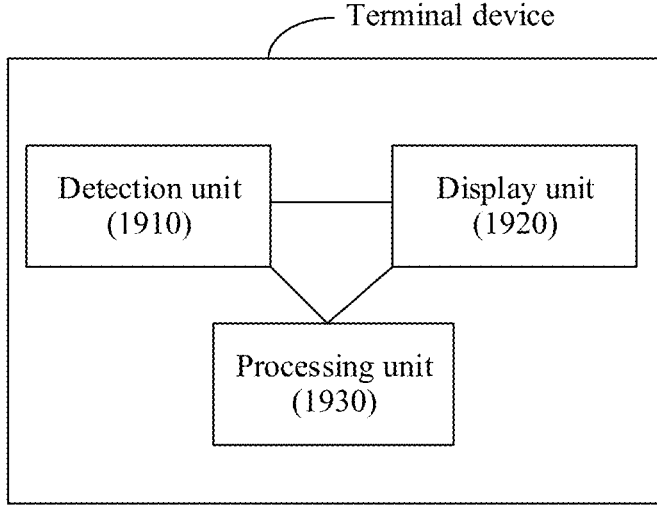
FIG. 19 is a block diagram of a structure of a terminal device according to an embodiment of this application.

For example, when each function module of the terminal device is obtained through division in an integrated manner, FIG. 19 is a block diagram of a structure of a terminal device according to an embodiment of this application. As shown in FIG. 19, the terminal device may include a detection unit 1910, a display unit 1920, and a processing unit 1930.

The detection unit 1910 is configured to support the terminal device in detecting a fling operation performed by a user on a display interface, and/or is used in another process of the technology described in this specification. The display unit 1920 is configured to: support the terminal device in starting, when the detection unit detects the fling operation performed by the user on the display interface, to slide for displaying a sliding interface; and in a process of displaying the sliding interface, display a plurality of image frames and a to-be-interpolated frame interpolated between the plurality of image frames; and/or is used in another process of the technology described in this specification. The processing unit 1930 is configured to: support the terminal device in obtaining input information; determine a frame interpolation policy based on the input information; and perform, based on information about the plurality of image frames, splicing and combination by using the frame interpolation policy, to obtain one or more to-be-interpolated frames; and/or is used in another process of the technology described in this specification.

Figure 20:
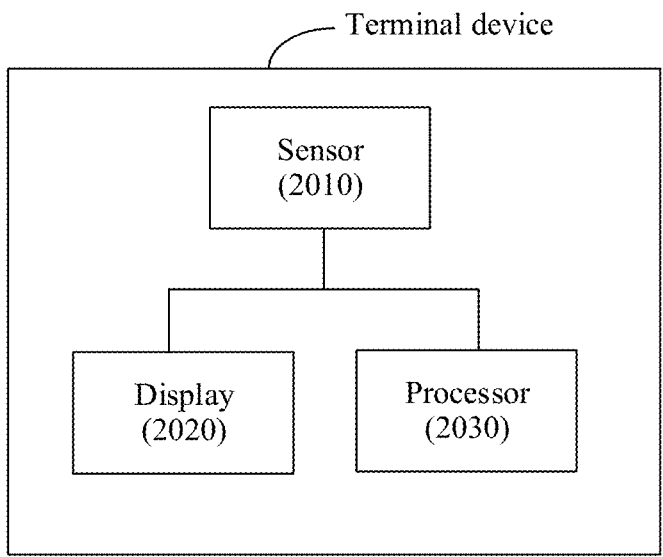
FIG. 20 is a schematic diagram of a structure of a terminal device according to an embodiment of this application.

It should be understood that each module in the terminal device may be implemented in a form of software and/or hardware. This is not specifically limited herein. In other words, the electronic device is presented in a form of a function module. The "module" herein may be an application-specific integrated circuit ASIC, a circuit, a processor that executes one or more software or firmware programs, a memory, an integrated logic circuit, and/or another component that can provide the foregoing function. Optionally, in a simple embodiment, a person skilled in the art may figure out that the electronic device may be in a form shown in FIG. 20. The detection unit 1910 may be implemented by a sensor 2010 shown in FIG. 20. The display unit 1920 may be implemented by a display 2020 shown in FIG. 20. The processing unit 1930 may be implemented by a processor 2030 shown in FIG. 20. Specifically, the processor is implemented by executing a computer program stored in a memory. Optionally, the memory is a storage unit in a chip, for example, a register or a cache. The storage unit may be alternatively a storage unit that is located outside a chip and that is in the computer device.

In an optional manner, when data transmission is implemented by using software, data transmission may be implemented completely or partially in a form of a computer program product. The computer program product includes one or more computer instructions. When the computer program instructions are loaded and executed on a computer, the procedures or functions in embodiments of this application are all or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or a wireless (for example, infrared, radio, and microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid state disk (solid state disk, SSD)), or the like.

Method or algorithm steps described with reference to embodiments of this application may be implemented by hardware, or may be implemented by a processor by executing software instructions. The software instructions may include a corresponding software module. The software module may be stored in a RAM memory, a flash memory, a ROM memory, an EPROM memory, an EEPROM memory, a register, a hard disk, a removable hard disk, a CD-ROM, or a storage medium in any other form well-known in the art. For example, a storage medium is coupled to a processor, so that the processor can read information from the storage medium and write information to the storage medium. Certainly, the storage medium may be alternatively a component of the processor. The processor and the storage medium may be located in an ASIC. In addition, the ASIC may be located in a detection apparatus. Certainly, the processor and the storage medium may alternatively exist in a detection apparatus as discrete components.

Based on the foregoing descriptions of the implementations, a person skilled in the art may clearly understand that, for ease and brevity of description, division into the foregoing function modules is merely used as an example for description. In actual application, the foregoing functions may be allocated to different function modules for implementation based on a requirement, that is, an inner structure of the apparatus is divided into different function modules, to implement all or some of the functions described above.

In an optional manner, this application provides a chip system. The chip system includes a processor and a memory. The memory stores instructions. When the instructions are executed by the processor, the method according to any one of the possible implementations provided in this application is implemented. The chip system may include a chip, or may include a chip and another discrete component.

In the several embodiments provided in this application, it should be understood that the disclosed electronic device and method may be implemented in other manners. For example, the foregoing apparatus embodiments are merely examples. For example, division into the modules or units is merely logical function division. During actual implementation, another division manner may be used. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may be one or more physical units, may be located in one place, or may be distributed to different places. Some or all of the units may be selected based on actual requirements, to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments in this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, for example, a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method performed by a terminal device for performing frame interpolation in an interface display process, wherein the method is applied to a terminal device, and the method comprises comprising:

when a fling operation performed by a user on a display interface is received, starting to slide for displaying a sliding interface, wherein the sliding interface is a view in a first area of the display interface;

obtaining input information, wherein the input information represents a fling direction, interface information of the display interface, sliding display information, and information about a plurality of image frames corresponding to the sliding interface;

determining a frame interpolation policy based on the input information;

determining the maximum quantity of interpolable frames based on the sliding frame rate and the maximum sliding duration of the sliding interface and obtaining, through calculation, the maximum quantity of interpolable frames according to the following formula:

$$M=(\max\_t/y)-1,$$

wherein $y=1000/x$, x is the sliding frame rate, and max_t is the maximum sliding duration; and creating one or more interpolated frames by performing, based on the information about the plurality of image frames, splicing and combination by using the frame interpolation policy, to obtain one or more to-be-interpolated frames, wherein the one or more to-be-interpolated frames are located between the plurality of image frames.

2. The method according to claim 1, wherein the input information comprises the fling direction, a sliding start time point, an initial sliding speed, and a sliding frame rate of the sliding interface, an interface size of the sliding interface, a size of a screen display area of the terminal device, and the information about the plurality of image frames.

3. The method according to claim 2, wherein the input information further comprises information about an obstruction on the sliding interface.

4. The method according to claim 3, wherein the obstruction comprises one or more of the following: a floating window, a floating box, a floating control, or a floating icon.

5. The method according to claim 1, wherein the step of determining the frame interpolation policy based on the input information comprises:

determining a maximum quantity of interpolable frames based on the input information; and determining the frame interpolation policy based on the maximum quantity of interpolable frames.

6. The method according to claim 5, wherein;

the frame interpolation policy comprises a fixed frame interpolation policy and a variable frame interpolation policy; and the fixed frame interpolation policy means requires interpolating a fixed quantity of to-be-interpolated frames between two adjacent image frames in the plurality of image frames, and the variable frame interpolation policy means requires interpolating a variable quantity of to-be-interpolated frames between two adjacent image frames in the plurality of image frames.

7. The method according to claim 5, wherein the step of determining the maximum quantity of interpolable frames based on the input information comprises:

determining a maximum sliding duration based on the sliding start time point, the initial sliding speed, and a maximum sliding distance of the sliding interface, wherein the maximum sliding distance is a width or a height of the display interface; and wherein the maximum sliding duration is determined based on the sliding start time point, the initial sliding speed, and a maximum sliding distance of the sliding interface, and the maximum sliding distance is a width or a height of the display interface.

8. The method according to claim 7, wherein the step of determining the maximum quantity of interpolable frames based on the sliding frame rate and maximum sliding duration of the sliding interface:

wherein the step of determining the maximum sliding duration determines max_t is determined according to a formula: Fun (t1, max_t, v)<max_distance, t1 is the sliding start time point, v is the initial sliding speed, and max_distance is the maximum sliding distance.

9. The method according to claim 1, wherein the plurality of image frames comprise a first image frame and a last image frame in a sliding display process of the sliding interface.

10. The method according to claim 1, wherein the plurality of image frames each comprise a plurality of display areas.

11. The method according to claim 10, wherein the step of performing, based on the information about the plurality of image frames, splicing and combination by using the frame interpolation policy, to obtain one or more to-be-interpolated frames comprises:

performing drawing and rendering based on the information about the plurality of image frames; and performing splicing and combination on the plurality of display areas of the plurality of image frames to obtain the one or more to-be-interpolated frames.

12. The method according to claim 11, wherein the plurality of image frames each comprise a system status bar view and a sliding interface view on the display interface, and each corresponding position of the one or more to-be-interpolated frames comprises the system status bar view and the sliding interface view.

13. The method according to claim 10, wherein the plurality of image frames each comprise one or more navigation bar views on the display interface, and each corresponding position of the one or more to-be-interpolated frames comprises the one or more navigation bar views.

14. The method according to claim 10, wherein the plurality of image frames each comprise one or more rounded-corner views, and each corresponding position of the one or more to-be-interpolated frames comprises the one or more rounded-corner views.

15. The method according to claim 10, wherein the plurality of image frames each comprise an obstruction view, and each corresponding position of the one or more to-be-interpolated frames comprises the obstruction view.

16. The method according to claim 10, wherein the plurality of image frames each comprise a view of a first desktop area of the terminal device, and each corresponding position of the one or more to-be-interpolated frames comprises the view of the first desktop area.

17. A terminal device comprising:

a memory storing executable instructions; and a processor configured to execute the executable instructions to perform operations of:

when a fling operation performed by a user on a display interface is received, starting to display a sliding interface, wherein the sliding interface is a view in a first area of the display interface;

obtaining input information, wherein the input information represents a fling direction, interface information of the display interface, sliding display information, and information about a plurality of image frames corresponding to the sliding interface;

determining a frame interpolation policy based on the input information;

determining the maximum quantity of interpolable frames based on the sliding frame rate and the maximum sliding duration of the sliding interface and obtaining, through calculation, the maximum quantity of interpolable frames according to the following formula:

$$M=(max\_t/y)-1,$$

wherein y=1000/x, x is the sliding frame rate, and max_t is the maximum sliding duration; and create one or more interpolated frames by performing, based on the information about the plurality of image frames, splicing and combination by using the frame interpolation policy, to obtain one or more to-be-interpolated frames located between the plurality of image frames.

18. The terminal device according to claim 17, wherein the input information comprises the fling direction, a sliding start time point, an initial sliding speed, and a sliding frame rate of the sliding interface, an interface size of the sliding interface, a size of a screen display area of the terminal device, and the information about the plurality of image frames.

19. The terminal device according to claim 18, wherein the input information further comprises information about an obstruction on the sliding interface.

20. The terminal device according to claim 19, wherein the obstruction comprises a floating window, a floating box, a floating control, or a floating icon.

\* \* \* \* \*